US012811504B2

(12) United States Patent
Ikriannikov

(10) Patent No.: US 12,811,504 B2
(45) Date of Patent: Nov. 24, 2026

(54) TWO-STAGE SWITCHING POWER CONVERTERS WITH RIPPLE CURRENT CANCELATION, AND ASSOCIATED METHODS

(71) Applicant: Maxim Integrated Products, Inc., San Jose, CA (US)

(72) Inventor: Alexandr Ikriannikov, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 212 days.

(21) Appl. No.: 18/598,849

(22) Filed: Mar. 7, 2024

(65) Prior Publication Data

US 2024/0322694 A1 Sep. 26, 2024

Related U.S. Application Data

(60) Provisional application No. 63/490,227, filed on Mar. 14, 2023.

(51) Int. Cl.
*H02M 3/158* (2006.01)
*H02M 1/00* (2006.01)
(Continued)

(52) U.S. Cl.
CPC ....... *H02M 3/1586* (2021.05); *H02M 1/0043* (2021.05); *H02M 1/0064* (2021.05);
(Continued)

(58) Field of Classification Search
CPC ............. H02M 1/0043; H02M 1/0054; H02M 1/0064; H02M 1/007; H02M 1/0095;
(Continued)

(56) References Cited

U.S. PATENT DOCUMENTS 6,232,752 B1 * 5/2001 Bissell ................ H02M 3/1582 323/225
6,897,641 B1 * 5/2005 Herbert ............... H02M 3/1584 323/282

(Continued)

FOREIGN PATENT DOCUMENTS

WO WO-2021195692 A1 * 10/2021 ................ H02J 7/35

OTHER PUBLICATIONS

Khamis et al., "Split Duty Cycle Coupled Multi-phase Boost-Buck Converter," 2020 IEEE Energy Conversion Congress and Exposition (ECCE), Detroit, MI, USA, 2020, pp. 621-627, doi: 10.1109/ECCE44975.2020.9236259. (Year: 2020).*

(Continued)

*Primary Examiner* — Fred E Finch, III
(74) *Attorney, Agent, or Firm* — Schwegman Lundberg & Woessner, P.A.

(57) ABSTRACT

A two-stage switching power converter includes a first power stage, a second power stage electrically coupled in series with the first power stage, and a controller. The first power stage includes a first power transfer winding, and the second power stage includes a second power transfer winding that is magnetically coupled to the first power transfer winding. The controller is configured to (a) control switching of the second power stage to regulate at least one parameter of the two-stage switching power converter and (b) control switching of the first power stage such that the first power stage switches in a complementary manner with respect to the second power stage.

19 Claims, 29 Drawing Sheets

(51) Int. Cl.
*H02M 1/15* (2006.01)
*H02M 1/40* (2007.01)
*H02M 3/07* (2006.01)

(52) U.S. Cl.
CPC ............ *H02M 1/007* (2021.05); *H02M 1/15* (2013.01); *H02M 1/40* (2013.01); *H02M 1/0095* (2021.05); *H02M 3/072* (2021.05); *H02M 3/158* (2013.01)

(58) Field of Classification Search
CPC ........... H02M 1/14; H02M 1/15; H02M 1/40; H02M 3/003; H02M 3/072; H02M 3/158; H02M 3/1586
See application file for complete search history.

(56) References Cited

U.S. PATENT DOCUMENTS

| | | | |
|---|---|---|---|
| 8,772,967 | B1 | 7/2014 | Ikriannikov et al. |
| 9,774,259 | B1 | 9/2017 | Ikriannikov et al. |
| 10,574,144 | B1 * | 2/2020 | Ramabhadran ......... H02M 1/14 |
| 2023/0369977 | A1 | 11/2023 | Ikriannikov et al. |
| 2023/0378874 | A1 | 11/2023 | Ikriannikov et al. |

OTHER PUBLICATIONS

Nakanishi et al, A Two-state Converter with a Coupled-Inductor, Proceedings of IEEE Power Electronics and Drive Systems Conf., PEDS 2007, pp. 653-657.

Schmid et al., Magnetically Coupled Buck Converters, 2013 IEEE Energy Conversion Congress and Exposition, Denver, CO, USA, 2013, pp. 4948-4954.

"German Application Serial No. 10202407126.5, Office Action mailed May 18, 2026", w/o English Translation, 4 pgs.

Erickson, Robert W, et al., "Fundamentals of Power Electronics", Auflage. Cham: Springer, 166, pp. 168-170, (2020), 5 pgs.

"German Application Serial No. 102024107126.5, Response filed Sep. 16, 2026 to Office Action mailed May 18, 2026", w/o English claims, 9 pgs.

"German Application Serial No. 102024107126.5, Office Action mailed Sep. 23, 2026", w/o English translation, 2 pgs.

* cited by examiner

1802

1804

1806

1808

1810

1812

1814

1816

1818

TWO-STAGE SWITCHING POWER CONVERTERS WITH RIPPLE CURRENT CANCELATION, AND ASSOCIATED METHODS

RELATED APPLICATIONS

This application claims benefit of U.S. Provisional Patent Application Ser. No. 63/490,227, filed on Mar. 14, 2023, which is incorporated herein by reference.

BACKGROUND

Switching power converters are widely used in electronic devices, such as to provide a regulated electrical power source. A switching power converter is configured such that its solid-state power switching devices do not continuously operate in their active states; instead, the switching devices repeatedly switch between their on-states and off-states. Although switching power converters can achieve high efficiency, particularly under heavy load conditions, they typically exhibit ripple current due to switching action of their switching devices. Ripple current is generally undesirable because it causes power losses and ripple voltage.

Inductors are commonly used for energy storage in switching power converters. Some switching power converters include one or more discrete inductors, where a discrete inductor is an inductor that is not magnetically coupled to any other inductor. Other switching power converters include one or more coupled inductors, where a coupled inductor is a device including two or more inductors that are magnetically coupled. A coupled inductor exhibits magnetizing inductance, which is inductance associated with magnetic flux linking the windings of the coupled inductor. Additionally, each winding of a coupled inductor exhibits leakage inductance, which is inductance associated with magnetic flux that flows only around the particular winding, i.e., magnetic flux that does not couple to any other winding.

Use of a two-stage switching power converters may be advantageous, for example, in applications where magnitude of input voltage is significantly different than magnitude of output voltage, such as to avoid operation at extremely large or extremely small duty cycles. For example, consider an application where an input voltage is 48 volts and output voltage is 0.5 volt. Use of a single-stage switching power converter, such as buck converter, to convert the 48 volts input voltage to the 0.5 volt output voltage may result in an extremely small duty cycle, such as a duty cycle of around 0.01. A two-stage switching power converter may be used instead of a single-stage switching power converter to perform aforesaid voltage conversion in two steps. For instance, a first power stage of the two-stage switching power converter may convert the 48 volts input voltage to an intermediate voltage of 6 volts at a duty cycle of around 0.125, and a second power stage of the two-stage switching power converter may convert the 6 volts intermediate voltage to the 0.5 volt output voltage at a duty cycle of around 0.08, thereby preventing the need to operate a very small duty cycle of around 0.01.

Additionally, in a single-stage switching power converter, such as a single-stage buck converter, not only do the switching devices have to be rated for a voltage higher than the input voltage (considering parasitic ringing and switching voltage spikes), but the switching devices also conduct high currents associated with low voltage output at the same time. High voltage rating usually implies significantly worse semiconductor parameters, such as Rds_on, gate and drain capacitances, etc., as compared to the semiconductors with a low voltage rating and the same size. In the cases of very large difference between input and output voltages, it could be advantageous to use two-stage approach, where input stage has high voltage switching devices that conduct significantly smaller currents as compared to currents in the second stage that is rated for much lower voltages.

DETAILED DESCRIPTION OF THE EMBODIMENTS

Disclosed herein are two-stage switching power converters with ripple current cancelation and associated methods which significantly advance the state of the art. Certain embodiments achieve ripple current cancelation, for example, by coordinated operation of a first power stage and a second power stage. The two power stages may be magnetically coupled, or the two power stages may be electrically coupled. Some embodiments include a plurality of phases in one or more of the two power stages, such as to help minimize switching losses and/or to further promote ripple current cancelation. The ripple cancelation achieved by the new two-stage switching power converters may advantageously enable, for example, higher switching power converter efficiency and/or faster transient response, than a conventional two-stage switching power converter with otherwise similar power conversion capability.

Figure 1:
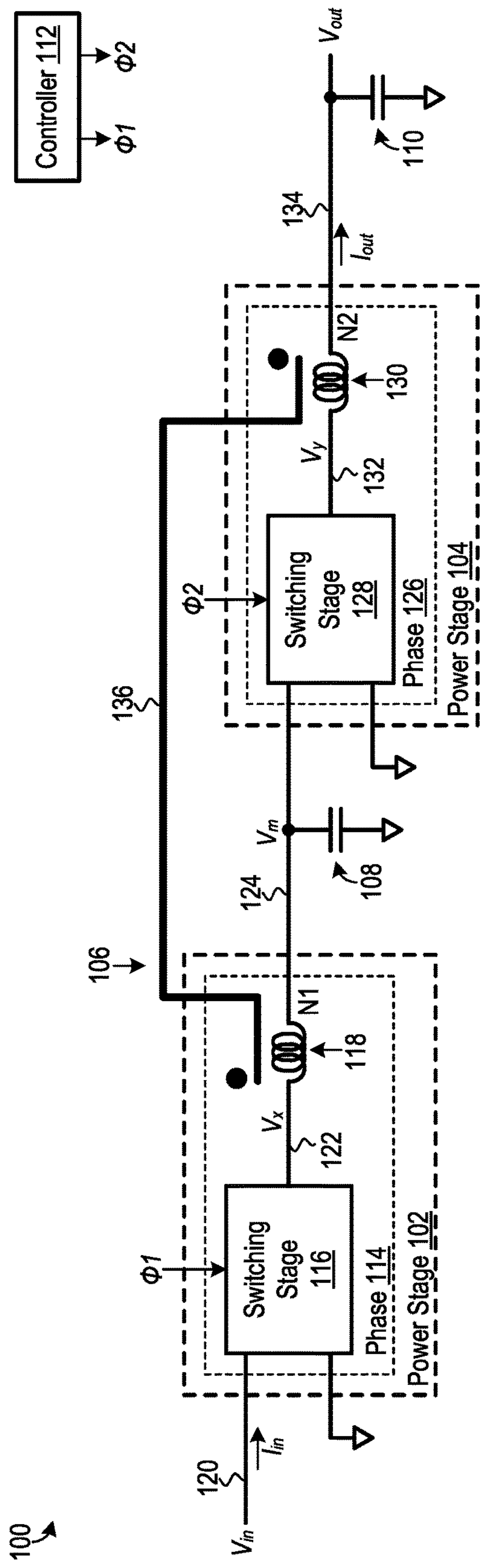
FIG. 1 is a schematic diagram of a two-stage switching power converter with ripple current cancelation, according to an embodiment.

FIG. 1 is a schematic diagram of a two-stage switching power converter 100 with ripple current cancelation, which is one embodiment of the new two-stage switching power converters disclosed herein. Two-stage switching power converter 100 includes a first power stage 102, a second power stage 104, a coupled inductor 106, an intermediate capacitor 108, an output capacitor 110, and a controller 112. First power stage 102 includes one phase 114, and phase 114 includes a switching stage 116 and a first power transfer winding 118. Switching stage is 116 is electrically coupled between an input power node 120, ground, and a switching node 122. First power transfer winding 118 is electrically coupled between switching node 122 and an intermediate power node 124, and intermediate capacitor 108 is electrically coupled between intermediate power node 124 and ground. In this document, the term "ground" refers to any reference node, and ground is therefore not limited to being an earth ground. For example, ground could be a chassis ground, or ground could be a reference node that is at a different electrical potential than either an earth ground or a chassis ground. Ground is designated in the present figures as a downward pointing triangle.

Second power stage 104 includes one phase 126, and phase 126 includes a switching stage 128 and a second power transfer winding 130. Switching stage is 128 is electrically coupled between intermediate power node 124, ground, and a switching node 132. Second power transfer winding 130 is electrically coupled between switching node 132 and an output power node 134, and output capacitor 110 is electrically coupled between output power node 134 and ground. Accordingly, first power stage 102 and second power stage 104 are electrically coupled in series between input power node 120 and output node 134 via intermediate power node 124. As discussed below, first power stage 102 and second power stage 104 are collectively configured to convert a voltage $V_{in}$ at input power node 120 to a voltage $V_{out}$ at output power node 134, or vice versa.

Coupled inductor 106 includes a magnetic core 136 as well as first power transfer winding 118 and second power transfer winding 130. As such, coupled inductor 106 spans first power stage 102 and second power stage 104. Magnetic core 136 is formed, for example, of a ferrite magnetic material or of an iron powder magnetic material. However, magnetic core 136 could alternately be an "air core," or in other words, magnetic core 136 could be implemented by placing first power transfer winding 118 and second power transfer winding 130, or breaking these windings in sections and placing these sections in pairs in sufficient proximity, to achieve magnetic coupling without use of a tangible magnetic coupling structure. First power transfer winding 118 forms a quantity of turns equal to N1, and second power transfer winding 130 forms a quantity of turns equal to N2. The magnetic coupling between power transfer windings 118 and 130 is negative, such that the current flowing from switching node 122 to intermediate power node 124 in first power transfer winding 118 and current flowing from switching node 132 to output power node 134 in second power transfer winding 130 create mutual magnetic fluxes in opposite directions, at least partially canceling each other.

Controller 112 is configured to generate control signals Φ1 and Φ2 to control switching stage 116 and switching stage 128, respectively. One example of these two switching signals is discussed below with respect to FIGS. 2A and 2A. Connections between controller 112 and switching stages 116 and 128 are not shown for illustrative clarity. Controller 112 is implemented, for example, by analog and/or digital electronic circuitry. In some embodiments, controller 112 is at least partially implemented by a processor (not shown) executing instructions in the form of software and/or firmware stored in a memory (not shown). Although controller 112 is depicted as a discrete element, controller 112 could be partially or fully integrated with one or more other elements of two-stage switching power converter 100. For example, controller 112 could be partially or fully incorporated in one or more of first power stage 102 and second power stage 104. Additionally, controller 112 may include multiple constituent elements that need not be co-packaged or even disposed at a common location.

Switching stage 116 is configured to repeatedly switch switching node 122 between input power node 120 and ground, in response to control signal Φ1 generated by controller 112. For example, in some embodiments, switching stage 116 is configured to electrically couple switching node 122 to input power node 120 when control signal Φ1 is asserted, and switching stage 116 is configured to electrically couple switching node 122 to ground when control signal Φ1 is de-asserted. First power transfer winding 118 is driven "high" when its respective switching node 122 is at voltage $V_{in}$, i.e., when switching node 122 is electrically coupled to input power node 120, and first power transfer winding 118 is driven "low" when its respective switching node 122 is at zero volts relative to ground, i.e., when switching node 122 is electrically coupled to ground. Controller 112 generates control signal Φ1 so that first power stage 102 converts voltage $V_{in}$ at input power node 120 to a voltage $V_m$ at intermediate power node 124, or vice versa.

Switching stage 128 is configured to repeatedly switch switching node 132 between intermediate power node 124 and ground, in response to control signal Φ2 generated by controller 112. For example, in some embodiments, switching stage 128 is configured to electrically couple switching node 132 to intermediate power node 124 when control signal Φ2 is asserted, and switching stage 128 is configured to electrically couple switching node 132 to ground when control signal Φ2 is de-asserted. Second power transfer winding 130 is driven "high" when its respective switching node 132 is at voltage $V_m$, i.e., when switching node 132 is electrically coupled to intermediate power node 124, and second power transfer winding 130 is driven "low" when its respective switching node 132 is at zero volts relative to ground, i.e., when switching node 132 is electrically coupled to ground. Controller 112 generates control signal Φ2 so that first power stage 102 converts voltage $V_m$ at intermediate power node 124 to voltage $V_{out}$ at output power node 134, or vice versa.

Figure 3:
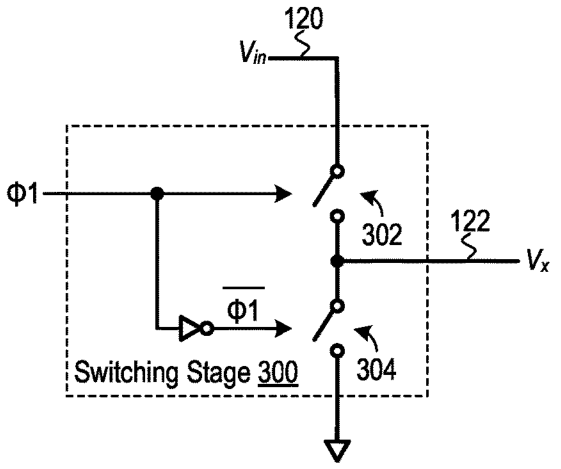
FIG. 3 is a schematic diagram of one possible embodiment of a switching stage of the FIG. 1 two-stage switching power converter.

FIG. 3 is a schematic diagram of a switching stage 300, which is one possible embodiment of switching stage 116 of FIG. 1. Switching stage 300 includes an upper switching device 302 and a lower switching device 304. Upper switching device 302 is electrically coupled between input power node 120 and switching node 122, and lower switching device 304 is electrically coupled between switching node 122 and ground. Upper switching device 302 switches in response to control signal Φ1 from controller 112, and lower switching device 304 switches in response to an inverted version of control signal Φ1 from controller 112. For example, in some embodiments, upper switching device 302 operates in its on (conductive) state when control signal Φ1 is asserted, and upper switching device 302 operates in its off (non-conductive state) when control signal Φ1 is de-asserted. Similarly, in some embodiments, lower switching device 304 operates in its on (conductive) state when control signal Φ1 is de-asserted, and lower switching device 304 operates in its off (non-conductive state) when control signal Φ1 is asserted. In some alternate embodiments, controller 112 generates a respective control signal (not shown) for each of upper switching device 302 and lower switching device 304, and lower switching device 304 is accordingly controlled by its own control signal, instead of by an inverted version of control signal Φ1. Each switching device 302 and 304 includes, for example, one or more transistors and optional driver circuitry for driving the one or more transistors.

Figure 4:
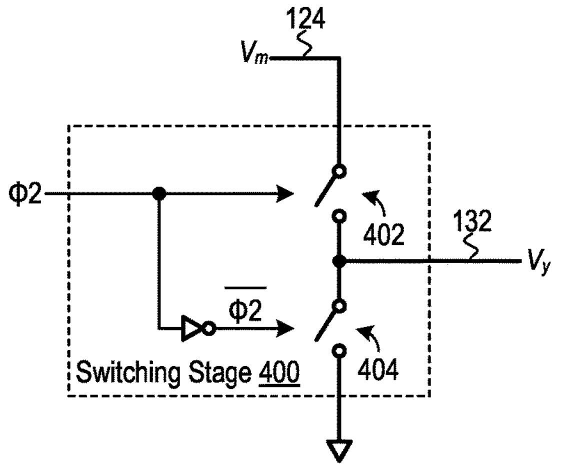
FIG. 4 is a schematic diagram of one possible embodiment of another switching stage of the FIG. 1 two-stage switching power converter.

FIG. 4 is a schematic diagram of a switching stage 400, which is one possible embodiment of switching stage 128 of FIG. 1. Switching stage 400 includes an upper switching device 402 and a lower switching device 404. Upper switching device 402 is electrically coupled between intermediate power node 124 and switching node 132, and lower switching device 404 is electrically coupled between switching node 132 and ground. Upper switching device 402 switches in response to control signal Φ2 from controller 112, and lower switching device 404 switches in response to an inverted version of control signal Φ2 from controller 112. For example, in some embodiments, upper switching device 402 operates in its on (conductive) state when control signal Φ2 is asserted, and upper switching device 402 operates in its off (non-conductive state) when control signal Φ2 is de-asserted. Similarly, in some embodiments, lower switching device 404 operates in its on (conductive) state when control signal Φ2 is de-asserted, and lower switching device 404 operates in its off (non-conductive state) when control signal Φ2 is asserted. In some alternate embodiments, controller 112 generates respective control signals (not shown) for each of upper switching device 402 and lower switching device 404, and lower switching device 404 is accordingly controlled by its own control signal, instead of by an inverted version of control signal Φ2. Each switching device 402 and 404 includes, for example, one or more transistors and optional driver circuitry for driving the one or more transistors Referring again to FIG. 1, controller 112 is configured to generate control signal Φ2 to control switching of second power stage 104 to regulate one or more parameters of two-stage switching power converter 100, such as using a pulse width modulation (PWM) technique or a pulse frequency modulation (PFM) technique. Examples of parameters of two-stage switching power converter 100 that could be regulated by control of second power stage 104, include, but are not limited to, magnitude of voltage $V_{in}$ at input power node 120, magnitude of voltage $V_{out}$ at output power node 134, magnitude of input current $I_{in}$ flowing into first power stage 102 from input power node 120, or magnitude of output current $I_{out}$ flowing out of second power stage 104 to output power node 134. Importantly, controller 112 is configured to generate control signal Φ1 so that first power stage 102 switches in a complementary manner with respect to second power stage 104. In particular, controller 112 is configured to generate control signal Φ1 such that (a) switching stage 116 drives first power transfer winding 118 low when switching stage 128 drives second power transfer winding 130 high and (b) switching stage 116 drives first power transfer winding 118 high when switching stage 128 drives second power transfer winding 130 low.

Figure 2A:
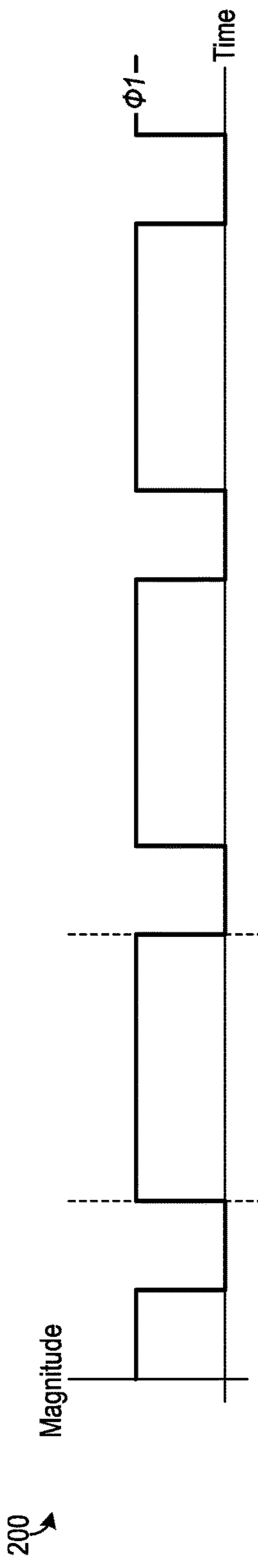
FIG. 2A is a graph of one example of a first control signal of the FIG. 1 two-stage switching power converter.
Figure 2B:
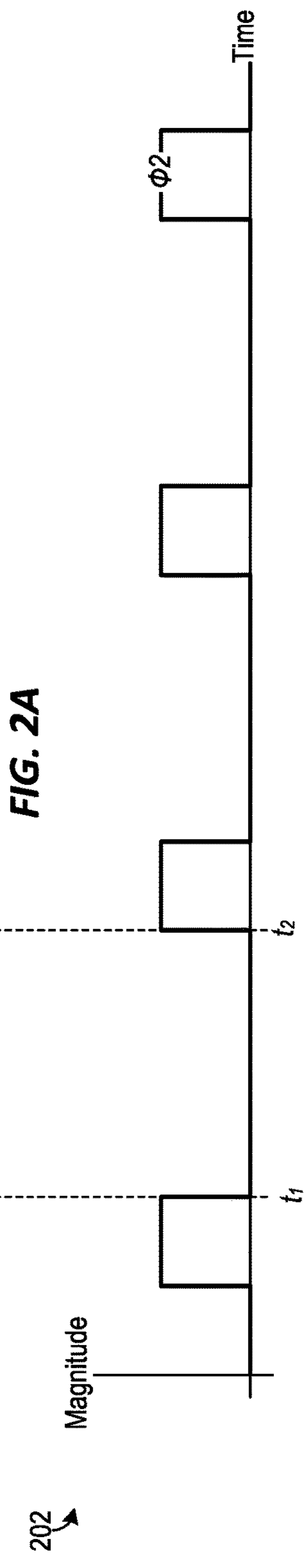
FIG. 2B is a graph of one example of a second control signal of the FIG. 1 two-stage switching power converter.

For example, FIGS. 2A and 2B are respective graphs 200 and 202 of magnitude versus time collectively illustrating one example of control signals Φ1 and Φ2 as generated by controller 112. Graphs 200 and 202 assume that (a) each of control signal Φ1 and Φ2 is asserted when in a logic high state and (b) each of switching stage 116 and 128 drives its respective power transfer winding 118 and 130 high in response to its respective control signal Φ1 and Φ2 being asserted. However, control signals Φ1 and Φ2 could have other polarities without departing from the scope hereof, and switching stages 116 and 128 could respond to respective control signals Φ1 and Φ2 in a different manner, as long as first power stage 102 switches in a complementary manner with respect to second power stage 104. Graph 200 includes a curve illustrating control signal Φ1, graph 202 includes a curve representing control signal Φ2, and graphs 200 and 202 have a common time base. As illustrated in FIGS. 2A and 2B, controller 112 generates control signal Φ1 so that it is complementary to control signal Φ2, thereby causing first power stage 102 to switch in a complementary manner with respect to second power stage 104. For example, at time $t_1$, control signal Φ1 changes from its de-asserted state to its asserted state in response to control signal Φ2 changing from its asserted state to its de-asserted state. As another example, at time $t_2$, control signal Φ1 changes from its asserted state to its de-asserted state in response to control signal Φ2 changing from its de-asserted state to its asserted state.

The fact that controller generates control signal Φ1 so that first power stage 102 switches in a complementary manner with respect to second power stage 104 causes ripple current associated with respective leakage inductances of first and second power transfer windings 118 and 130 to at least partially cancel, therefore advantageously helping minimize ripple current magnitude in two-stage switching power converter 100. It is desirable that a turns ratio of coupled inductor 106 be related to voltages of two-stage switching power converter 100 according to EQN. 1 below, to help realize maximum ripple current cancelation in two-stage switching power converter 100. However, significant ripple current cancelation may nevertheless be achieved even if EQN. 1 does not hold true.

$$N1/N2 = V_{in}/V_m \qquad \text{(EQN. 1)}$$

Voltage $V_{out}$ is related to voltage $V_{in}$ in two-stage switching power converter 100 according to EQN. 2 below, where D is duty cycle of second power stage 104.

$$D = \frac{1 \pm \sqrt{1 - 4\frac{V_{out}}{V_{in}}}}{2} \qquad \text{(EQN. 2)}$$

As evident from EQN. 2, two-stage switching power converter 100 may operate at two different possible duty cycles of second power stage 104 to achieve a given output voltage $V_{out}$. For example, consider FIG. 5, which is an example graph 500 of voltage gain versus duty cycle (D) in an embodiment of two-stage switching power converter 100. Graph 500 includes a curve representing gain $M_m$, where $M_m=V_m/V_{in}$, as well as a curve representing gain M, where $M=V_{out}/V_{in}$. Assume that it is desired that $V_{out}$ be 10% of $V_{in}$, which corresponds to a value of gain M of 0.1, which is represented by a dashed line 502 in FIG. 5. As evident from FIG. 5, there are two values of duty cycle D which achieve a gain M of 0.1, i.e., $D_1$ and $D_2$. Accordingly, second power stage 104 could operate at either duty cycle $D_1$ or duty cycle $D_2$ to achieve a voltage $V_{out}$ that is 10% of $V_{in}$., while first power stage 102 would operate at a complementary duty cycle of $(1-D_1)$ or $(1-D_2)$.

Figure 5:
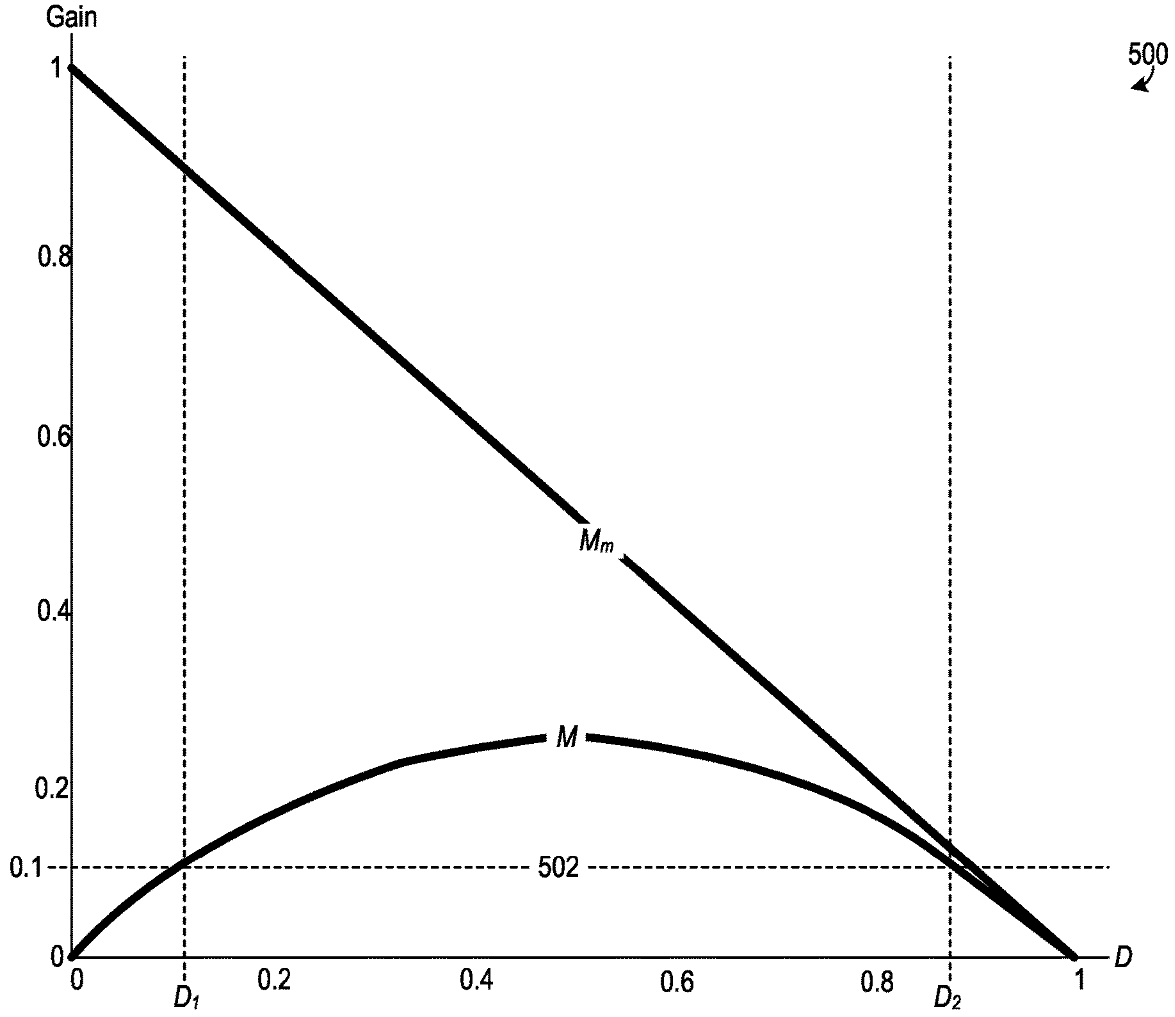
FIG. 5 is an example graph of gain versus duty cycle in one embodiment of the FIG. 1 two-stage switching power converter.

One possible drawback of two-stage switching power converter 100 is that gain of first power stage 102, or gain of second power stage 104, may be close to one, such that either first power stage 102 or second power stage 104 performs minimal voltage conversion, i.e., magnitude of its output voltage is close to magnitude of its input voltage. For example, if second power stage 104 operates at duty cycle $D_1$, gain of first power stage 102 is around 0.9, as shown in FIG. 5. As another example, if second power stage 104 operates at duty cycle $D_2$, gain of second power stage 104 will need to be close to one, as evident from the gain $M_m$ and gain M being almost identical to each other at duty cycle $D_2$, as shown in FIG. 5. Applicant has determined that such potential drawback can be mitigated, for example, by adding one or more phases to second power stage 104.

Figure 6:
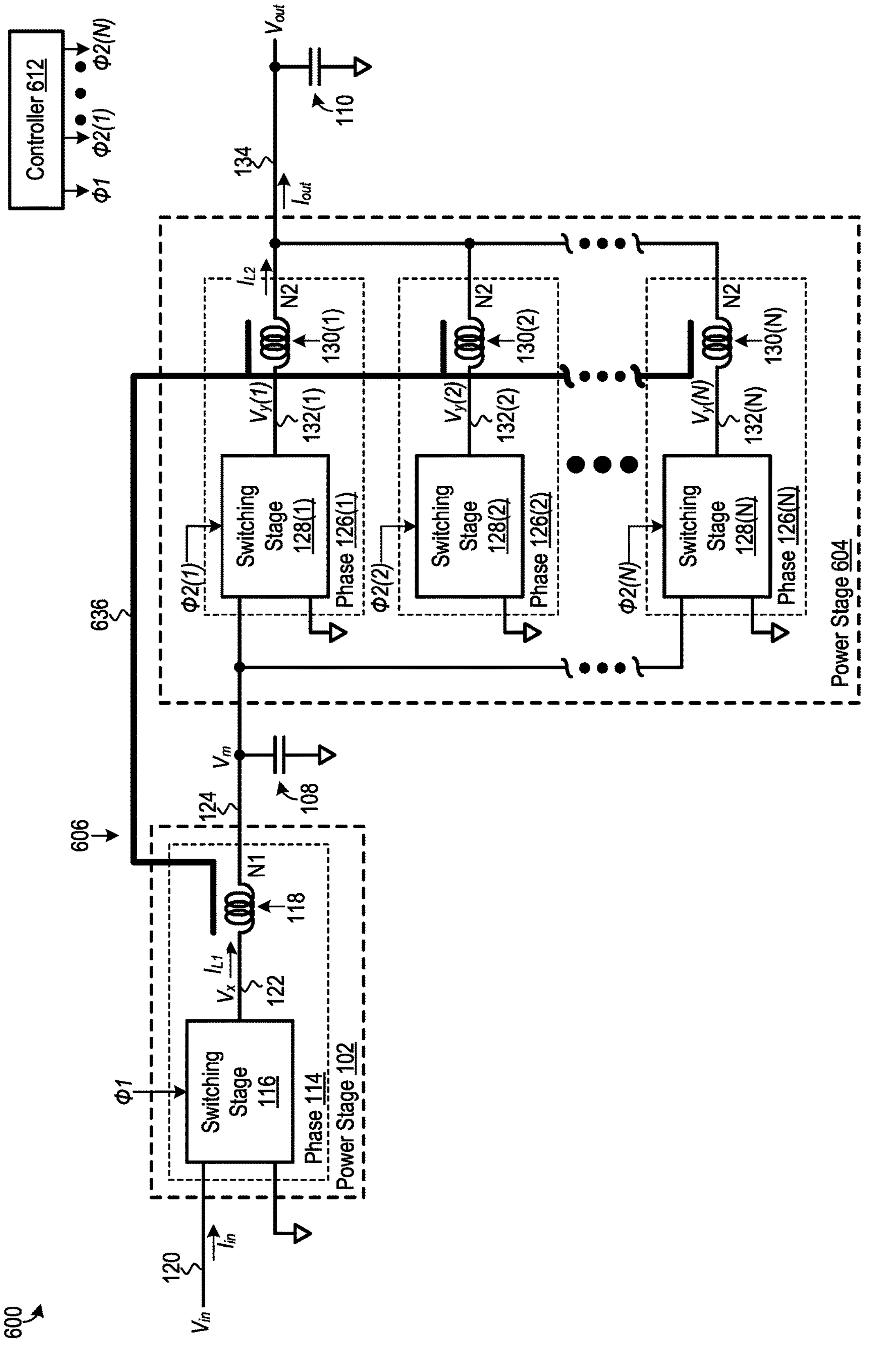
FIG. 6 is a schematic diagram of an alternate embodiment of the FIG. 1 two-stage switching power converter where a second power stage includes a plurality of phases.

For example, FIG. 6 is a schematic diagram of a two-stage switching power converter 600, which is an alternate embodiment of two-stage switching power converter 100 (FIG. 1) where second power stage 104 is replaced with a second power stage 604, coupled inductor 106 is replaced with a coupled inductor 606, and controller 112 is replaced with a controller 612. Second power stage 604 differs from second power stage 104 in that second power stage 604 includes N instances of phase 126 electrically coupled in parallel with each other between intermediate power node 124 and output power node 134, where N is an integer greater than one. In this document, specific instances of an item may be referred to by use of a numeral in parentheses (e.g. phase 126(1)) while numerals without parentheses refer to any such item (e.g. phases 126). Coupled inductor 606 is an alternate embodiment of coupled inductor 106 that further includes a respective second power transfer winding 130 for each phase 126, i.e., N second power transfer windings 130, as well as a magnetic core 636 in place of magnetic core 136. Magnetic core 636 differs from magnetic core 136 in that magnetic core 636 is configured to magnetically couple additional power transfer windings to each other, i.e., magnetic core 636 is configured to magnetically couple first power transfer winding 118 to each second power transfer winding 130, as well as magnetically couple each second power transfer winding 130 to each other second power transfer winding 130. First power transfer winding 118 forms a quantity of turns equal to N1, and each second power transfer winding 130 forms a quantity of turns equal to N2. All windings of coupled inductor 606 are negatively coupled to each other, similar to the coupled inductor 106.

Controller 612, which is an alternate embodiment of controller 112, differs from controller 112 in that controller 612 is configured to generate a respective control signal Φ2 for each phase 126, as well as a control signal Φ1 for first power stage 102. Controller 612 is configured to generate control signals Φ2 to control switching of each phase 126 of second power stage 604 to regulate at least one parameter of two-stage switching power converter, e.g., magnitude of $V_{in}$, magnitude of $V_{out}$, magnitude of $I_{in}$, or magnitude of $I_{out}$, such as using a PWM or PFM technique. In certain embodiments, controller 612 is configured to generate control signals Φ2 such that each control signal Φ2 is asserted Φ2/N degrees out-of-phase with respect to adjacent control signals in phase. Controller 612 is configured to generate control signal Φ1 such that first power stage 102 switches in a complementary manner with respect to each phase 126 of second power stage 604. For example, if a given phase 126 drives its respective second power transfer winding 130 high, first power stage 102 drives first power transfer winding 118 low. As another example, if a given phase 126 drives its respective second power transfer winding 130 low, first power stage 102 drives first power transfer winding 118 high.

Figure 7:
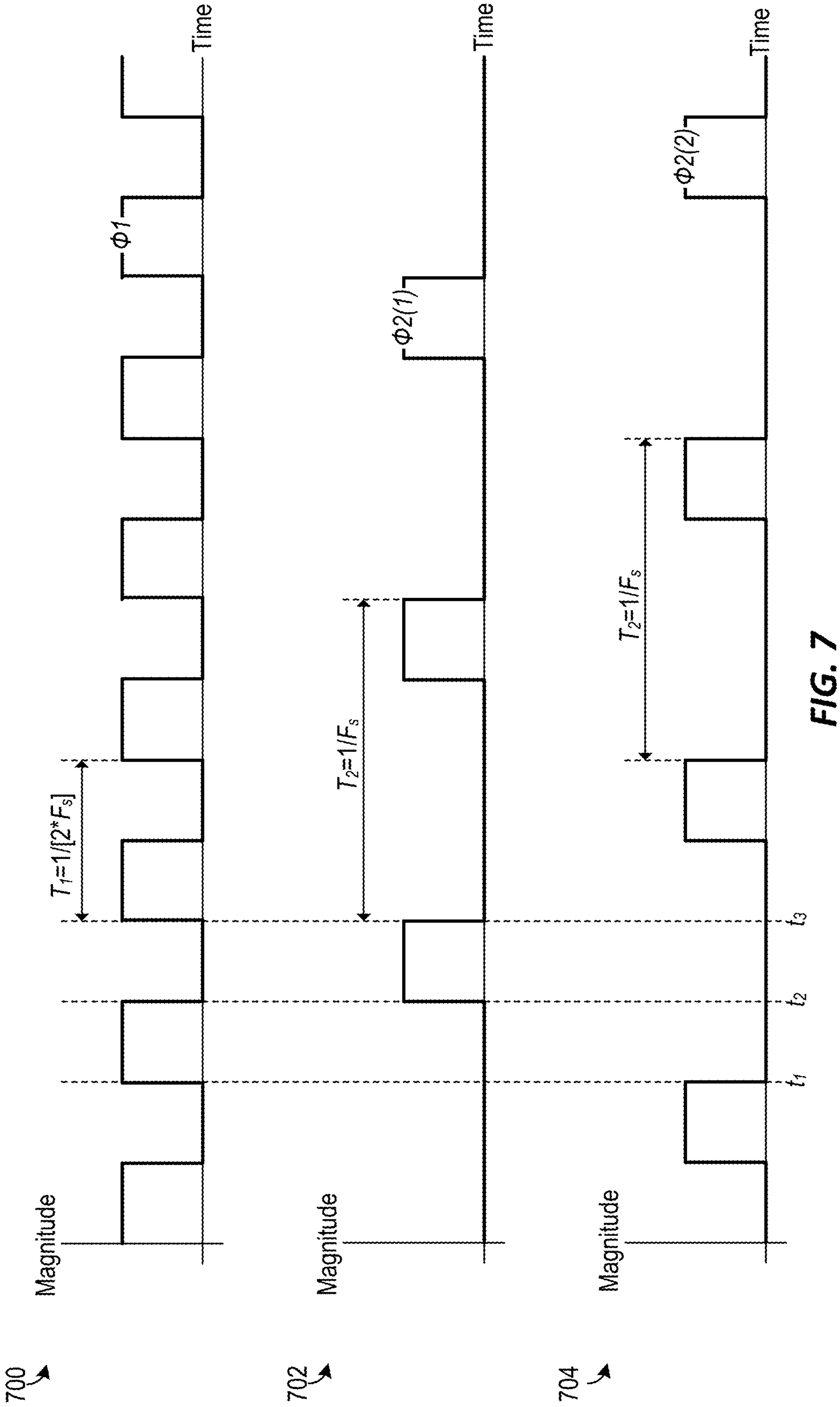
FIG. 7 includes three graphs collectively illustrating one example of a first control signal, a second control signal, and a third control signal, of the FIG. 6 two-stage switching power converter.

FIG. 7 includes three graphs 700, 702, and 704 of magnitude versus time collectively illustrating one example of control signals Φ1, Φ2(1), and Φ2(2) as generated by controller 612 in embodiment of two-stage switch power converter 600 where N=2, i.e., where second power stage 604 includes two phases 126. Graphs 700, 702, and 704 assume that (a) each of control signals Φ1, Φ2(1), and Φ2(2) is asserted when in a logic high state and (b) each of phase 114, phase 126(1), and phase 126(2) drives its respective power transfer winding 118, 130(1) and 130(2) high in response to its respective control signal Φ1, Φ2(1), and Φ2(2) being asserted. However, control signals Φ1, Φ2(1), and Φ2(2) could have other polarities without departing from the scope hereof, and phases 114 and 126 could respond to respective control signals Φ1, Φ2(1), and Φ2(2) in a different manner, as long as first power stage 102 switches in a complementary manner with respect to second power stage 604. Graph 700 includes a curve illustrating control signal 1, graph 702 includes a curve representing control signal Φ2(1), graph 704 includes a curve representing control signal Φ2(2), and graphs 702, 704, and 706 have a common time base. As illustrated in FIG. 7, controller 612 generates control signal Φ1 so that it is complementary to each of control signal Φ2(1) and control signal Φ2(2), thereby causing first power stage 102 to switch in a complementary manner with respect to second power stage 604. For example, at time $t_1$, control signal Φ1 changes from its de-asserted state to its asserted state in response to control signal Φ2(2) changing from its asserted state to its de-asserted state. As another example, at time $t_2$, control signal Φ1 changes from its asserted state to its de-asserted state in response to control signal Φ2(1) changing from its de-asserted state to its asserted state. As an additional example, at time $t_3$, control signal Φ1 changes from its de-asserted state to its asserted state in response to control signal Φ2(1) changing from its asserted state to its de-asserted state.

The fact that controller 612 generates control signal Φ1 so that first power stage 102 switches in a complementary manner with respect to second power stage 604 causes ripple current associated with respective leakage inductances of first and second power transfer windings 118 and 130 to at least partially cancel, therefore advantageously helping minimize ripple current magnitude in two-stage switching power converter 600. It is desirable that a turns ratio of coupled inductor 606 be related to voltages of two-stage switching power converter 100 according to EQN. 1 above, to help realize maximum ripple current cancelation in switching power converter 100. However, significant ripple current cancelation may nevertheless be achieved even if EQN. 1 does not hold true.

Voltage $V_{out}$ is related to voltage $V_{in}$ in two-stage switching power converter 600 according to EQN. 3 below, where D is duty cycle of second power stage 604.

$$D = \frac{1 \pm \sqrt{1 - 4\frac{V_{out}}{V_{in}} \cdot N}}{2 \cdot N} \quad \text{(EQN. 3)}$$

As evident from EQN. 3, duty cycle D of second power stage 604 is a function of N, i.e., number of phases 126, as well as input voltage $V_{in}$ and output voltage $V_{out}$. Additionally, two-stage switching power converter 600 may operate a two different possible duty cycles of second power stage 604 to achieve a given output voltage $V_{out}$. For example, consider FIG. 8, which is an example graph 800 of gain versus duty cycle in an embodiment of two-stage switching power converter 600 where N is equal to two. Graph 800 includes a curve representing gain $M_m$, where $M_m=V_m/V_{in}$, as well as a curve representing gain M, where $M=V_{out}/V_{in}$. Assume that it is desired that $V_{out}$ be 10% of $V_{in}$, which corresponds to a value of gain M of 0.1, which is represented by a dashed line 802 in FIG. 8. As evident from FIG. 8, there are two values of duty cycle D which achieve a gain M of 0.1, i.e., $D_1$ and $D_2$.

Figure 8:
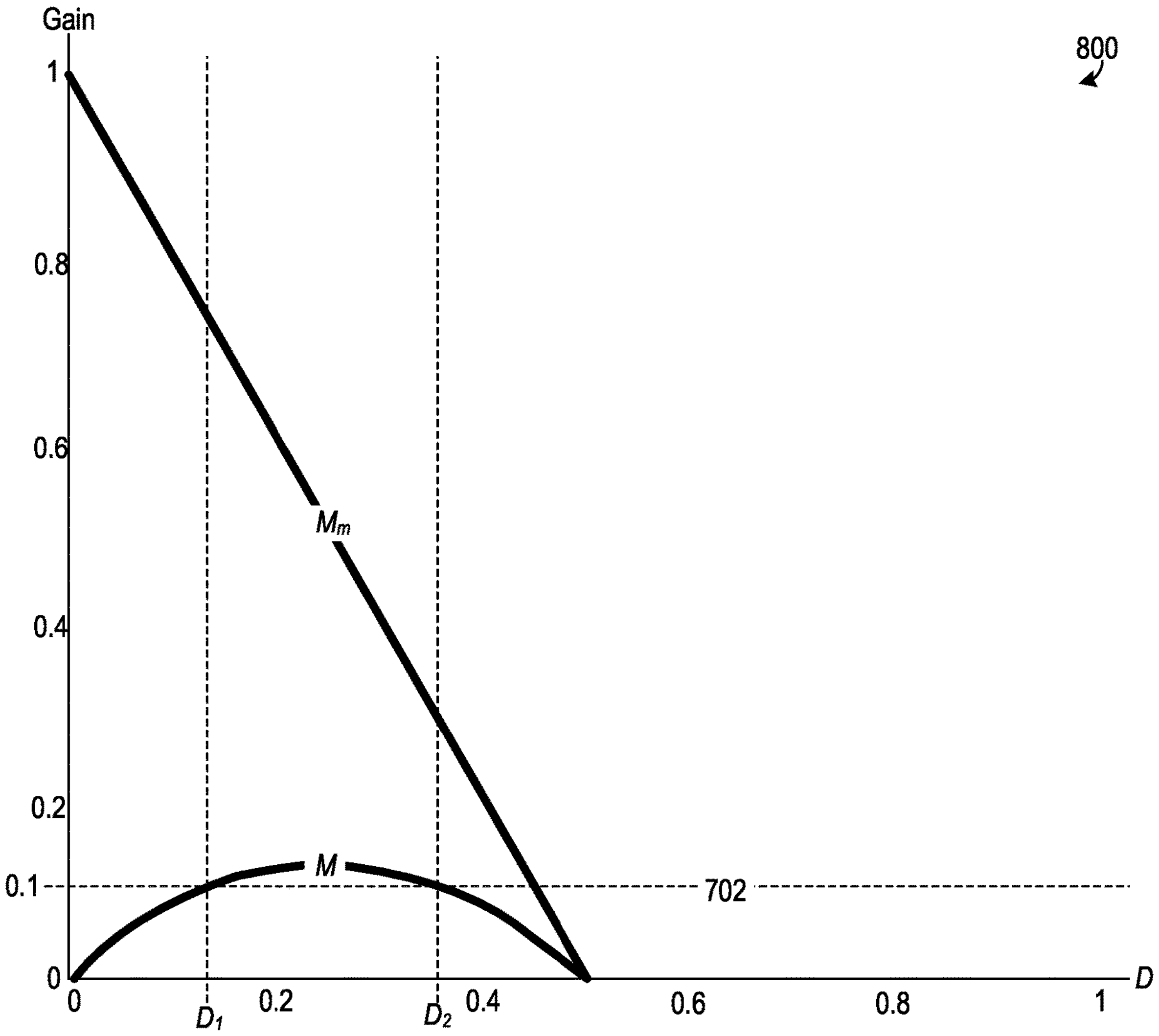
FIG. 8 is an example graph of gain versus duty cycle in one embodiment of the FIG. 6 two-stage switching power converter.

As can be appreciated by comparing FIG. 8 to FIG. 5, two-stage switching power converter 600 produces smaller power stage gain than two-stage switching power converter 100 at a given value of D, when control signals Φ1 and Φ2 are complementary as described above. Furthermore, the power stage gain in two-stage switching power converter 600 decreases with increasing value of N, i.e., the power stage gain decreases with increasing number of phases 126 in second power stage 604. Therefore, two-stage switching power converter 600 is limited in how large magnitude of output voltage $V_{out}$ can be, as evident from the peak value of gain M being about 0.15 in the example of FIG. 5, which limits output voltage $V_{out}$ to at most of around 15% of voltage $V_{in}$. Additionally, the maximum achievable magnitude of output voltage $V_{out}$ decreases with increasing values of N in two-stage switching power converter 600.

FIGS. 9A-9H collectively illustrate results of a simulation of one embodiment of two-stage switching power converter 600 where N=6, $V_{in}$=48 volts, $V_{out}$=0.8 volt, a ratio of N1/N2 is 1.43, magnetizing inductance of coupled inductor 606 is 275 nanohenrys (nH) in second power transfer windings 130, leakage inductance of each second power transfer winding 130 of coupled inductor 606 is 15 nH, and $F_s$=400 Kilohertz (KHz), where $F_s$ is switching frequency of second power stage 604. The magnetizing inductance and leakage inductance of first power transfer winding 118 of coupled inductor 606 is expected to be approximately $(N1/N2)^2$ larger than corresponding values of second stage power transfer windings 130. FIGS. 9A-9H are graphs 902, 904, 906, 908, 910, 912, 914, and 916 which have a common time base. Graphs 902-914 are of signal magnitude versus time, and graphs 902-914 include curves representing control signal Φ1, control signal Φ2(1), control signal Φ2(2), control signal Φ2(3), control signal Φ2(4), control signal Φ2(5), and control signal Φ2(6), respectively, where each of the aforementioned control signals is asserted when in a logic high state. Graph 916 is of current in amperes versus time. Graph 916 includes a curve representing current $I_{L1}$ through first power transfer winding 118 and a curve representing current $I_{L2}$ through second power transfer winding 130(1) (see FIG. 6). It should be noted that control signal Φ1 is complementary to each of control signals Φ2(1) through Φ2(6).

FIGS. of 9A-9H assume that second power stage 604 operates at a first duty cycle of two possible duty cycles which achieve aforementioned voltage conversion, i.e., converting $V_{in}$ of 48 volts to $V_{out}$ of 0.8 volt. Voltage $V_m$ under the simulated conditions of FIGS. 9A-9H is 42 volts. As evident from FIG. 9H, current $I_{L2}$ flowing through second power transfer winding 130(1) includes only a triangular ripple current component, i.e., higher frequency ripple current at $N*F_s$ is completely canceled in second power transfer winding 130(1). Additionally, second power transfer windings 130(2) through 130(6) will have respective current waveforms that are similar to that of second power transfer winding 130(1), but with the corresponding phase shift. The cancelation of high frequency ripple current in second power transfer windings 130, as well as significant peak to peak ripple current reduction, advantageously promotes high efficiency of two-stage switching power converter 600 and low likelihood of two-stage switching power converter 600 causing electromagnetic interference (EMI) with external circuitry.

FIGS. 10A-10H illustrate results of a simulation of one embodiment of two-stage switching power converter 600 under the same conditions as discussed above with respect to FIGS. 9A-9H except that (a) second power stage 604 operates at the second duty cycle of the two possible duty cycles which achieves aforementioned voltage conversion, and (b) the ratio of N1/N2 is 8.73 instead of 1.43. Voltage $V_m$ under the simulated conditions of FIGS. 10A-10H is 5.5 volts instead of 42 volts. Graphs 1002-1014 are of signal magnitude versus time, and graphs 1002-1014 include curves representing control signal Φ1, control signal Φ2(1), control signal Φ2(2), control signal Φ2(3), control signal Φ2(4), control signal Φ2(5), and control signal Φ2(6), respectively, where each of the aforementioned control signals is asserted when in a logic high state. Graph 1016 is of current in amperes versus time. Graph 1016 includes a curve represent current $I_{L1}$ through first power transfer winding 118 and a curve representing current $I_{L2}$ through second power transfer winding 130(1). It should be noted that control signal Φ1 is complementary to each of control signals Φ2(1) through Φ2(6).

Figure 10A:
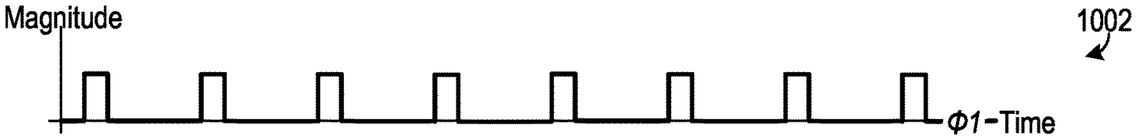
FIGS. 10A, 10B, 10C, 10D, 10E, 10F, 10G, and 10H are graphs collectively illustrating another example of simulated operation of the FIG. 6 two-stage switching power converter.
Figure 10B:
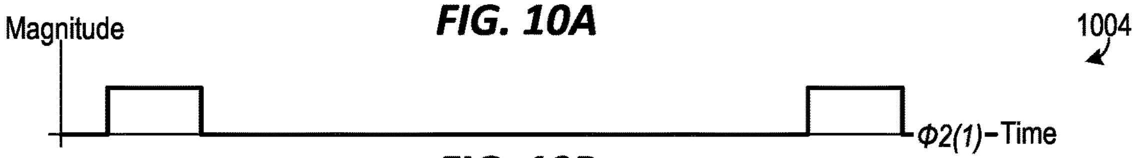
Figure 10C:
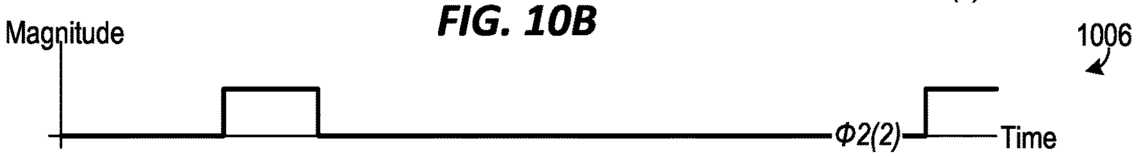
Figure 10D:
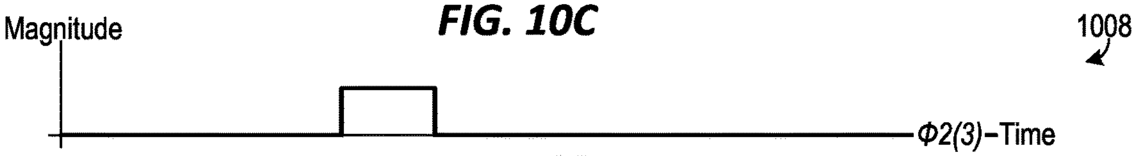
Figure 10E:
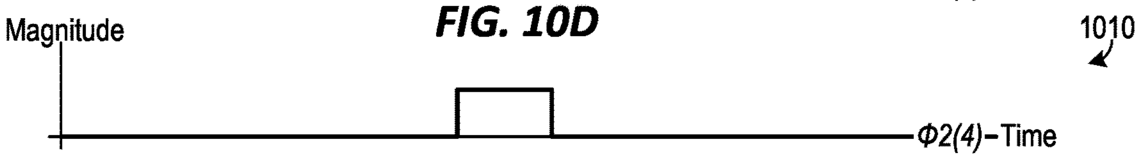
Figure 10F:
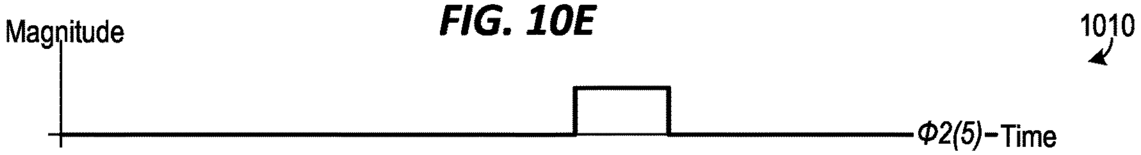
Figure 10G:
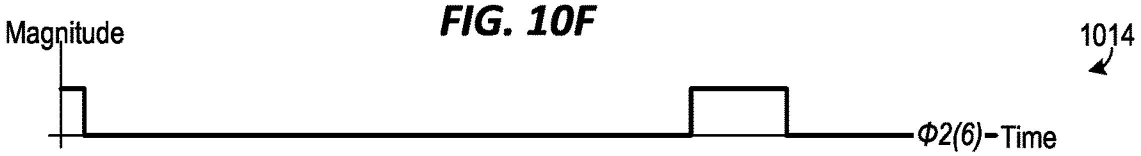
Figure 10H:
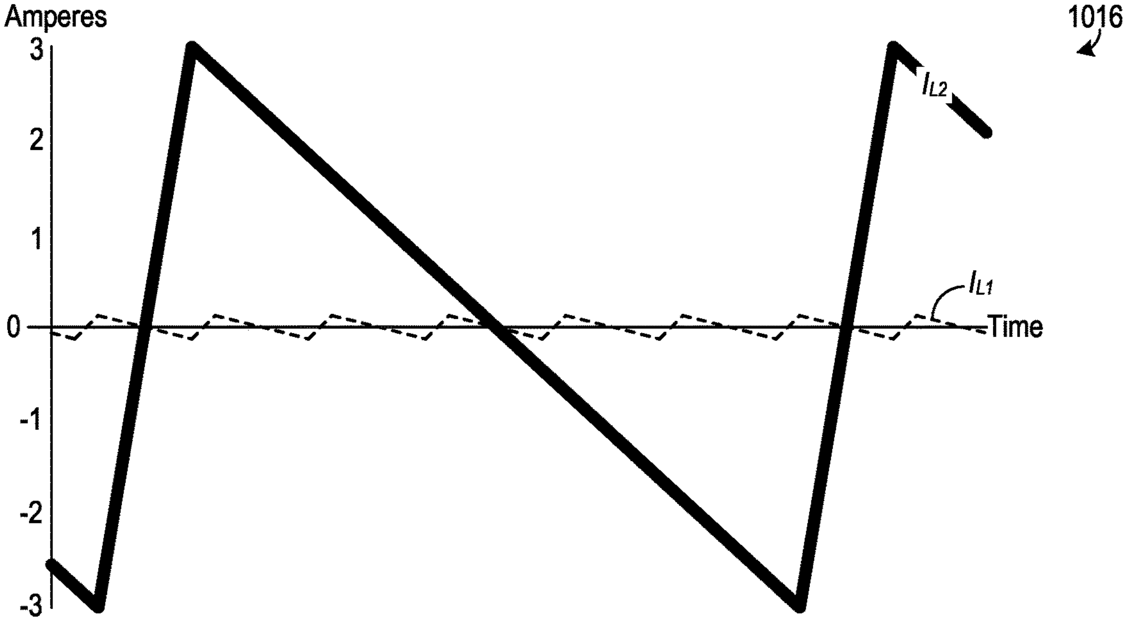

As evident from FIG. 10H, current flowing through second power transfer winding 130(1) includes only a triangular ripple current component, i.e., higher frequency ripple current at $N*F_s$ is completely canceled in second power transfer winding 130(1). The peak-to-peak current ripple amplitude in second power stage 604 is also significantly reduced. Additionally, ripple current advantageously substantially cancels in first power transfer winding 118, as evident from the small ripple magnitude of current $I_{L1}$ in the simulated conditions of FIGS. 10A-10H.

Figure 9A:
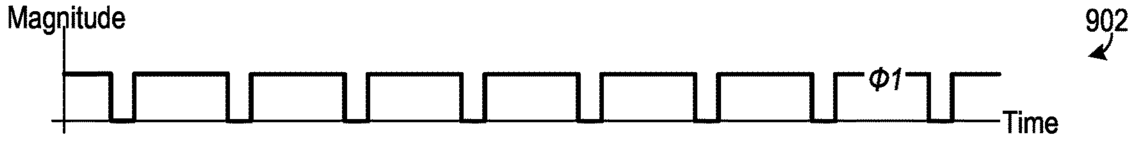
FIGS. 9A, 9B, 9C, 9D, 9E, 9F, 9G, and 9H are graphs collectively illustrating one example of simulated operation of the FIG. 6 two-stage switching power converter.
Figure 9B:
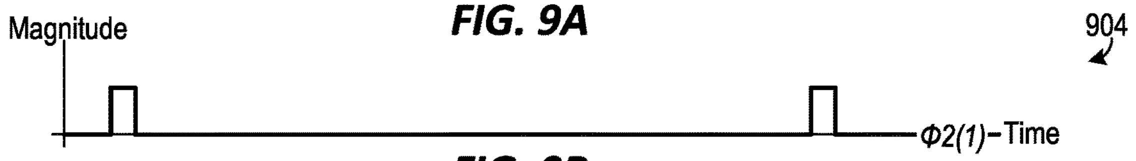
Figure 9C:
Figure 9D:
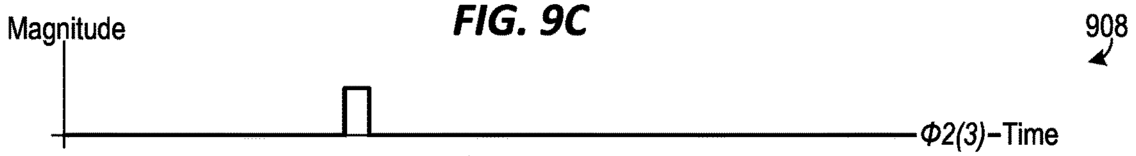
Figure 9E:
Figure 9F:
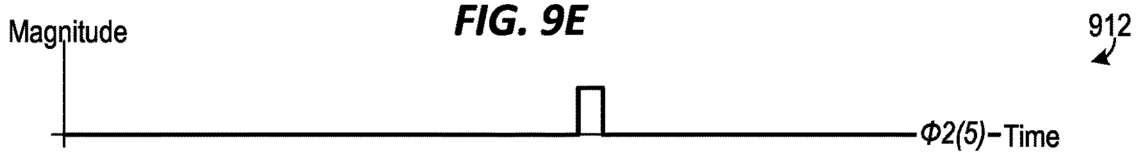
Figure 9G:
Figure 9H:
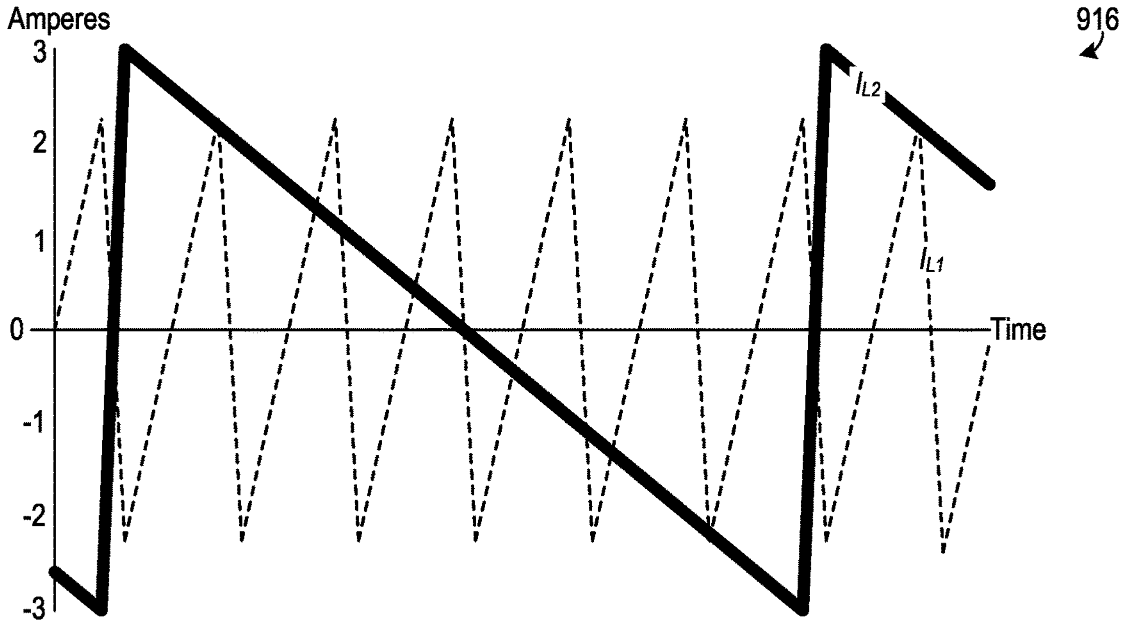

Operating two-stage switching power converter 600 such that voltage $V_m$ has a small magnitude promotes low magnitude of ripple in current $I_{L1}$ flowing through first power transfer winding 118, such as demonstrated by comparing FIG. 10H to FIG. 9H. Lowered voltage $V_m$ potentially enables low voltage rating for the switching devices in second power stage 604, significantly improving semiconductor parameters where the currents are high due to low $V_0$, which is typically much smaller than $V_m$ or $V_{in}$. Magnitude of voltage $V_m$ can be reduced under given operating conditions by changing the topology of first power stage 102 in a manner which achieves a lower magnitude of voltage $V_m$, while operating first power stage 102 such that it switches in a complementary manner with respect to each phase 126 of second power stage 104.

Figure 11:
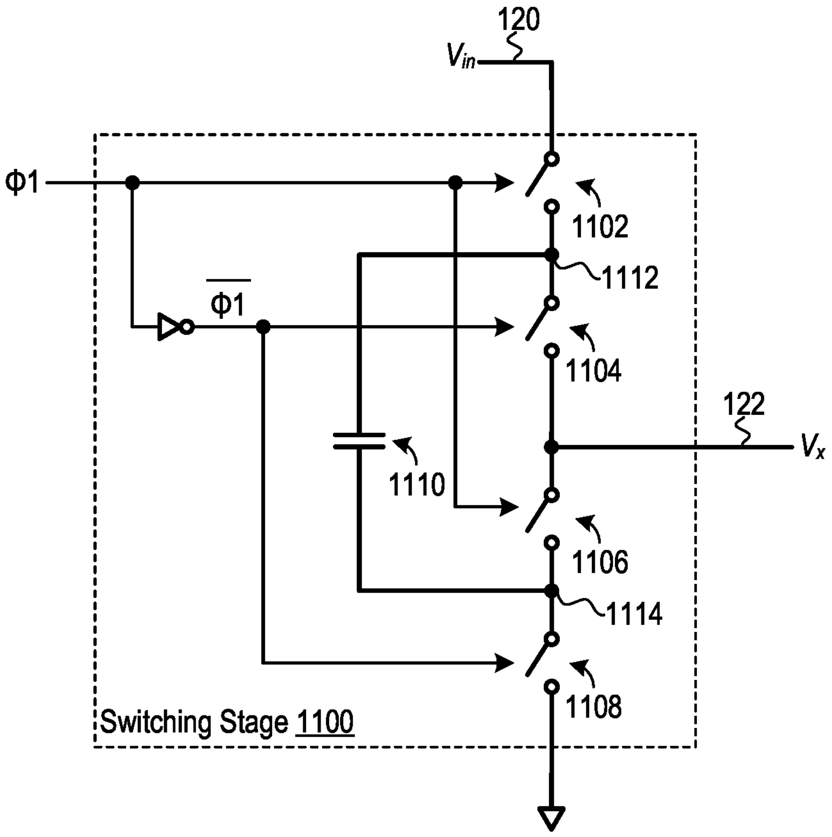
FIG. 11 is a schematic diagram of an alternate embodiment of a switching stage of the FIG. 6 two-stage switching power converter.

For example, in one alternate embodiment of two-stage switching power converter 600, switching stage 116 is replaced with a switching stage 1100 of FIG. 11, such that first power stage 102 is modified to have a three-level buck topology, which may achieve a lower magnitude of voltage $V_m$ at a given duty cycle of second power stage 604. Switching stage 1100 includes a first upper switching device 1102, a second upper switching device 1104, a first lower switching device 1106, a second lower switching device 1108, and a flying capacitor 1110. First upper switching device 1102 is electrically coupled between input power node 120 and a first flying node 1112, and second upper switching device 1104 is electrically coupled between first flying node 1112 and switching node 122. First lower switching device 1106 is electrically coupled between switching node 122 and a second flying node 1114, and second lower switching device 1108 is electrically coupled between second flying node 1114 and ground. Flying capacitor 1110 is electrically coupled between first flying node 1112 and second flying node 1114. Each of first upper switching device 1102 and first lower switching device 1106 switches in response to control signal Φ1 from controller 612, and each of second upper switching device 1104 and second lower switching device 1108 switches in response to an inverted version of control signal Φ1 from controller 612.

Referring again to FIG. 6, first power stage 102 switches at a frequency of $N*F_s$, where $F_s$ is the switching frequency of second power stage 604. For instance, in the example of FIG. 7 where N is equal to two, control signal Φ2(1) which has a period $T_2$ and a frequency $F_s$. Control signal Φ1, in contrast, has a period of $T_1$ and a switching frequency $2*F_s$. Consequently, switching frequency of first power stage 102 can be high, particularly in embodiments of two-stage switching power converter 600 where N is large. High switching frequency of first power stage 102 may be undesirable, as switching losses typically increase with increasing switching frequency. High switching losses of first power stage 102 may be particularly acute in embodiments of switching stage 116 including transistors having a high voltage rating, as transistor parasitic capacitance, which contributes to switching losses by slowing switching speed, typically increases with increasing transistor voltage rating.

Figure 12:
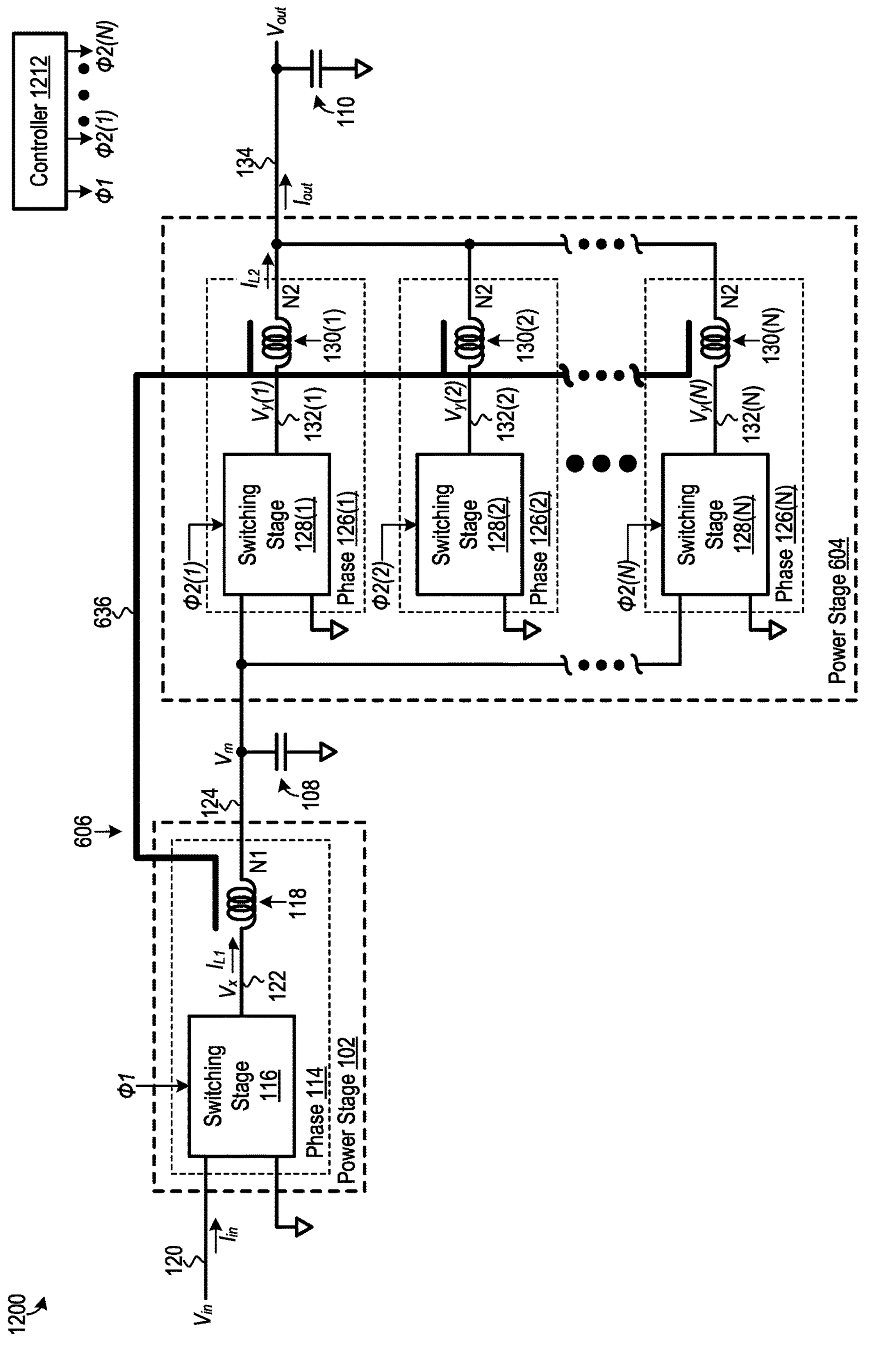
FIG. 12 is a schematic diagram of an alternate embodiment of the FIG. 6 two-stage switching power converter that is configured to successively assert control signals for controlling respective phases of a second power stage of the two-stage switching power converter.

Applicant has determined that switching frequency of first power stage 602 may be reduced, e.g., to the same switching frequency as second power stage 604, by modifying controller 612 to assert control signals Φ2 during a given switching interval, e.g., during a given switching period, of second power stage 604 without deadtime between successive assertion of control signals Φ2. For example, FIG. 12 is a schematic diagram of a two-stage switching power converter 1200, which is an alternate embodiment of two-stage switching power converter 600 where controller 612 is replaced with a controller 1212. Controller 1212 is like controller 612 except that controller 1212 is configured to generate control signals Φ2 so that control signals Φ2 are asserted in a given switching period of second power stage 604 without deadtime between successive assertion of control signals Φ2. Stated differently, controller 612 is configured to assert each control signal Φ2 immediately after asserting its preceding control signal Φ2 in a given switching period of second power stage 604. Consequently, phases 126 switch in each switching period of second power stage 604 without deadtime between successive switching of phases 126. Controller 1212 therefore asserts control signal Φ1 only once during each switching period, and first power stage 102 consequently switches at the same frequency as second power stage 604, instead of at N times the switching frequency of second power stage 604.

Figure 13:
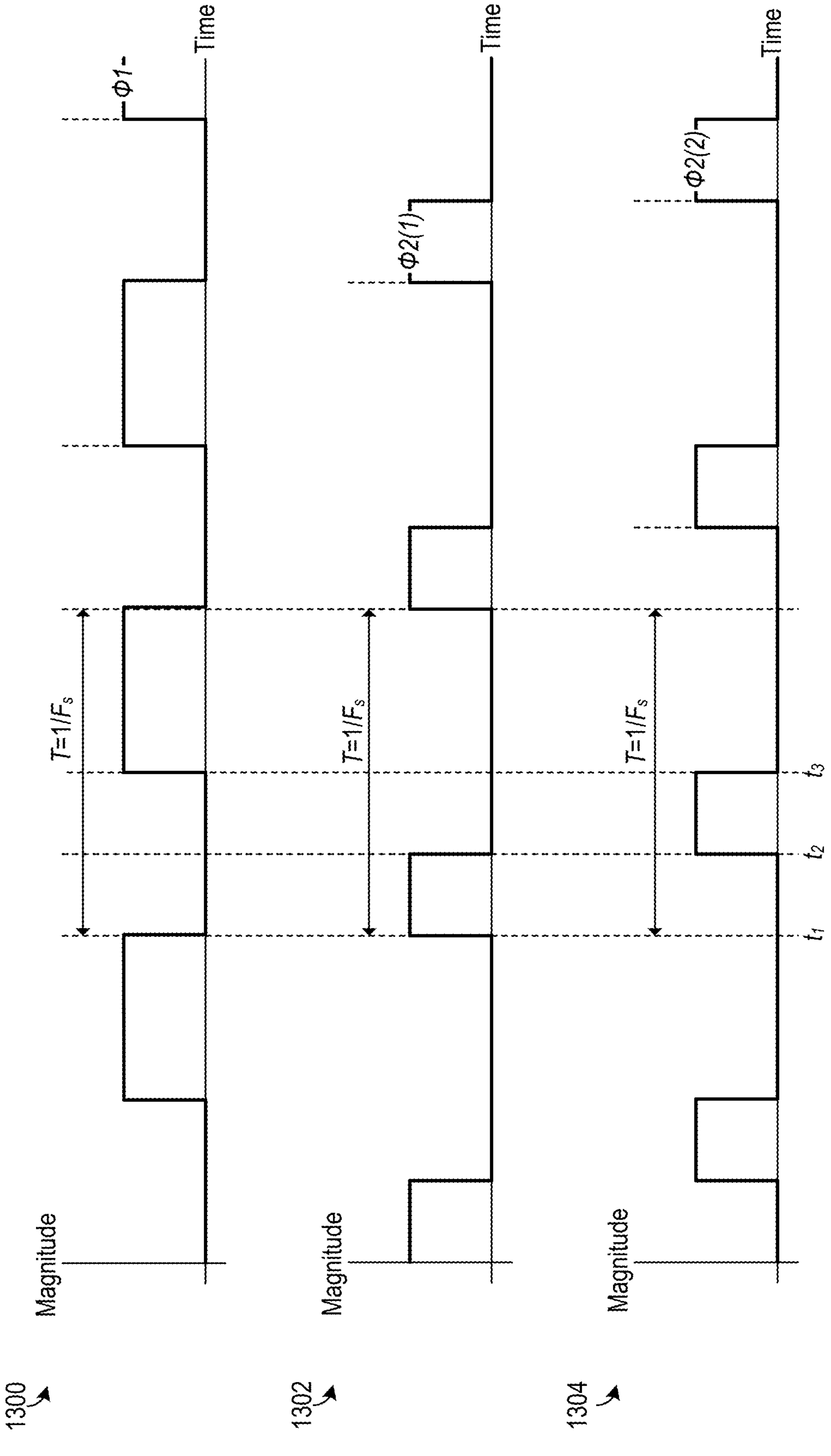
FIG. 13 includes three graphs collectively illustrating one example of a first control signal, a second control signal, and a third control signal, of the FIG. 12 two-stage switching power converter.

FIG. 13 includes three graphs 1300, 1302, and 1304 of magnitude versus time collectively illustrating one example of control signals Φ1, Φ2(1), and Φ2(2) as generated by controller 1212 in embodiment of two-stage switching power converter 1200 where N=2, i.e., where second power stage 604 includes two phases 126. Graphs 1300, 1302, and 1304 assume that (a) each of control signals Φ1, Φ2(1), and Φ2(2) is asserted when in a logic high state and (b) each of phase 114, phase 126(1), and phase 126(2) drives its respective power transfer winding 118, 130(1) and 130(2) high in response to its respective control signal Φ1, Φ2(1), and Φ2(2) being asserted. However, control signals Φ1, Φ2(1), and Φ2(2) could have other polarities without departing from the scope hereof, and phases 114 and 126 could respond to respective control signals Φ1, Φ2(1), and Φ2(2) in a different manner, as long as first power stage 102 switches in a complementary manner with respect to each phase 126 of second power stage 604. Graph 1300 includes a curve illustrating control signal Φ1, graph 1302 includes a curve representing control signal Φ2(1), graph 1304 includes a curve representing control signal Φ2(2), and graphs 1300, 1302, and 1304 have a common time base.

As illustrated in FIG. 13, controller 1212 generates control signals Φ2 so that the control signals are asserted in a given switching period of second power stage 604 without deadtime between successive assertion of control signals Φ2. For example, consider switching period T of second power stage 604, as illustrated in graphs 1302 and 1304. Controller 1212 asserts control signals Φ2 in switching period T without deadtime between successive assertion of control signals Φ2. In particular, controller 1212 asserts control signal Φ2(1) at time $t_1$, and controller assets control signal Φ2(2) at time $t_2$ while also de-asserting control signal Φ2(1), such that there is no deadtime between assertion of control signals Φ2(1) and Φ2(1) during switching period T. Consequently, phases 126(1) and 126(2) switch in each switching period T without deadtime between successive switching of phases 126(1) and 126(2).

Controller 1212 additionally asserts control signal Φ1 such that first power stage 102 switches in a complementary manner with respect to each phase 126 of second power stage 604. Control signal Φ1 does not change state at time 12 due to controller 1212 immediately asserting control signal Φ2(2) in response to de-assertion control signal Φ2(1), and control signal Φ1 is therefore only asserted once during switching period T, i.e., at time $t_3$ after each control signal Φ2 has been asserted in switching period T. Consequently, first power stage 102 advantageously switches at the same switching frequency ($F_s$) as second power stage 604, as illustrated in FIG. 13. The manner in which controller 1212 generates controls signals Φ1 and Φ2 may result in irregular ripple current associated with magnetizing inductance of coupled inductor 606, but a large value of the magnetizing inductance helps minimize this irregularity in ripple current.

Figure 14:
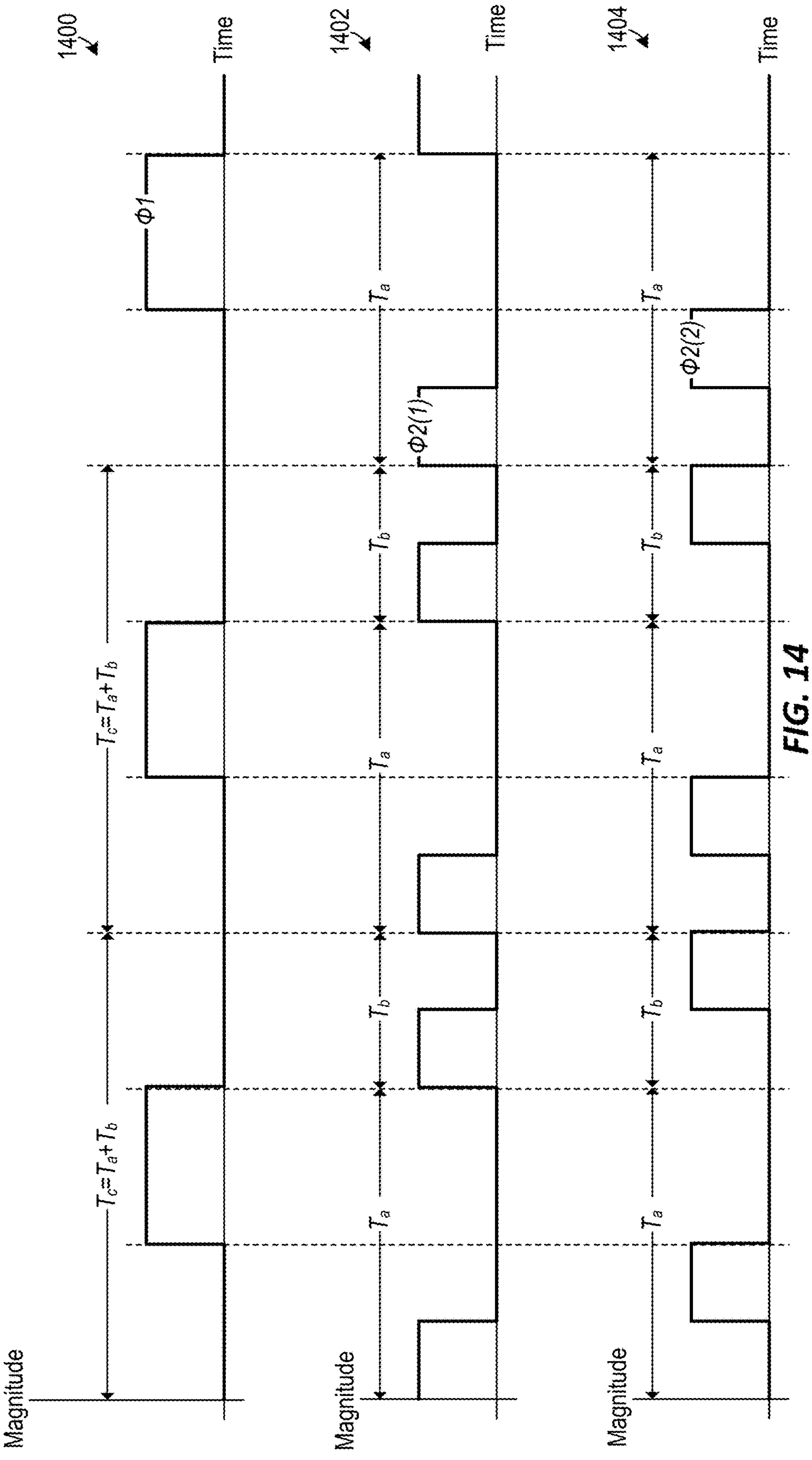
FIG. 14 includes three graphs collectively illustrating one example of a first control signal, a second control signal, and a third control signal, in an alternate embodiment of the FIG. 12 two-stage switching power converter.

Controller 1212 could be modified so that control signal Φ1 is not asserted during every switching interval of second power stage 604, such that first power stage 102 skips some switching intervals, to further reduce switching losses in first power stage 102. For example, controller 1212 could be modified to assert control signal Φ1 once during every other switching interval of second power stage 104, once during every third switching interval of second power stage 604, once during every fourth switching interval of second power stage 604, etc. For instance, FIG. 14 includes three graphs 1400, 1402, and 1404 of magnitude versus time collectively illustrating one example of control signals Φ1, Φ2(1), and Φ2(2) as generated by an alternate embodiment of controller 1212 configured to assert control signal Φ1 once during every other switching interval of second power stage 604. Graphs 1400, 1402, and 1404 assume an embodiment of two-stage switch power converter 1200 where N=2, i.e., where second power stage 604 includes two phases 126. Graphs 1400, 1402, and 1404 additionally assume that (a) each of control signals Φ1, Φ2(1), and Φ2(2) is asserted when in a logic high state and (b) each of phase 114, phase 126(1), and phase 126(2) drives its respective power transfer winding 118, 130(1) and 130(2) high in response to its respective control signal Φ1, Φ2(1), and Φ2(2) being asserted. However, control signals Φ1, Φ2(1), and Φ2(2) could have other polarities without departing from the scope hereof, and phases 114 and 126 could respond to respective control signals Φ1, Φ2(1), and Φ2(2) in a different manner, as long as first power stage 102 switches in a complementary manner with respect to each phase 126 second power stage 604. Graph 1400 includes a curve illustrating control signal Φ1, graph 1402 includes a curve representing control signal Φ2(1), graph 1404 includes a curve representing control signal Φ2(2), and graphs 1402, 1404, and 1406 have a common time base.

As illustrated in graphs 1402 and 1404, controller 1212 generates control signals Φ2 so that the control signals are asserted in a given switching interval of second power stage 604 without deadtime between successive assertion of control signals Φ2, in a manner analogous to that discussed above with respect of FIG. 13. Additionally, controller 1212 generates control signals Φ2 such that control signals Φ2 have alternating switching intervals, i.e., odd switching intervals $T_a$ and even switching intervals $T_b$, where odd switching intervals $T_a$ have a longer time duration than even switching intervals $T_b$. However, controller 1212 asserts control signal Φ1 only during odd switching intervals $T_a$ of second power stage 604. Accordingly, first power stage 102 skips even switching intervals $T_b$ of second power stage 604. Additionally, controller 1212 asserts control signal Φ1 such that first power stage 102 switches in a complementary manner with respect to each phase 126 of second power stage 604, in each odd switching interval $T_a$. Consequently, first power stage 102 has a switching period $T_c$ that is equal to the sum of switching intervals $T_a$ and $T_b$, resulting in first power stage 102 having a lower switching frequency than second power stage 604, thereby further promoting low switching losses in first power stage 102. Time duration of even switching intervals $T_b$ differs from time duration of odd switching intervals $T_a$ to compensate for control signal Φ1 not being asserted in even switching intervals $T_b$.

Figure 15:
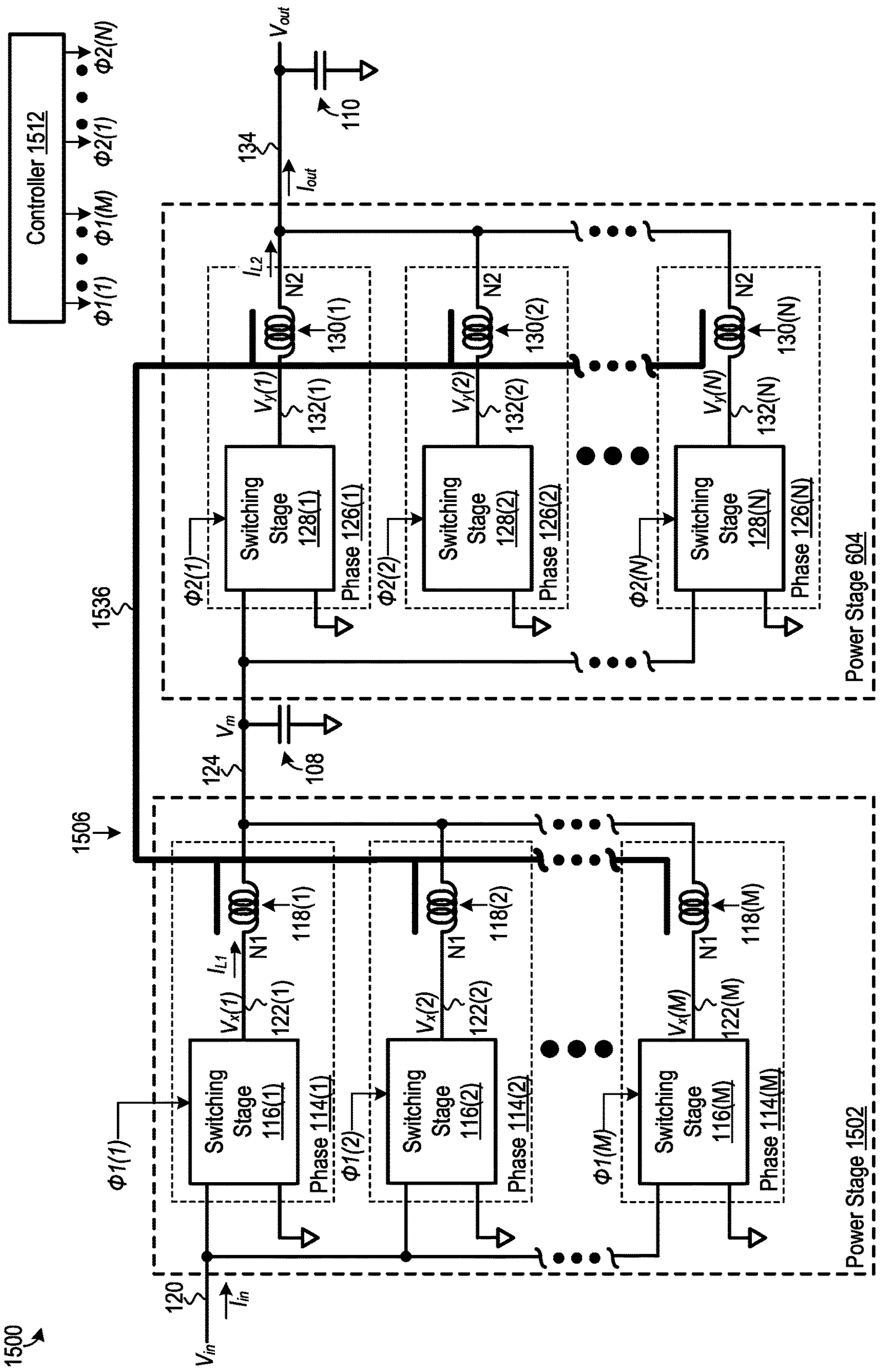
FIG. 15 is a schematic diagram of an alternate embodiment of the FIG. 12 two-stage switching power converter where a first power stage includes a plurality of phases.

Switching frequency of first power stage 102 can be even further decreased by modifying first power stage 102 to include one or more additional instances of phase 114 and alternating which phase 114 is fired between switching intervals, e.g., switching periods, of second power stage 604. For example, FIG. 15 is a schematic diagram of a two-stage switching power converter 1500, which is an alternate embodiment of two-stage switching power converter 1200 (FIG. 12) where first power stage 102 is replaced with a first power stage 1502, coupled inductor 606 is replaced with a coupled inductor 1506, and controller 1212 is replaced with a controller 1512. First power stage 1502 differs from first power stage 102 in that first power stage 1502 includes M instances of phase 114 electrically coupled in parallel with each other between input power node 120 and intermediate power node 124, where M is an integer greater than one and M need not be equal to N. Coupled inductor 1506 is an alternate embodiment of coupled inductor 606 further including a respective first power transfer winding 118 for each phase 114, i.e., M first power transfer windings 118, as well as a magnetic core 1536 in place of magnetic core 636. Magnetic core 1536 differs from magnetic core 636 in that magnetic core 1536 is configured to magnetically couple additional power transfer windings to each other, i.e., magnetic core 1536 is configured to magnetically couple (a) each first power transfer winding 118 to each other first power transfer winding 118, (b) each second power transfer winding 130 to each other second power transfer winding 130, and (c) each first power transfer winding 118 to each second power transfer winding 130. All power transfer windings 118 and 130 are negatively coupled to each other. Each first power transfer winding 118 forms a quantity of turns equal to N1, and each second power transfer winding 130 forms a quantity of turns equal to N2.

Controller 1512, which is an alternate embodiment of controller 1212, differs from controller 1212 in that controller 1512 is configured to generate a respective control signal Φ1 for each phase 114 of first power stage 1502, as well as a respective control signal Φ2 for each phase 126 of second power stage 104. Controller 1512 is configured to generate control signals Φ2 to control switching of each phase 126 of second power stage 604 to regulate at least one parameter of two-stage switching power converter 1500 in a manner like that discussed above with respect to controller 1212. Specifically, controller 1512 is configured to generate control signals Φ2 so that the control signals are asserted in a given switching period of second power stage 604 without deadtime between successive assertion of control signals Φ2, resulting in phases 126 switching in each switching period of second power stage 604 without deadtime between successive switching of phases 126. Additionally, controller 1512 is configured to generate control signals Φ1 so that phases 114 of first power stage 1502 alternately switch in a complementary manner with respect to each phase 126 of second power stage 604. For instance, in an embodiment where M is equal to three, controller 1512 could be configured to generate control signals Φ1 such that (a) phase 114(1) switches in a complementary manner with respect to each phase 126 of second power stage 604 in a first switching period of second power stage 604, (b) phase 114(2) switches in a complementary manner with respect to each phase 126 of second power stage 604 in a second switching period of second power stage 604, (c) phase 114(3) switches in a complementary manner with respect to each phase 126 of second power stage 604 in a third switching period of second power stage 604, (d) phase 114(1) switches in a complementary manner with respect to each phase 126 of second power stage 604 in a fourth switching period of second power stage 604, (e) phase 114(2) switches in a complementary manner with respect to each phase 126 of second power stage 604 in a fifth switching period of second power stage 604, and so on.

Figure 16:
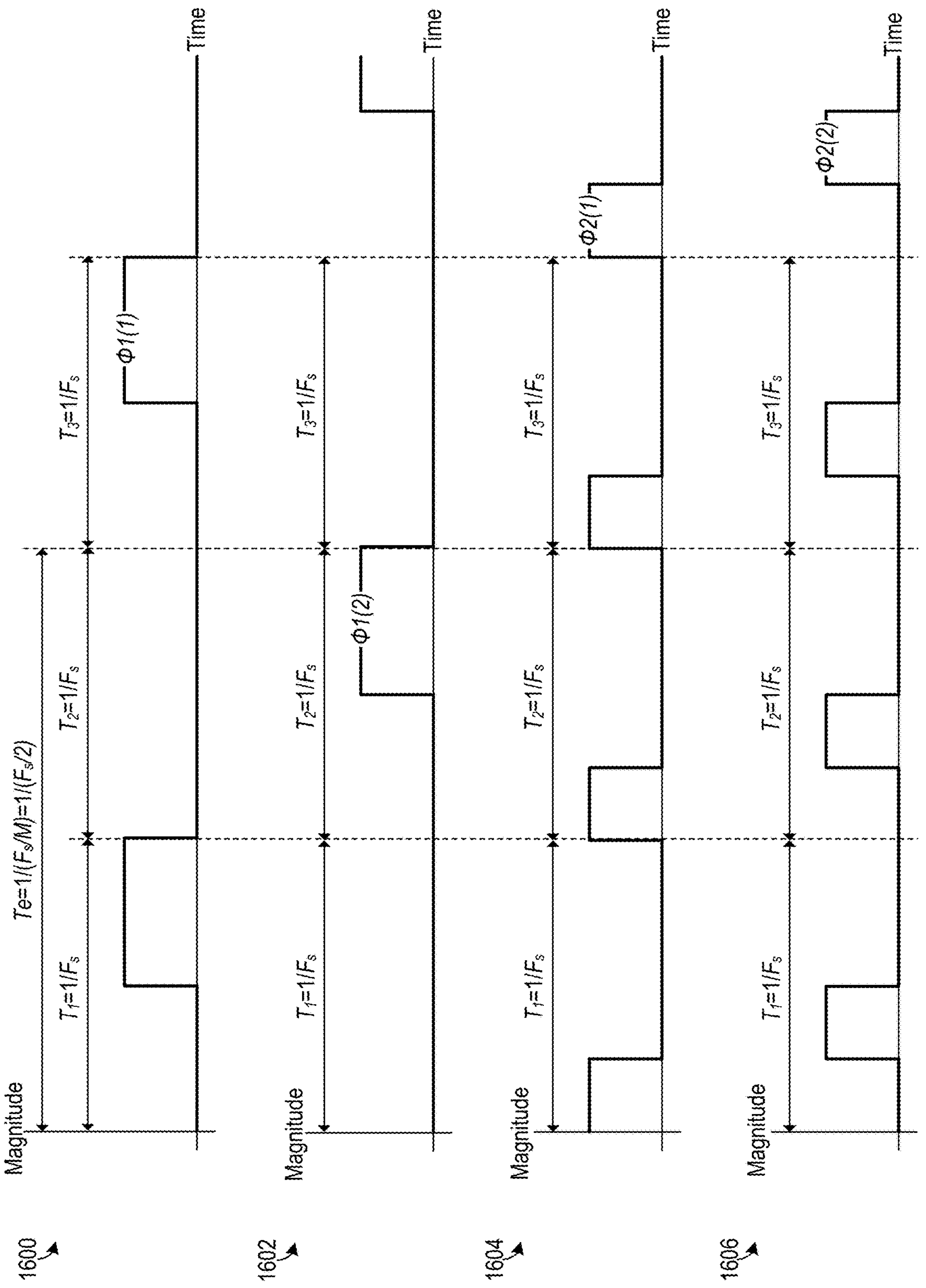
FIG. 16 includes four graphs collectively illustrating one example of a first control signal, a second control signal, a third control signal, and fourth control signal, of the FIG. 15 two-stage switching power converter.

For example, FIG. 16 includes four graphs 1600, 1602, 1604, 1606 of magnitude versus time collectively illustrating one example of control signals Φ1(1), Φ1(2), Φ2(1), and Φ2(2) as generated by controller 1512 in embodiment of two-stage switch power converter 1500 where M=2 and N=2, i.e., where first power stage 1502 includes two phases 114 and second power stage 604 includes two phases 126. Graphs 1600, 1602, 1604, and 1606 assume that (a) each of control signals Φ1(1), Φ1(2), Φ2(1), and Φ2(2) is asserted when in a logic high state and (b) each of phase 114(1), phase 114(2), phase 126(1), and phase 126(2) drives its respective power transfer winding 118(1), 118(2), 130(1), and 130(2) high in response to its respective control signal Φ1(1), Φ1(2), Φ2(1), and Φ2(2) being asserted. However, control signals Φ1(1), 1(2), Φ2(1), and Φ2(2) could have other polarities without departing from the scope hereof, and phases 114 and 126 could respond to respective control signals Φ1(1), Φ1(2), Φ2(1), and Φ2(2) in a different manner, as long as alternating phases 114 of first power stage 102 switch in a complementary manner with respect to each phase 126 of second power stage 604. Graph 1600 includes a curve illustrating control signal Φ1(1), graph 1602 includes a curve illustrating control signal Φ1(2), graph 1604 includes a curve representing control signal Φ2(1), graph 1606 includes a curve representing control signal Φ2(2), and graphs 1600, 1602, 1604, and 1606 have a common time base.

As illustrated in graphs 1604 and 1606, controller 1512 generates control signals Φ2 so that the control signals are asserted in a given switching period of second power stage 604 without deadtime between successive assertion of control signals Φ2, in a manner like that discussed above with respect to FIG. 13. However, controller 1512 generates control signals Φ1 such that phases 114 alternately switch in a complementary manner with respect to each phase 126 of second power stage 604. In particular, in odd switching periods of second power stage 604, phase 114(1) switches in a complementary manner with respect to each phase 126 of second power stage 604, and phase 114(2) is inactive, i.e., phase 114(2) does not switch and instead continuously drives first power transfer winding 118(2) low. In even switching periods of second power stage 604, phase 114(2) switches in a complementary manner with respect to each phase 126 of second power stage 604, and phase 114(1) is inactive, i.e., phase 114(1) does not switch and instead continuously drives first power transfer winding 118(1) low. Consequently, first power stage 1502 has an effective switching period $T_e$ that is M times any one switching period of second power stage 604, resulting in first power stage 102 having a switching frequency that is $F_s/M$, where $F_s$ is switching frequency of second power stage 604, thereby further promoting low switching losses in first power stage 102. For instance, in the example of FIG. 16 where M is equal to two, effective switching frequency of first power stage 1502 is half of switching frequency $F_s$.

Voltage $V_{out}$ is related to voltage $V_{in}$ in two-stage switching power converter 1500 according to EQN. 4 below, where D is duty cycle of second power stage 604.

$$D = \frac{1 \pm \sqrt{1 - 4\frac{V_{out}}{V_{in}} \cdot N \cdot M}}{2 \cdot N} \quad \text{(EQN. 4)}$$

Figure 17:
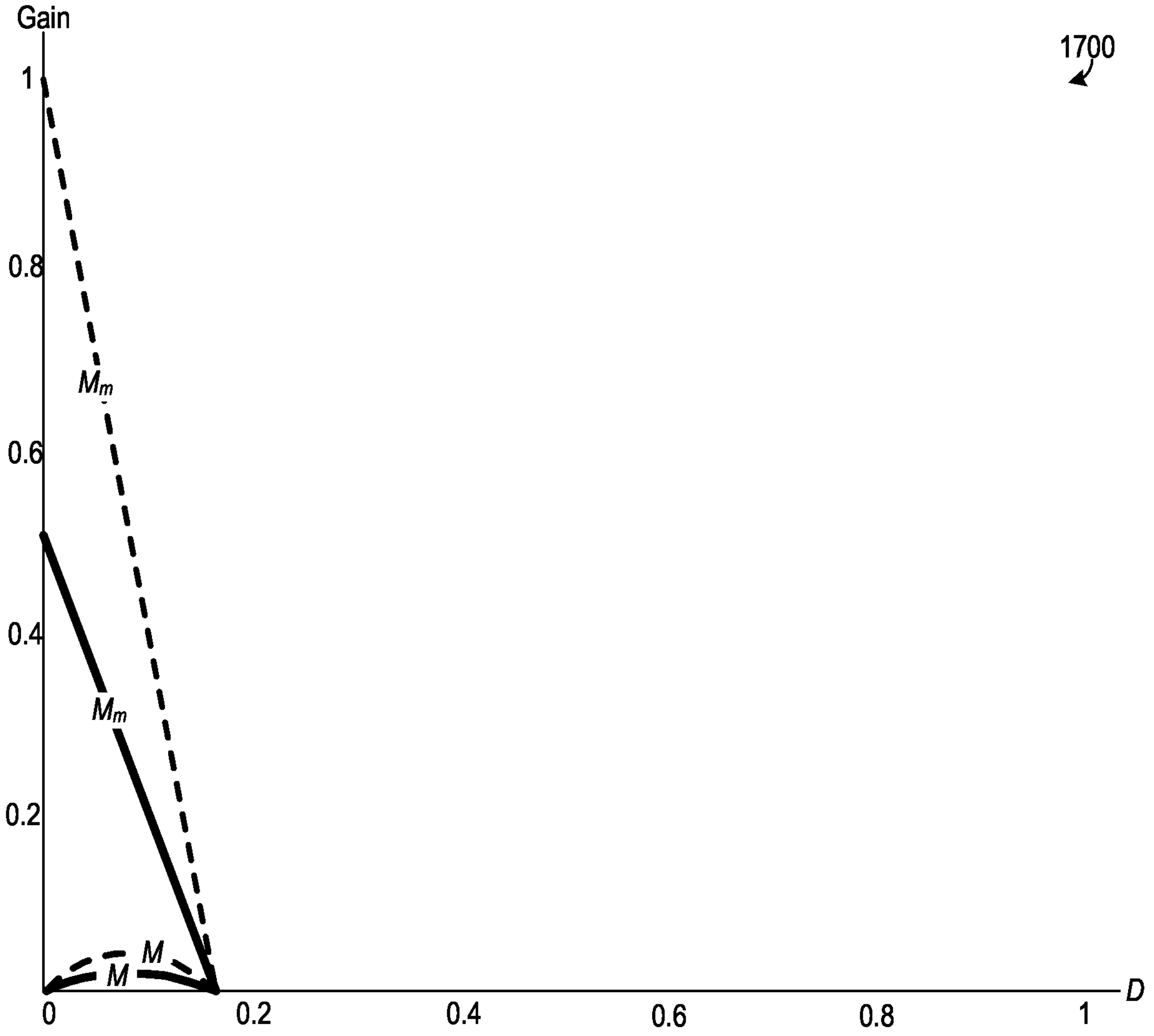
FIG. 17 is an example graph of gain versus duty cycle for two embodiments of the FIG. 15 two-stage switching power converter.
Figure 18A:
FIGS. 18A, 18B, 18C, 18D, 18E, 18F, 18G, 18H, and 18I are graphs collectively illustrating one example of simulated operation of the FIG. 15 two-stage switching power converter.
Figure 18B:
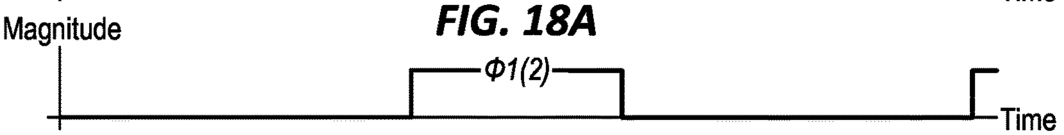
Figure 18C:
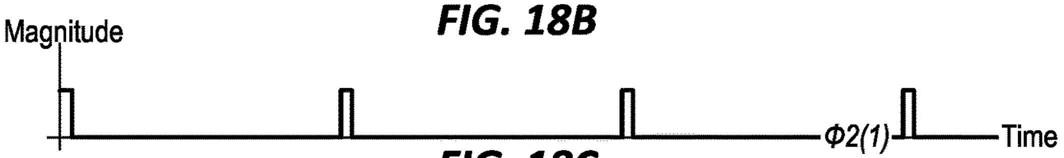
Figure 18D:
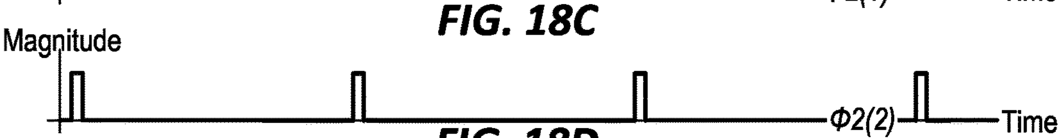
Figure 18E:
Figure 18F:
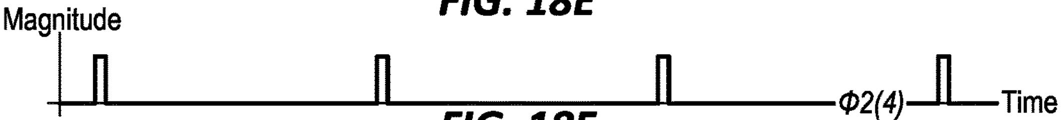
Figure 18G:
Figure 18H:
Figure 18I:
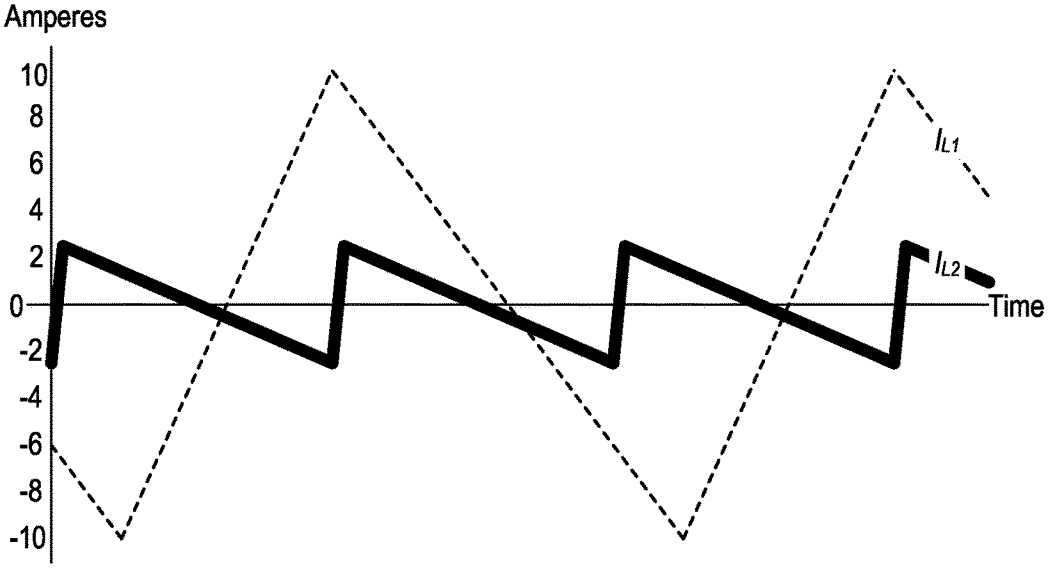
Figure 19A:
FIGS. 19A, 19B, 19C, 19D, 19E, 19F, 19G, 19H, and 19I are graphs collectively illustrating another example of simulated operation of the FIG. 15 two-stage switching power converter.
Figure 19B:
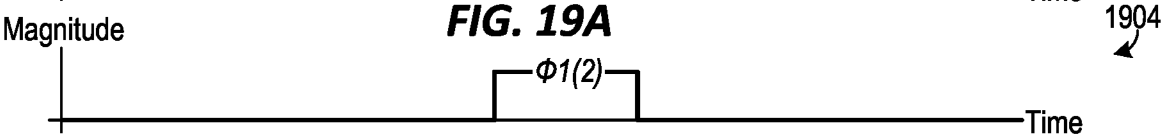
Figure 19C:
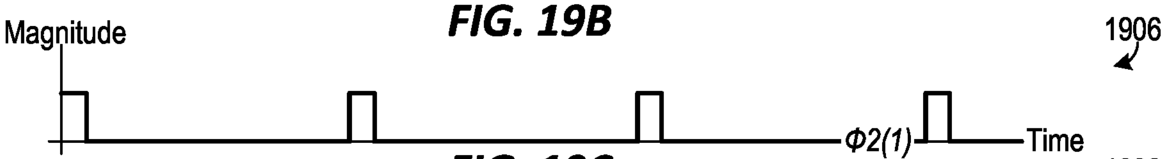
Figure 19D:
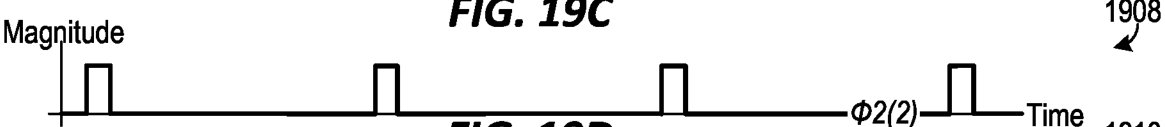
Figure 19E:
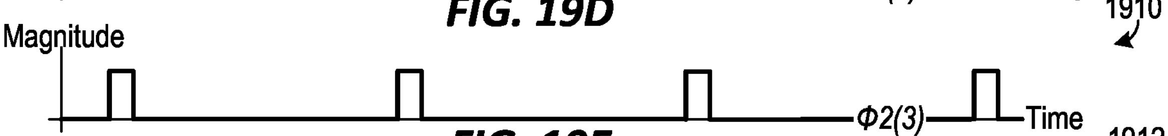
Figure 19F:
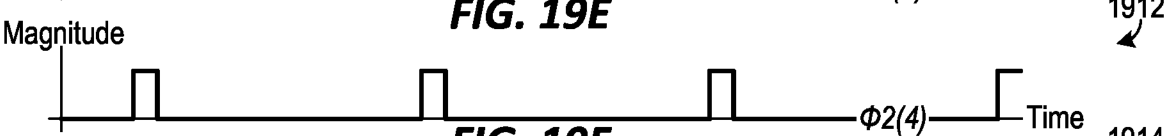
Figure 19G:
Figure 19H:
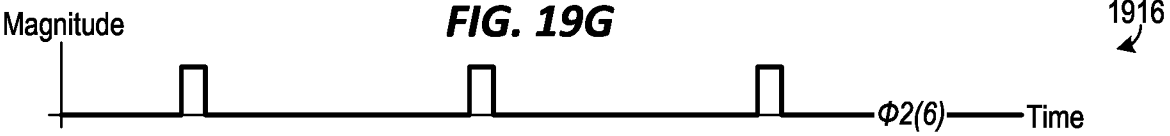
Figure 19I:
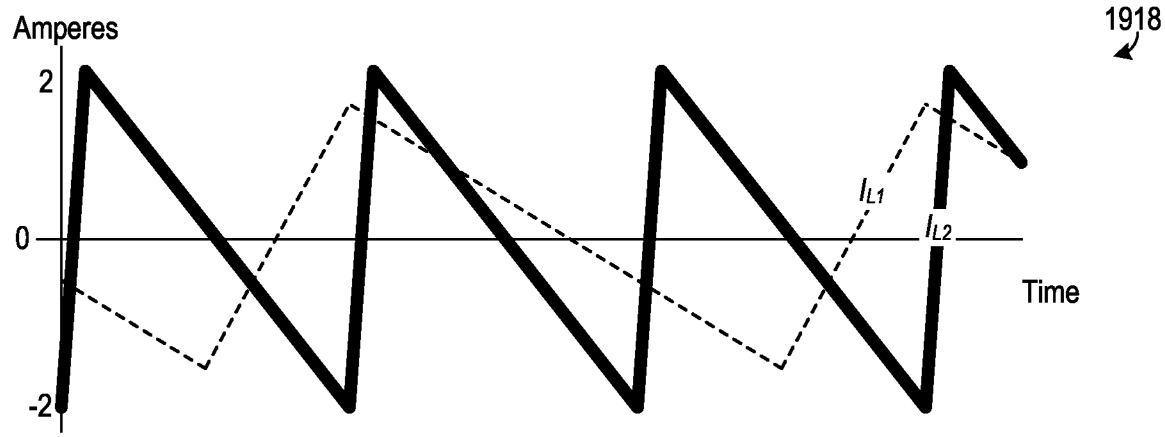

As evident from EQN. 4, duty cycle D of second power stage 604 is a function of M, i.e., number of phases 114 of first power stage 1502, N, i.e., number of phases 126 of second power stage 604, as well as input voltage $V_{in}$ and output voltage $V_{out}$. Additionally, two-stage switching power converter 1500 may operate at two different possible duty cycles of second power stage 604 to achieve a given output voltage $V_{out}$, as also evident from EQN. 4. For example, consider FIG. 17, which is an example graph 1700 of gain versus duty cycle for the following two embodiments of two-stage switching power converter 1500: (a) embodiment A (dashed line curves): M=1, N=6, and (b) embodiment B (solid line curves): M=2, N=6. Graph 1700 includes a curve representing gain $M_m$ for each of embodiments A and B, where $M_m=V_m/V_{in}$, as well as a curve representing gain M for each of embodiments A and B, where $M=V_{out}/V_{in}$. As evident from FIG. 17, there are two possible values of duty cycle D which achieve a given gain M. It should be noted that intermediate voltage $V_m$ magnitude decreases with increasing value of M (which is typically desirable), but maximum obtainable output voltage $V_{out}$ magnitude is relatively small and further decreases with increasing value of M.

FIGS. 18A-18I collectively illustrate results of a simulation of one embodiment of two-stage switching power converter 1500 where M=2, N=6, $V_{in}$=48 volts, $V_{out}$=0.8 volt, a ratio of N1/N2 is 2.8, magnetizing inductance of coupled inductor 1506 is 275 nH for each second power transfer winding 130, leakage inductance of each second power transfer winding 130 of coupled inductor 1506 is 15 nH, and $F_s$=400 KHz, where $F_s$ is switching frequency of second power stage 604. The magnetizing inductance and leakage inductance of each first power transfer winding 118 of coupled inductor 1506 is expected to be approximately $(N1/N2)^2$ larger than corresponding values of each second power transfer winding 130. FIGS. 18A-18I are graphs 1802, 1804, 1806, 1808, 1810, 1812, 1814, 1816, and 1818, which have a common time base. Graphs 1802-1816 are of signal magnitude versus time, and graphs 1802-1816 include curves representing control signal Φ1(1), control signal Φ1(2), control signal Φ2(1), control signal Φ2(2), control signal Φ2(3), control signal Φ2(4), control signal Φ2(5), and control signal Φ2(6), respectively, where each of the aforementioned control signals is asserted when in a logic high state. Graph 1818 is of current in amperes versus time. Graph 1818 includes a curve representing current $I_{L1}$ through first power transfer winding 118(1) and a curve representing current $I_{L2}$ through second power transfer winding 130(1) (see FIG. 15).

FIGS. 18A-18I assume that second power stage 604 operates at a first duty cycle of two possible duty cycles which achieve aforementioned voltage conversion, i.e., converting $V_{in}$ of 48 volts to $V_{out}$ of 0.8 volt. Voltage $V_m$ under the simulated conditions of FIGS. 18A-18I is around 17 volts. As evident from FIG. 18I, harmonics of ripple current are completely canceled, current ripple peak to peak is reduced, and only triangular waveforms are present without any peaks from other coupled phases. Accordingly, current $I_{L1}$ has a frequency of only 200 KHz, while current $I_{L2}$ has a frequency of 400 KHz. Controller 1512 generates controls signals Φ2(1)-Φ2(6) in this example such that control signals Φ2(1)-Φ2(6) are asserted in a given switching period of second power stage 604 without deadtime between successive assertion of control signals Φ2, which results in phases 126(1)-126(6) switching in each switching period of second power stage 604 without deadtime between successive switching of phases 126(1)-126(6).

FIGS. 19A-19I illustrate results of a simulation of one embodiment of two-stage switching power converter 1500 under the same conditions as discussed above with respect to FIGS. 18A-18I except that (a) second power stage 604 operates at the second duty cycle of the two possible duty cycles which achieves aforementioned voltage conversion, and (b) the ratio of N1/N2 is 7.4 instead of 2.8. Voltage $V_m$ under the simulated conditions of FIGS. 19A-19I is around 6.5 volts instead of 17 volts. Graphs 1902-1916 are of signal magnitude versus time, and graphs 1902-1916 include curves representing control signal Φ1(1), control signal Φ1(2), control signal Φ2(1), control signal Φ2(2), control signal Φ2(3), control signal Φ2(4), control signal Φ2(5), and control signal Φ2(6), respectively, where each of the aforementioned control signals is asserted when in a logic high state. Graph 1918 is of current in amperes versus time. Graph 1918 includes a curve represent current $I_{L1}$ through first power transfer winding 118(1) and a curve representing current $I_{L2}$ through second power transfer winding 130(1). Similar to simulations of FIGS. 18A-18I, harmonics of ripple current are completely canceled in the simulations of 19A-19I. Additionally, magnitude of ripple of current $I_{L1}$ is significantly lower under the simulated conditions of FIGS. 19A-19I than the simulated conditions of FIGS. 18A-18I.

Referring again to FIG. 15, additionally, controller 1512 could be modified so that first power stage 1502 skips some switching intervals of second power stage 604, i.e., so that no control signal Φ1 is asserted during certain switching intervals of second power stage 604, such as in a manner analogous to that discussed above with respect to FIG. 14, which further reduces effective switching frequency of first power stage 1502. For example, in one alternate embodiment of two-stage switching power converter 1500 where M is equal to two, controller 1512 is modified to generate controls signals Φ1 and thereby control first power stage 1502 as follows for each group of four successive switching intervals of second power stage 604: (a) phase 114(1) switches in a complementary manner with respect to each phase 126 of second power stage 604 in a first switching interval of second power stage 604, (b) no phase 114 switches in a second switching interval of second power stage 604, (c) phase 114(2) switches in a complementary manner with respect to each phase 126 of second power stage 604 in a third switching interval of second power stage 604, and (d) no phase 114 switches in a fourth switching interval of second power stage 604. As another example, in another alternate embodiment of two-stage switching power converter 1500 where M is equal to two, controller 1512 is modified to generate controls signals Φ1 and thereby control first power stage 1502 as follows for each group of three successive switching intervals of second power stage 604: (a) phase 114(1) switches in a complementary manner with respect to each phase 126 of second power stage 604 in a first switching interval of second power stage 604, (b) phase 114(2) switches in a complementary manner with respect to each phase 126 of second power stage 604 in a second switching interval of second power stage 604, and (c) no phase 114 switches in a third switching interval of second power stage 604.

Referring again to FIG. 15, changing magnitude of voltage $V_{out}$ may result in large change in duty cycle of first power stage 1502, which in turn results in large changes of magnitude of voltage $V_m$. Rapid change in magnitude of voltage $V_m$ may be undesirable. Accordingly, certain embodiments of controller 1512 are configured to restrict rate of change of duty cycle of first power stage 1502, or restrict the duty cycle of first power stage 1502 to a predetermined value or a range of predetermined values, to prevent rapid change of magnitude of voltage $V_m$ or limit rate of change of magnitude of voltage $V_m$. In such embodiments, duty cycle of second power stage 604 may be aggressively controlled to achieve regulation of one or more parameters of two-state switching power converter 1500. Additionally, quantity of turns N2 and quantity of turns N1 may be large to promote tunability of a N1/N2 ratio of the two-stage switching power converter 1500.

Additionally, certain embodiments of controller 1512 generate control signals Φ2 such that they overlap, i.e., so that two or more control signals Φ2 are simultaneously asserted during a portion of each switching interval, e.g., switching period, of second power stage 604, resulting in two or more second power transfer windings 130 being simultaneously driven high during a portion of each switching interval of second power stage 604, to extend range of voltage $V_{out}$ magnitude without causing magnitude of voltage $V_m$ to be too high. Furthermore, some embodiment of controller 1512 are configured to insert deadtime in controls signals Φ1 and/or generate control signals Φ2 such that they overlap, to absorb change in duty cycle of second power stage 604 and thereby stabilize magnitude of voltage $V_m$. For example, FIG. 20 includes eight graphs 2002, 2004, 2006, 2008, 2010, 2012, 2014, and 2016 of magnitude versus time collectively illustrating one example of control signals Φ1 and Φ2 in embodiment of two-stage switch power converter 1500 where M=2, N=6, and controller 1512 is configured to (a) insert deadtime in controls signals Φ1 and (b) generate control signals Φ2 such that they overlap. Graphs 2002-2016 assume that (a) each of control signals Φ1 and Φ2 is asserted when in a logic high state and (b) each of phase 114 and 126 drives its respective power transfer winding 118 or 130 high in response to its respective control signal Φ1 or Φ2 being asserted. However, control signals Φ1 and Φ2 could have other polarities without departing from the scope hereof, and phases 114 and 126 could respond to respective control signals Φ1 and Φ2 in a different manner without departing from the scope hereof. Graphs 2002, 2004, 2006, 2008, 2010, 2012, 2014, and 2016 include the curves representing control signals Φ1(1), Φ1(2), Φ2(1), Φ2(2), Φ2(3), Φ2(4), Φ2(5), and Φ2(6), respectively, and the graphs have a common time base.

Figure 20:
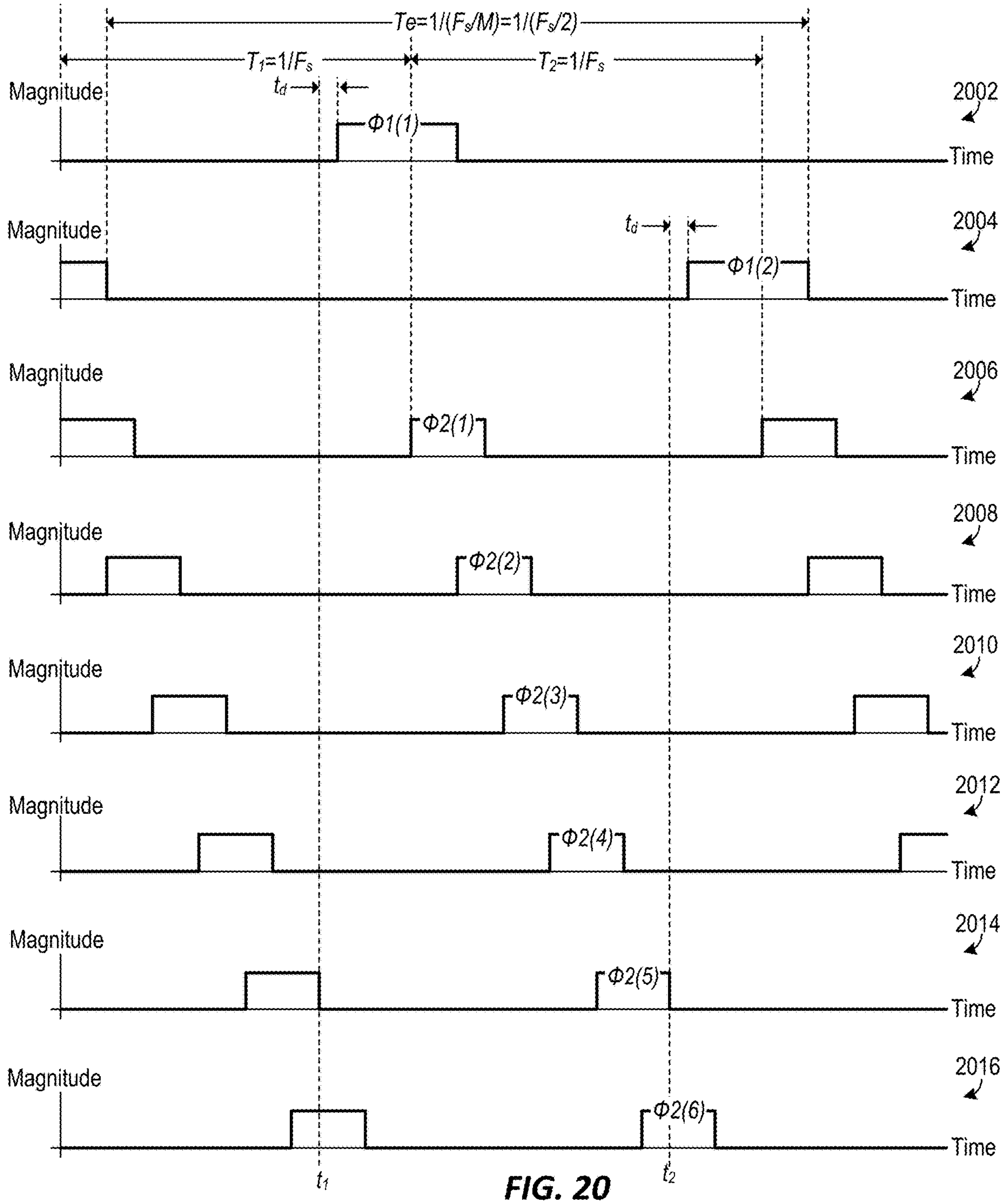
FIG. 20 includes eight graphs collectively illustrating an example of control signals in an embodiment of the FIG. 15 two-stage switching power converter where a controller generates overlapping control signals.
Figure 21A:
FIGS. 21A, 21B, 21C, 21D, 21E, 21F, 21G, 21H, and 21I are graphs collectively illustrating an example of simulated operation of the FIG. 15 two-stage switching power converter with overlapping assertion of control signals in a second power stage.
Figure 21B:
Figure 21C:
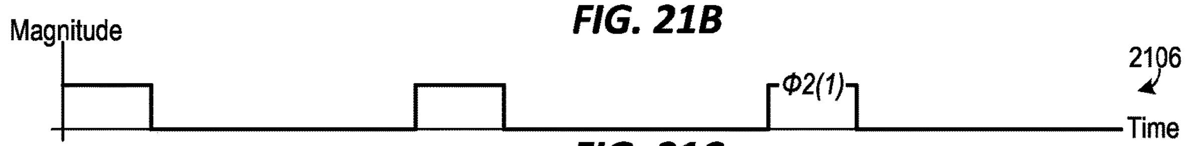
Figure 21D:
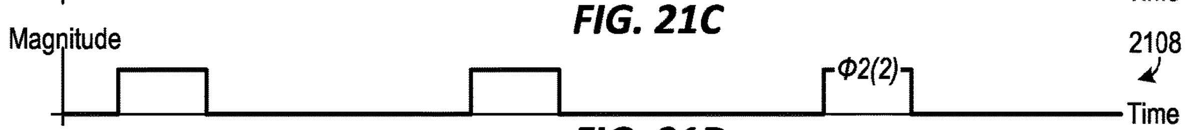
Figure 21E:
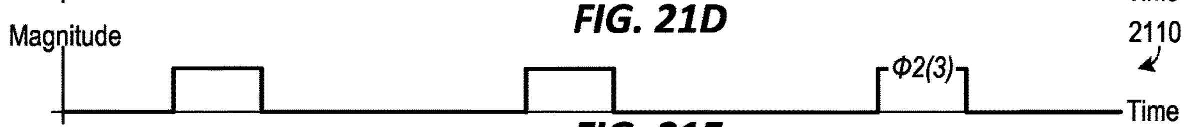
Figure 21F:
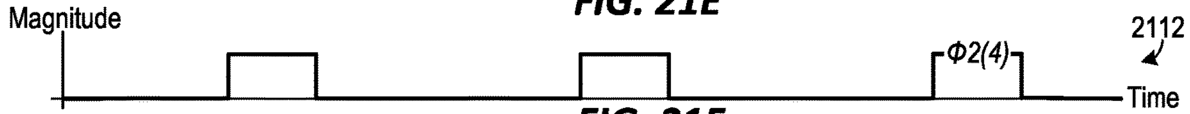
Figure 21G:
Figure 21H:
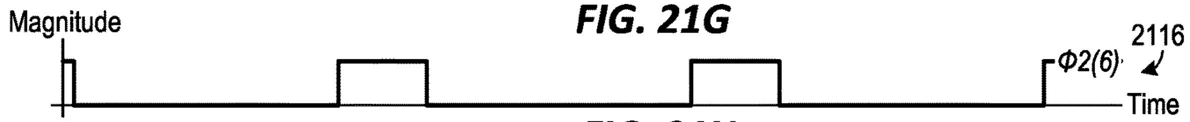
Figure 21I:
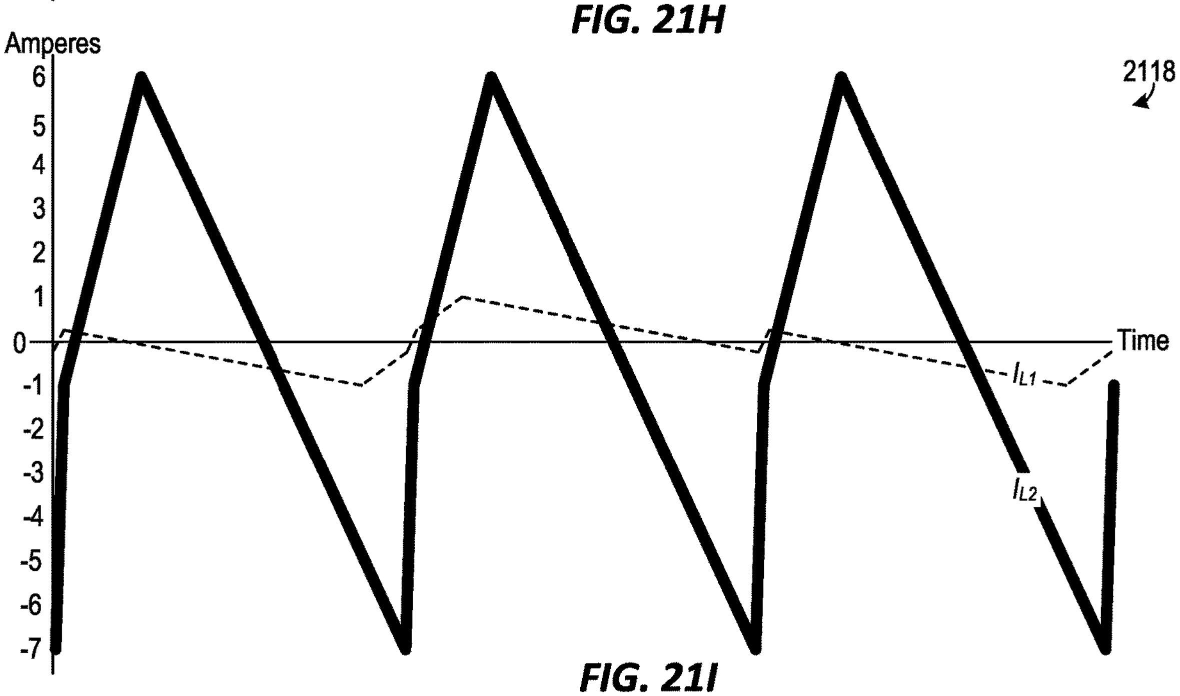

Controller 1512 generates control signals Φ2 such that they overlap in the example of FIG. 20 resulting in a plurality of second power transfer windings 130 simultaneously being driven during each switching period of second power stage 604, thereby increasing effective duty cycle of second power stage 604 and enabling higher magnitude of voltage $V_{out}$. Additionally, controller 1512 generates control signals Φ1 such that phases 114 alternately switch in a complementary manner with respect to each phase 126 of second power stage 604, i.e., controller 1512 alternates which controls signal Φ1(1) or Φ1(2) is asserted. Due to overlapping assertion of control signals Φ2, a phase 114 switches in a complementary manner with respect to each phase 126 of second power stage by (a) driving its respective first power transfer winding 118 high in response to fewer than two power transfer windings 130 simultaneously being driven high, and (b) driving its respective first power transfer winding 118 low in response to two second power transfer windings 130 simultaneously being driven high. First power stage 1502 has an effective switching period $T_e$ that is M times any one switching period of second power stage 604, resulting in first power stage 102 having a switching frequency that is $F_s$/M, where $F_s$ is switching frequency of second power stage 604, thereby further promoting low switching losses in first power stage 102.

Additionally, FIG. 20 illustrates controller 1512 inserting deadtime $t_d$ into control signals Φ1, to help absorb changes to magnitude of voltage $V_{out}$ and thereby limit rate of change of magnitude of voltage $V_m$. In particular, controller 1512 asserts control signal Φ1(1) in response to fewer than two second power transfer windings 130 being driven high after expiration of deadtime $t_d$, during odd switching periods of second power stage 604. Additionally, controller 1512 asserts control signal Φ1(2) in response to fewer than two of second power transfer windings 130 being driven high after expiration of deadtime $t_d$, during even switching periods of second power stage 604. In some alternate embodiments, though controller 1512 does not insert deadtime $t_d$ into control signals Φ1 such that (a) control signal Φ1(1) is immediately asserted at time $t_1$ in response fewer than two second power transfer windings 130 being driven high, and (b) control signal Φ1(2) is immediately asserted at time $t_2$ in response fewer than two second power transfer windings 130 being driven high.

FIGS. 21A-21I collectively illustrate results of a simulation of another embodiment of two-stage switching power converter 1500 with overlapping assertion of control signals Φ2 in a switching period of second power stage 604, where M=2, N=6, $V_{in}$=48 volts, $V_{out}$=1.8 volts, magnetizing inductance of coupled inductor 1506 is 275 nH for each second power transfer winding 130, leakage inductance of each power transfer winding 130 of coupled inductor 1506 is 15 nH, and $F_s$=400 KHz, where $F_s$ is switching frequency of second power stage 604. The magnetizing inductance and leakage inductance of each first power transfer winding 118 of coupled inductor 1506 is expected to be approximately $(N1/N2)^2$ larger than corresponding values of each second power transfer winding 130. FIGS. 21A-21I are graphs 2102, 2104, 2106, 2108, 2110, 2112, 2114, 2116, and 2118, which have a common time base. Graphs 2102-2116 are of signal magnitude versus time, and graphs 2102-2116 include curves representing control signal Φ1(1), control signal Φ1(2), control signal Φ2(1), control signal Φ2(2), control signal Φ2(3), control signal Φ2(4), control signal Φ2(5), and control signal Φ2(6), respectively, where each of the aforementioned control signals is asserted when in a logic high state. Graph 2118 is of current in amperes versus time. Graph 2118 includes a curve representing current $I_{L1}$ through first power transfer winding 118(1) and a curve representing current $I_{L2}$ through second power transfer winding 130(1) (see FIG. 15). In this embodiment, controller 1512 does not insert deadtime analogous to deadtime $t_d$ of FIG. 20. It should be noted that the overlapping assertion of control signals Φ2 enables magnitude of $V_{out}$ to be larger than would otherwise be possible.

As discussed above, maximum ripple current canceled is achieved when EQN. 1, which is reproduced below as EQN. 5, is met. Assuming that each first power transfer winding 118 and each second power transfer winding 130 is wound around a magnetic core tooth of like characteristics, phase currents $I_{ph1}$ and $I_{ph2}$ are desired to relate to quantity of winding turns N1 and N2 according to EQN. 6 below for the best magnetic flux cancelation, where $I_{ph1}$ is average current flowing through each phase 114 of first power stage 1502, and $I_{ph2}$ is average flowing through each phase 126 of second power stage 604. EQN. 7, which is derived from the combination of EQNS. 5 and 6, expresses an ideal relationship between phase currents in two-stage switching power converter 1500 as a function of voltages $V_{in}$ and $V_m$ for the best magnetic flux cancelation between all windings.

$$N1/N2 = V_{in}/V_m \quad \text{(EQN. 5)}$$

$$I_{ph1}/I_{ph2} = N2/N1 \quad \text{(EQN. 6)}$$

$$I_{ph1}/I_{ph2} = V_m/V_{in} \quad \text{(EQN. 7)}$$

However, phases currents of two-stage switching power converter 1500 will not comply with ideal relationship of EQN. 7 but instead be related according to EQN. 8 below, assuming one hundred percent efficiency of each of first power stage 1502 and second power stage 604. Relative phase current mismatch (PCM) between first power transfer windings 118 of first power stage 1502 and second power transfer windings 130 of second power stage 604 is expressed according to EQN. 9 below, which is derived from EQNS. 7 and 8.

$$\frac{I_{ph1}}{I_{ph2}} = \frac{N * V_{out}}{M * V_m} \quad \text{(EQN. 8)}$$

$$PCM = \frac{N * V_o}{M * V_m} - \frac{V_m}{V_{in}} \quad \text{(EQN. 9)}$$

Magnitude of current mismatch per phase ($I_{mp}$) of two-stage switching power converter 1500 is expressed by EQN. 10 below. As evident from EQN. 10, magnitude of current mismatch is proportional to magnitude of output current $I_{out}$. Consequently, imbalance in magnetic flux between first power stage 1502 and second power stage 604 can be significant, depending on magnitude of output current $I_{out}$. For example, in embodiments of two-stage switching power converter 1500 where $V_{in}$=48 volts, $V_m$=6.5 volts, $V_{out}$=0.8 volt, M=2, N=6, and $I_{out}$=50 amperes, $I_{mp}$ is 11.7 amperes. Consequently, in this embodiment, coupled inductor 1506 needs to be designed to tolerate additional current mismatch of 11.7 amperes without danger of magnetizing inductance saturation, on top of other margin requirements, such as to allow for possible imbalance in alternating current (AC) and direct current (DC) among phases. Such requirement placed on coupled inductor 1506 may undesirably increase size and/or cost of coupled inductor 1506.

$$I_{mp} = PCM * I_{out} \quad \text{(EQN. 10)}$$

Figure 22A:
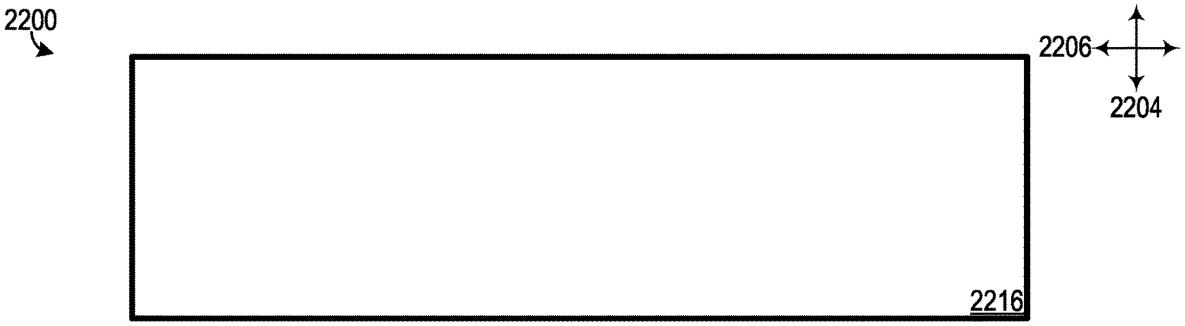
FIG. 22A is a top plan view of one embodiment of a coupled inductor that may be used in certain embodiments of the FIG. 15 two-stage switching power converter.
Figure 22B:
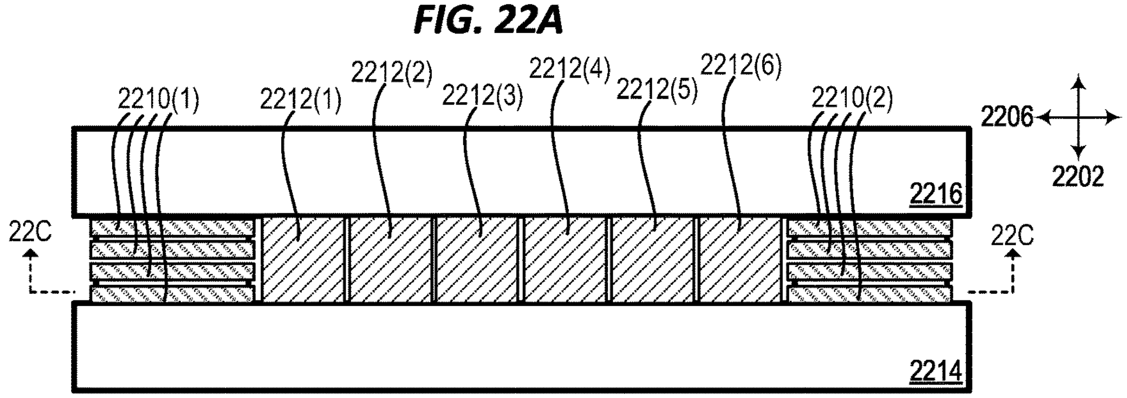
FIG. 22B is a side elevational view of the FIG. 22A coupled inductor.
Figure 22C:
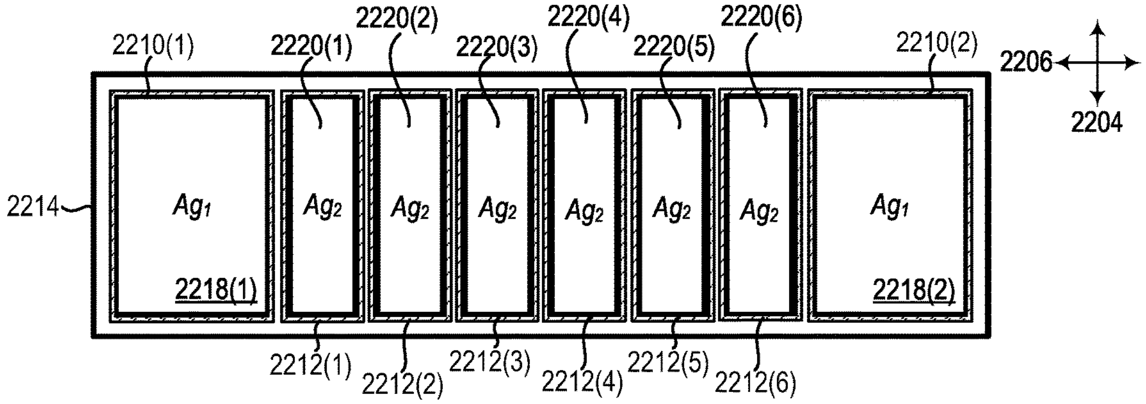
FIG. 22C is a cross-sectional view of the FIG. 22A coupled inductor.
Figure 22D:
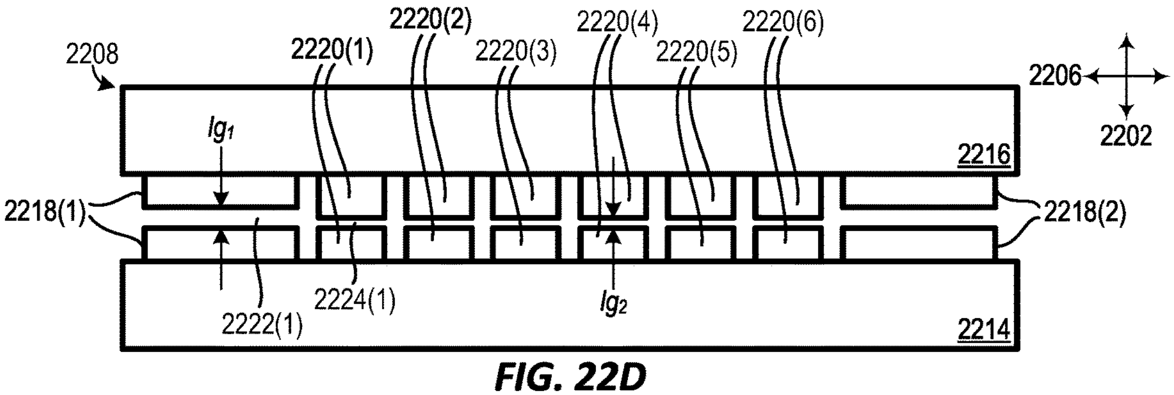
FIG. 22D is a side elevational view of the FIG. 22A coupled inductor with windings omitted.

However, some embodiments of coupled inductor 1506 are configured to possibly compensate for mismatch in current among phases 114 of first power stage 1502 and phases 126 of second power stage 604, thereby mitigating the risk magnetizing inductance saturation from the mismatch. For example, FIG. 22A is a top plan view and FIG. 22B is a side elevational view of a coupled inductor 2200, which is one embodiment of coupled inductor 1506 that is configured to compensate for mismatch in current among phases 114 of first power stage 1502 and phases 126 of second power stage 604. FIG. 22C is a cross-sectional view of coupled inductor 2200 taken along line 22C-22C of FIG. 22B, and FIG. 22D is a side elevational view of coupled inductor 2200 analogous to that of FIG. 22B but with windings omitted to show additional features of coupled inductor 2200. The terms "top" and "side" are used with respect to FIGS. 22A-22D solely for convenience and are not intended to require any particular orientation of coupled inductor 2200. For example, coupled inductor 2200 could be rotated so that the surface of coupled inductor 2200 depicted in FIG. 22A is a side surface instead of a top surface.

Coupled inductor 2200 is configured for use in embodiments of two-stage switching power converter 1500 where M=2 and N=6. However, coupled inductor 2200 could be modified for use in embodiments of two-stage switching power converter 1500 with a different value of M and/or N. FIGS. 22A-22D include coordinate axes depicting a first direction 2202, a second direction 2204, and a third direction 2206, where each of directions 2202, 2204, and 2206 is orthogonal to each other of directions 2202, 2204, and 2206.

Coupled inductor 2200 includes a magnetic core 2208, two first power transfer windings 2210, and six second power transfer windings 2212. Magnetic core 2208 includes a first connecting element 2214, a second connecting element 2216, two first teeth 2218, and six second teeth 2220, which are each formed of a magnetic material, e.g., a ferrite magnetic material and/or a powder iron magnetic material. First connecting element 2214 and second connecting element 2216 are separated from each other in first direction 2202. Each first tooth 2218 and each second tooth 2220 is disposed between first connecting element 2214 and second connecting element 2216 in first direction 2202. First teeth 2218 are separated from each other in third direction 2206, and second teeth 2220 are separated from each other in third direction 2206. Second teeth 2220 are disposed between first tooth 2218(1) and second tooth 2220(2) in third direction 2206.

Each first tooth 2218 forms a respective first gap 2222 in first direction 2202 having a first thickness $lg_1$ in first direction 2202. Only instance of each first gap 2222 and first thickness $lg_1$ are labeled in FIG. 22D for illustrative clarity. Additionally, each second tooth 2220 forms a respective second gap 2224 in first direction 2202 having a second thickness $lg_2$ in first direction 2202. Only instance of each second gap 2224 and second thickness $lg_2$ are labeled in FIG. 22D for illustrative clarity. In some embodiments, second thickness $lg_2$ is smaller than first thickness $lg_1$. The locations of first gaps 2222 in first teeth 2218, as well the locations of second gaps 2224 in second teeth 2220, may vary. For example, in some alternate embodiments, each first tooth 2218 and each second tooth 2220 is a single piece forming a gap adjacent to either first connecting element 2214 or second connecting element 2216. Each first tooth 2218 has a cross-sectional area $Ag_1$ in a plane formed in second direction 2204 and third direction 2206, i.e., in a plane orthogonal to first direction 2202, as illustrated in FIG. 22C. Additionally, each second tooth 2220 has a cross-sectional area $Ag_2$ in a plane formed in second direction 2204 and third direction 2206, i.e., in a plane orthogonal to first direction 2202, as also illustrated in FIG. 22C. In certain embodiments, cross-sectional area $Ag_2$ is smaller than cross-sectional area $Ag_1$.

A respective first power transfer winding 2210 is wound around each first tooth 2218, where each first power transfer winding 2210 is an embodiment of a first power transfer winding 118 of FIG. 15. Accordingly, each first power transfer winding 2210 is part of a respective phase 114 of first power stage 1502. Although first power transfer windings 2210 are depicted as forming four turns, i.e., N1=4, the number of turns formed by first power transfer windings 2210 may vary. A respective second power transfer winding 2212 is wound around each second tooth 2220, where each second power transfer winding 2212 is an embodiment of a second power transfer winding 130 of FIG. 15. Accordingly, each second power transfer winding 2212 is part of a respective phase 126 of second power stage 604. First power transfer windings 2210 and second power transfer windings 2212 are metallic foil windings, e.g., copper foil windings, in coupled inductor 2200. However, coupled inductor 2200 may be modified so that first power transfer windings 2210 and second power transfer windings 2212 have different configurations. For example, in some alternate embodiments of coupled inductor 2200, each first power transfer winding 2210 and each second power transfer winding 2212 is metallic wire winding, such as a copper wire winding. Additionally, the configuration of first power transfer windings 2210 and second power transfer windings 2212 may vary with how coupled inductor 2200 is mounted, e.g., with how coupled inductor is mounted on a printed circuit board (PCB) or other substrate.

Coupled inductor 2200 is configured by setting $lg_1$ and $Ag_1$ such that reluctance of each first tooth 2218 is the same as reluctance of each second tooth 2220 during operation of two-stage switching power converter 1500, so that magnetic flux from any phase 126 of second power stage 604 will approximately evenly split among phases 114 and 126. In particular, assuming that magnetic material forming first teeth 2218 has a high magnetic permeability, reluctance of each first tooth 2218 is substantially proportional to $lg_1/Ag_1$. Similarly, assuming that magnetic material forming second teeth 2220 has a high magnetic permeability, reluctance of each second tooth 2220 is substantially proportional to $lg_2/Ag_2$. As such, each tooth 2218 and 2220 will have substantially the same reluctance if EQN. 11 below holds true.

$$lg_1/Ag_1 = lg_2/Ag_2 \quad \text{(EQN. 11)}$$

N1 of coupled inductor 2200, i.e., number of turns formed by each first power transfer winding 2210, is then set according to EQN. 12 below, where EQN. 12 is obtaining from rearranging EQN. 1.

$$N1 = N2*(V_{in}/V_m) \quad \text{(EQN. 12)}$$

$Ag_1$ is next set as a function of $Ag_2$ according to EQN. 13 below, which adjusts cross-sectional area $Ag_1$ of first teeth 2218 to adjust for the phase current mismatch discussed above.

$$Ag_1 = Ag_2\left\{1 + \left(\frac{V_{out}*N}{V_m*M} - \frac{V_m}{V_{in}}\right)\right\} \quad \text{(EQN. 13)}$$

Finally, $lg_1$ is set according to EQN. 14 below, which is obtained by rearranging EQN. 11.

$$lg_1 = lg_2*\frac{Ag_1}{Ag_2} \quad \text{(EQN. 14)}$$

Particular embodiments of coupled inductor 2200 are configured such that EQN. 14 is at least substantially true, where "substantially" in this context means that $lg_1$ is at least 90 percent, and no greater than 110 percent, of $lg_2*(Ag_1/Ag_2)$.

Coupled inductor 2200 can be modified as long as EQNS. 12-14 hold at least substantially true. For example, while all teeth 2218 and 2220 are disposed in a single row in coupled inductor 2200, coupled inductor 2200 could be modified so that teeth are split among two or more rows. As another example, coupled inductor 2200 could be modified to include features for adjusting leakage inductance and/or to help contain magnetic flux to its magnetic core.

Figure 23A:
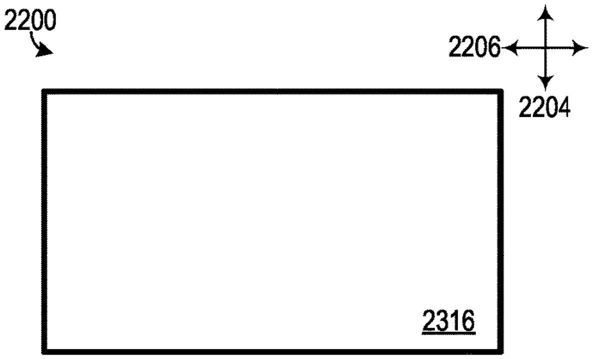
FIG. 23A is a top plan view of an alternate embodiment of the FIG. 22A coupled inductor.
Figure 23B:
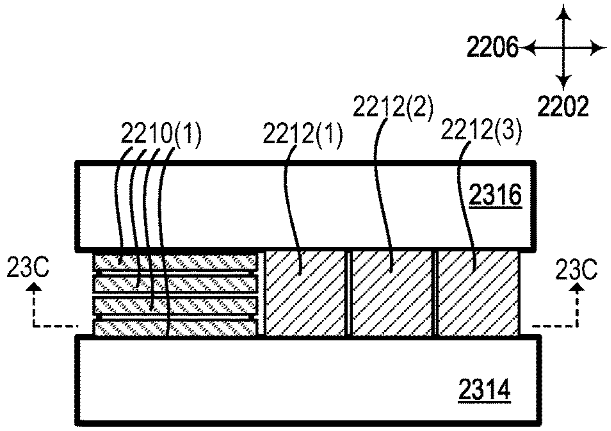
FIG. 23B is a side elevational view of the FIG. 23A coupled inductor.
Figure 23C:
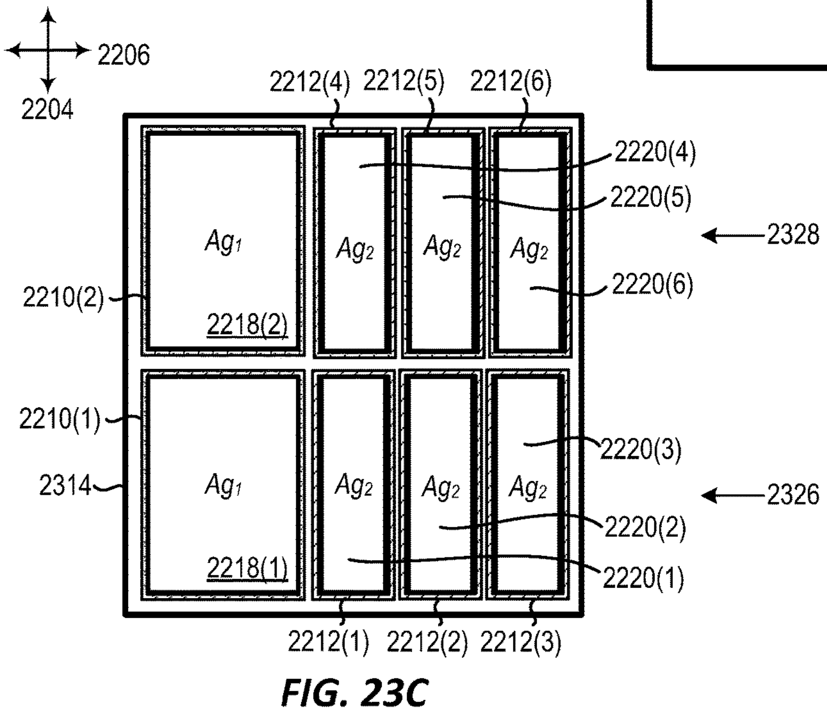
FIG. 23C is a cross-sectional view of the FIG. 23A coupled inductor.
Figure 23D:
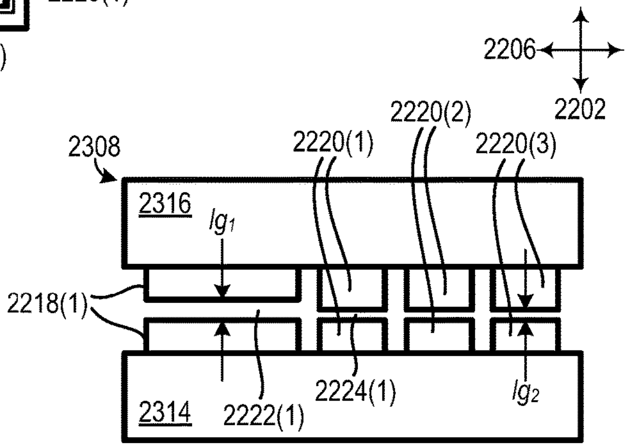
FIG. 23D is a side elevational view of the FIG. 23A coupled inductor with windings omitted.

For instance, FIGS. 23A-23D collectively illustrate an alternate embodiment of coupled inductor 2200 (FIG. 22) where teeth are disposed in multiple rows. FIG. 23A is a top plan view and FIG. 23B is a side elevational view of a coupled inductor 2300. FIG. 23C is a cross-sectional view of coupled inductor 2300 taken along line 23C-23C of FIG. 23B, and FIG. 23D is a side elevational view of coupled inductor 2300 analogous to that of FIG. 23B but with windings omitted to show additional features of coupled inductor 2300. Coupled inductor 2300 differs from coupled inductor 2200 in that magnetic core 2208 is replaced with a magnetic core 2308, where magnetic core 2308 includes a first connecting element 2314 and a second connecting element 2316 in place of first connecting element 2214 and second connecting element 2216, respectively. Additionally, teeth of magnetic core 2308 are disposed in two rows 2326 and 2328, where each row 2326 and 2328 extends in third direction 2206. Specifically, first tooth 2218(1) and second teeth 2220(1)-2220(3) are disposed in first row 2326, and first tooth 2218(2) and second teeth 2220(4)-2220(6) are disposed in second row 2328. Coupled inductor 2300 complies with EQNS. 12-14 above.

Figure 24:
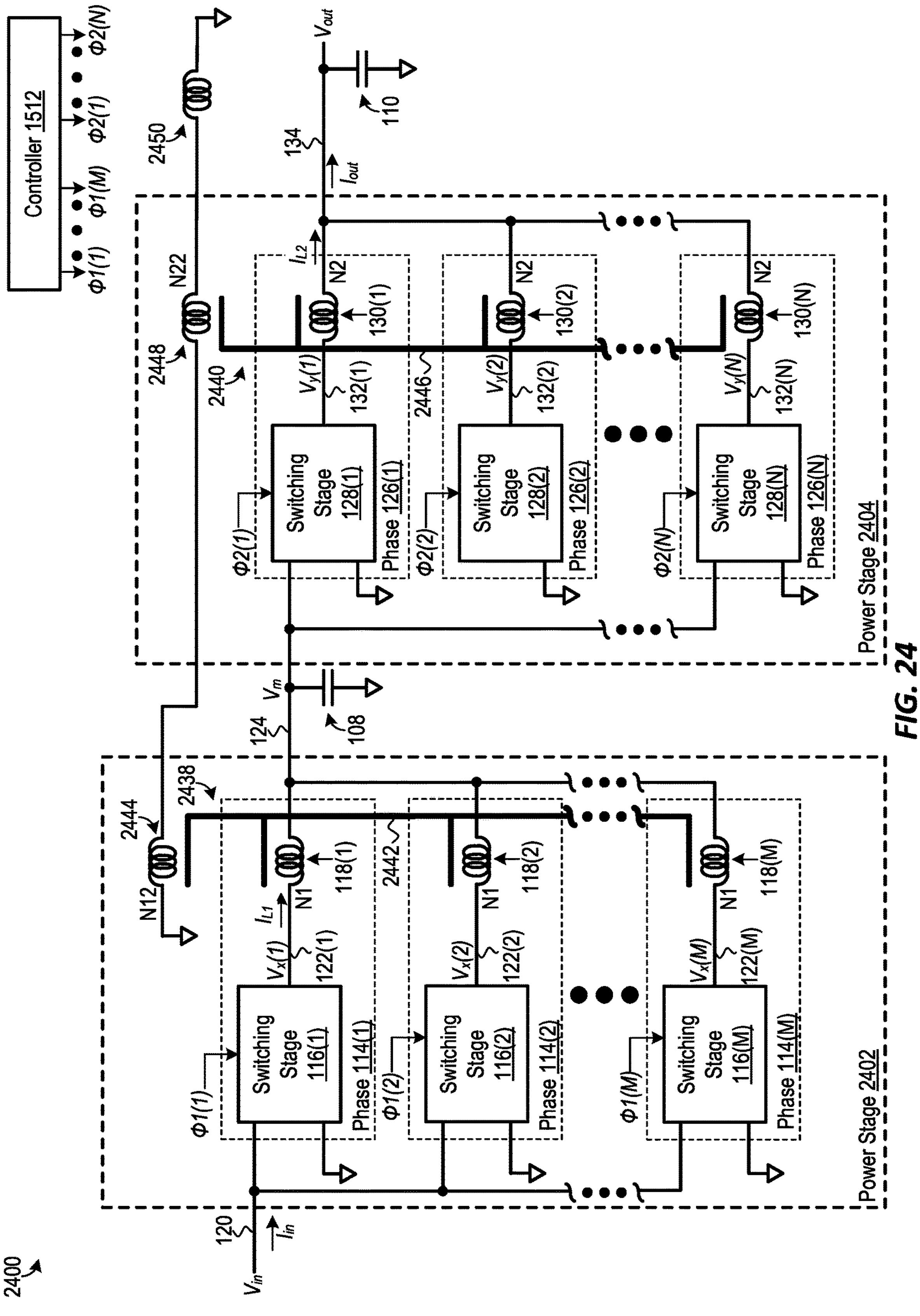
FIG. 24 is a schematic diagram of an alternate embodiment of the FIG. 15 two-stage switching power converter where power transfer windings of power stages are electrically coupled, instead of magnetically coupled.

The two-stage switching power converters discussed above could be modified so that power transfer windings of the two power stages are electrically coupled, instead of being magnetically coupled. For example, FIG. 24 is a schematic diagram of a two-stage switching power converter 2400, which is an alternate embodiment of two-stage switching power converter 1500 where power transfer windings of the power stages are electrically coupled. First power stage 1502 and second power stage 604 of two-stage switching power converter 1500 are replaced with a first power stage 2402 and second power stage 2404, respectively, in two-stage switching power converter 2400. Additionally, coupled inductor 1506 of two-stage switching power converter 1500 is replaced with two coupled inductors 2438 and 2440 in two-stage switching power converter 2400.

First power stage 2402 is like first power stage 1502 except that first power stage 2402 includes coupled inductor 2438 in place of coupled inductor 1506. Coupled inductor 2438 includes a magnetic core 2442, M first power transfer windings 118, and a first boost winding 2444. Magnetic core 2442 magnetically couples each first power transfer winding 118 with each other first power transfer winding 118. Additionally, magnetic core 2442 magnetically couples first boost winding 2444 with each first power transfer winding 118. Magnetic core 2442 is formed, for example, of a ferrite magnetic material or of an iron powder magnetic material. However, magnetic core 2442 could alternately be an air core. First boost winding 2444 forms a quantity of turns equal to N12.

Second power stage 2404 is like second power stage 604 except that second power stage 2404 includes coupled inductor 2440 in place of coupled inductor 1506. Coupled inductor 2440 includes a magnetic core 2446, N second power transfer windings 130, and a second boost winding 2448. Magnetic core 2446 magnetically couples each second power transfer winding 130 with each other second power transfer winding 130. Additionally, magnetic core 2446 magnetically couples second boost winding 2448 with each second power transfer winding 130. Magnetic core 2446 is formed, for example, of a ferrite magnetic material or of an iron powder magnetic material. However, magnetic core 2446 could alternately be an air core. Second boost winding 2448 forms a quantity of turns equal to N22.

First boost winding 2444 and second boost winding 2448 are electrically coupled in series via an optional inductor 2450 and ground, such that first boost winding 2444, second boost winding 2448, and inductor 2450 are electrically coupled in a loop. In particular, first boost winding 2444 is electrically coupled between ground and second boost winding 2448, second boost winding 2448 is electrically coupled between first boost winding 2444 and inductor 2450, and inductor 2450 is electrically coupled between second boost winding 2448 and ground. In embodiments where inductor 2450 is omitted, second boost winding 2448 is electrically coupled between first boost winding 2444 and ground. Inductor 2450 is used, for example, to limit swing in magnitude of voltage $V_m$, such as in applications where magnitude of voltage $V_{in}$ and/or voltage $V_{out}$ may significantly vary during operation of two-stage switching power converter 2400. The topological location of inductor 2450 may vary as long as it is electrically coupled in series with each of first boost winding 2444 and second boost winding 2448. In some alternate embodiments, first boost winding 2444 and second boost winding 2448 are electrically coupled in series via one or more electrical nodes other than ground.

Coupled inductor 2438 and coupled inductor 2440 are electrically linked via first boost winding 2444 and second boost winding 2448. It should be noted that first power stage 2402 and second power stage 2404 are linked by AC and not DC via boost windings 2444 and 2448, which eliminates possibility of DC, or DC magnetic flux imbalance, between first power stage 2402 and second power stage 2404 via their magnetic elements. In certain embodiments, coupled inductor 2438 and coupled inductor 2440 are separately optimized for their respective power stages 2402 and 2404, such as by separately optimizing N1 and N2. Additionally, in some embodiments, N12 and N22 are separately optimized to achieve desired AC waveforms in first power stage 2402 and second power stage 2404. Particular embodiments of two-stage switching power converter 2400 conform to EQN. 15 below to help minimize ripple current magnitude.

$$\frac{N1*N22}{N2*N12}=\frac{V_{in}}{V_m} \quad \text{(EQN. 15)}$$

Electrically linking power stages may increase ripple current magnitude, depending on factors such as number of linked phases and operating duty cycle. However, electrically linking power stages advantageously increases switching power converter transient response, often at a greater rate than ripple current increases. Additionally, inductor 2450 can potentially be used to mitigate increase in ripple current magnitude resulting from electrically linking power stages, with the potential drawback of decreased transient response. Controller 1512 is configured to generate control signals Φ1 and Φ2, for example, in a manner similar to that discussed above with respective to two-stage switching power converter 1500, such as similar to that illustrated in FIGS. 16, 18A-18H, 19A-19H, 20, or 21A to 21H.

Figure 25:
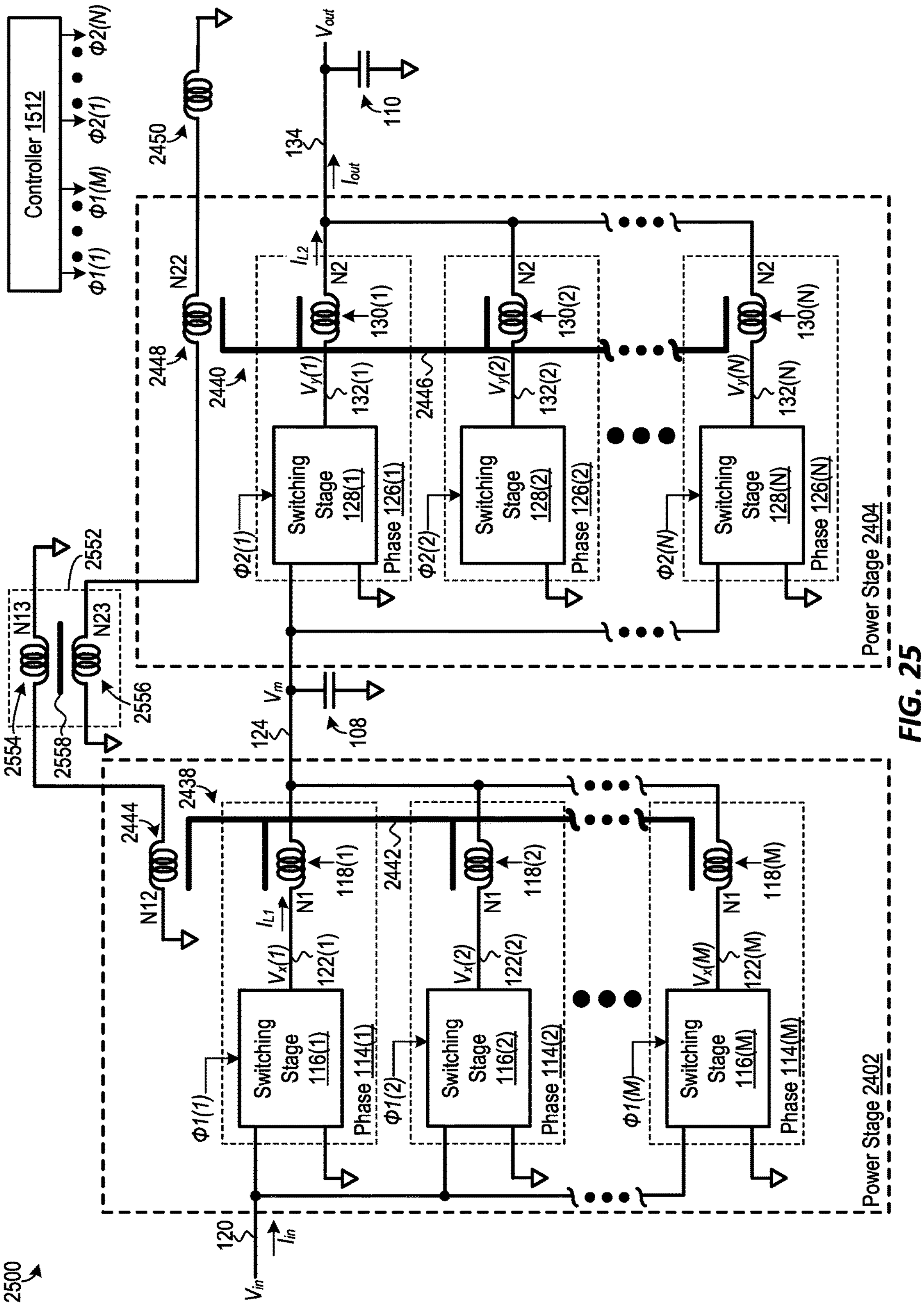
FIG. 25 is a schematic diagram of an alternate embodiment of the FIG. 24 two-stage switching power converter further including a transformer.

FIG. 25 is a schematic diagram of a two-stage switching power converter 2500, which is an alternate embodiment of two-stage switching power converter 2400 further including a transformer 2552 including a first transformer winding 2554, a second transformer winding 2556, and a magnetic core 2558. Magnetic core 2558 magnetically couples first transformer winding 2554 and second transformer winding 2556. First transformer winding 2554 forms a quantity of turns equal to N13, and second transformer winding 2556 forms a quantity of turns equal to N23. Transformer 2552 electrically couples first boost winding 2444 and second boost winding 2448, such that the two boost windings are electrically coupled in series via transformer 2552. Specifically, first boost winding 2444 is electrically coupled to first transformer winding 2554, and second boost winding 2448 is electrically coupled to second transformer winding 2556. Additionally, first transformer winding 2554 is electrically coupled between first boost winding 2444 and ground, and second transformer winding 2556 is electrically coupled between ground and second boost winding 2448.

As discussed above, first power stage 2402 and second power stage 2404 are linked by AC and not by DC, and transformer 2552 can therefore be used to electrically link the two power stages. Inclusion of transformer 2552 in two-stage switching power converter 2500 may allow additional flexibility in optimizing coupled inductor 2438 and/or coupled inductor 2440. For example, transformer 2552 may allow additional flexibility in selecting number of turns of each of coupled inductors 2438 and 2440, thereby enabling each of first boost winding 2444 and second boost winding 2448 to be single turn windings, such as to minimize coupled inductor complexity and to maximize available magnetic core window space for power transfer windings, while achieving a desired ratio of voltage $V_{in}$ to voltage $V_m$. Particular embodiments of two-stage switching power converter 2400 conform to EQN. 16 to help minimize ripple current magnitude.

$$\frac{N1*N22*N13}{N2*N11*N23}=\frac{V_{in}}{V_m} \quad \text{(EQN. 16)}$$

Figure 26:
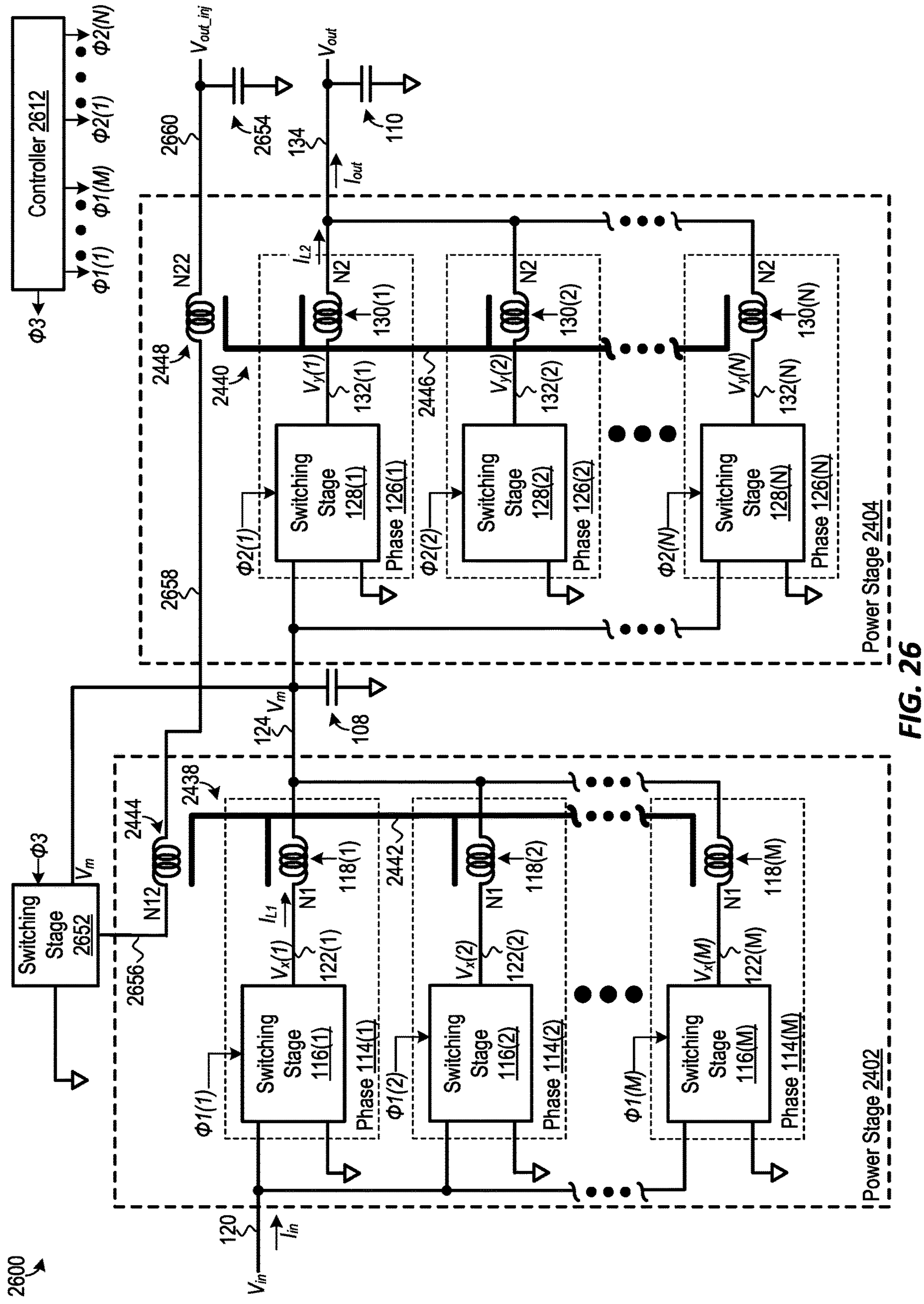
FIG. 26 is a schematic diagram of an alternate embodiment of the FIG. 24 two-stage switching power converter further including an injection switching stage and an injection capacitor.

FIG. 26 is a schematic diagram of a two-stage switching power converter 2600, which is an alternate embodiment of two-stage switching power converter 2400 further including an injection switching stage 2652 and a filtering capacitor 2654. Additionally, two-stage switching power converter 2600 includes a controller 2612 in place of controller 1512. Optional inductor 2450 is not shown in FIG. 26. Injection switching stage 2652 is electrically coupled between intermediate power node 124, a switching node 2656, and ground. First boost winding 2444 is electrically coupled between switching node 2656 and a connection node 2658, and second boost winding 2448 is electrically coupled between connection node 2658 and an injection output node 2660. Accordingly, first boost winding 2444 and second boost winding 2448 are electrically coupled in series between switching node 2656 and injection output node 2660. Filtering capacitor 2654 is electrically coupled between injection output node 2660 and ground.

Figure 32A:
FIGS. 32A, 32B, 32C, 32D, 32E, 32F, and 32G are graphs collectively illustrating one example of simulated operation of the FIG. 26 two-stage switching power converter.
Figure 32B:
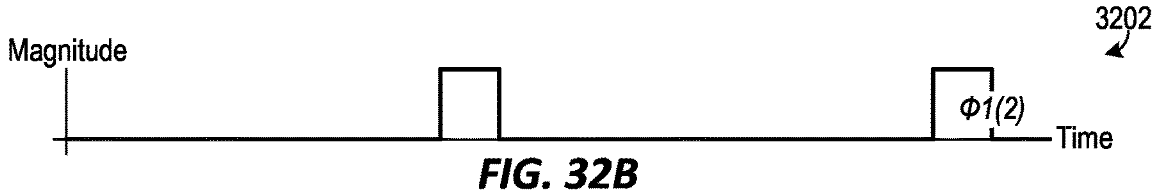
Figure 32C:
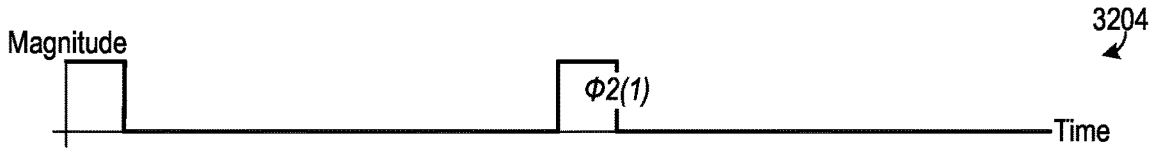
Figure 32D:
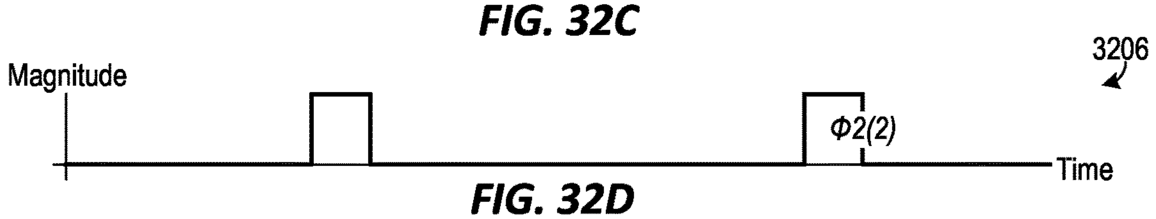
Figure 32E:
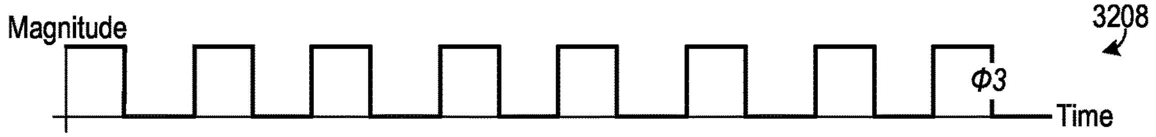
Figure 32F:
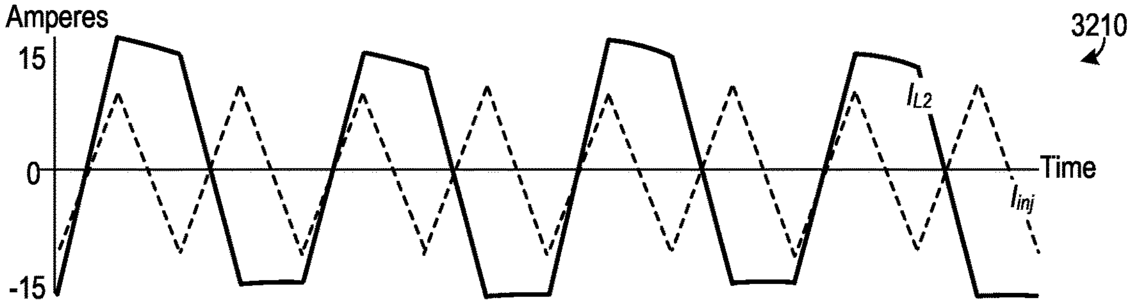
Figure 32G:
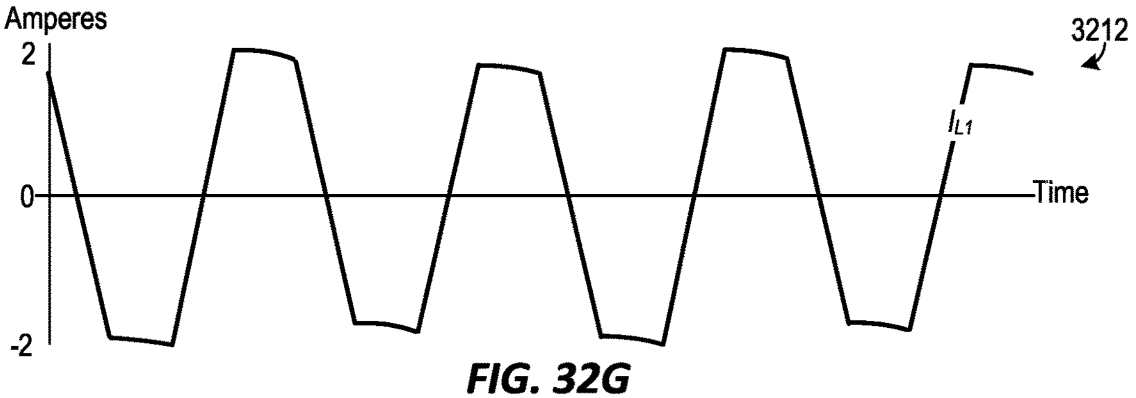

Controller 2612 is an alternate embodiment of controller 1512 of FIG. 15 that is further configured to generate a control signal Φ3 for controlling injection switching stage 2652. Controller 2612 is configured to repeatedly switch switching node 2656 between voltage $V_m$ of intermediate power node 124 and ground in response to control signal Φ3 generated by controller 2612. The series combination of first boost winding 2444 and second boost winding 2448 is driven "high" when switching node 2656 is at voltage $V_m$, i.e., when switching node 2656 is electrically coupled to intermediate power node 124, and the series combination of first boost winding 2444 and second boost winding 2448 is driven "low" when switching node 2656 is at zero volts relative to ground, i.e., when switching node 2656 is electrically coupled to ground. Injection output node 2660 has a voltage $V_{out\_inj}$. Injection switching stage 2652 will achieve zero voltage switching (ZVS) due to there being no DC flowing through first boost winding 2444 and second boost winding 2448. The current ripple in switching node 2656 will be half positive, half negative at any load at $V_0$ (see, e.g., $I_{inj}$ in FIG. 32F, discussed below), which will help to charge the voltage at switching node 2656 appropriately towards $V_m$ or ground during the related switching transition. In particular embodiments, controller 2612 is configured to generate control signal Φ3 such that (a) control signal Φ3 is asserted whenever any one or more of control signals Φ1 and Φ2 are asserted and (b) control signal Φ3 is de-asserted whenever all control signals Φ1 and Φ2 are de-asserted. In these embodiments, switching frequency $F_{inj}$ of injection switching stage 2652 is given by EQN. 17 below, where $F_s$ is switching frequency of second power stage 2404.

$$F_{inj} = F_s * (M + N) \quad \text{(EQN. 17)}$$

Figure 27:
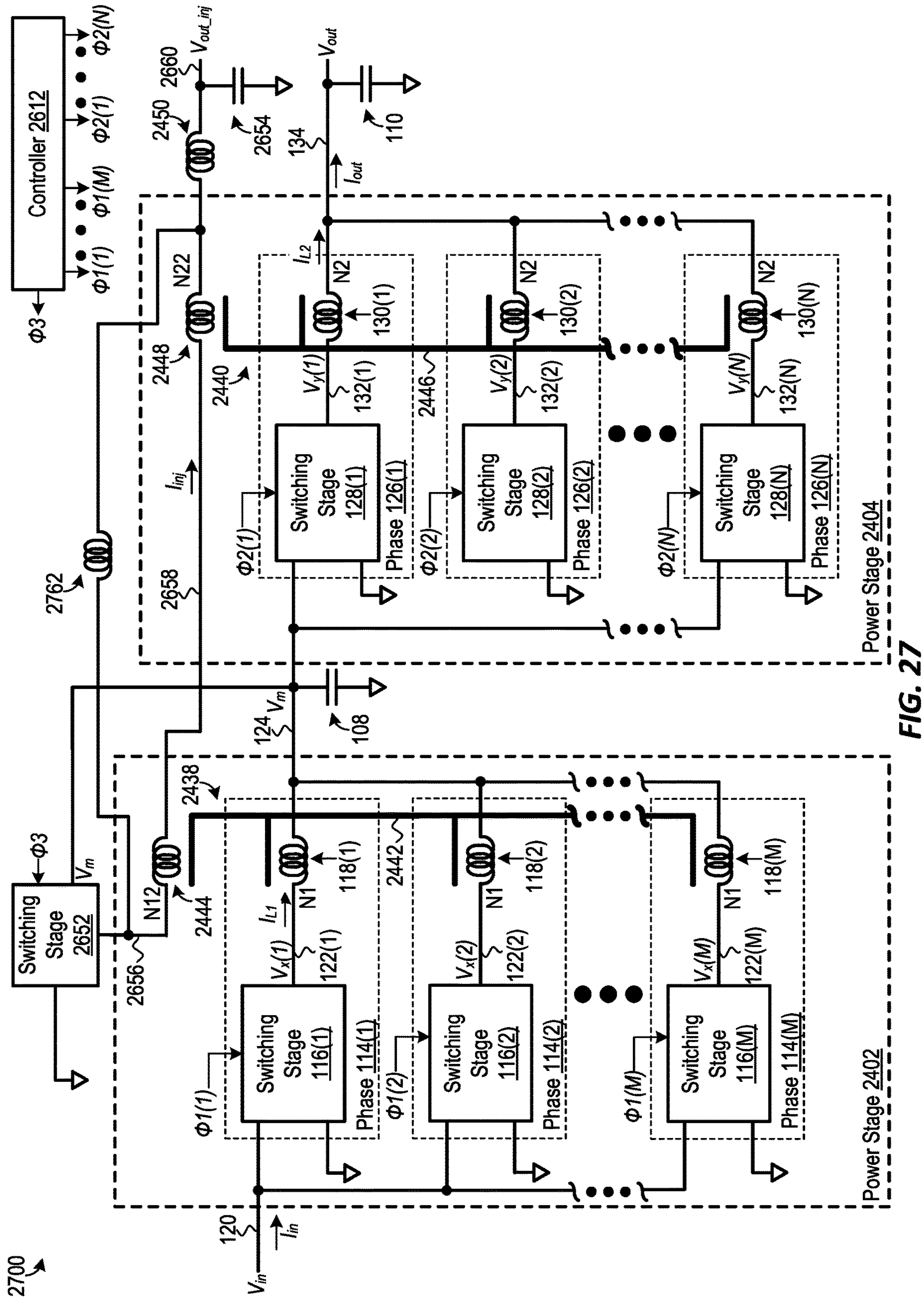
FIG. 27 is a schematic diagram of an alternate embodiment of the FIG. 26 two-stage switching power converter further including two inductors.

FIG. 27 is a schematic diagram of a two-stage switching power converter 2700, which is an alternate embodiment of two-stage switching power converter 2600 (FIG. 26) further including optional inductor 2450 and an optional tuning inductor 2762. Inductor 2450 is electrically coupled between second boost winding 2448 and injection output node 2660, such that second boost winding 2448 is electrically coupled to injection output node 2660 via inductor 2450. Tuning inductor 2762 is electrically coupled in parallel with the series combination of first boost winding 2444 and second boost winding 2448. The topological location of inductor 2450 may vary as long as it is electrically coupled in series with each of first boost winding 2444 and second boost winding 2448. Additionally, two-stage switching power converter 2700 could be modified to include only one of inductor 2450 and tuning inductor 2762, instead of both of inductor 2450 and tuning inductor 2762.

Figure 28:
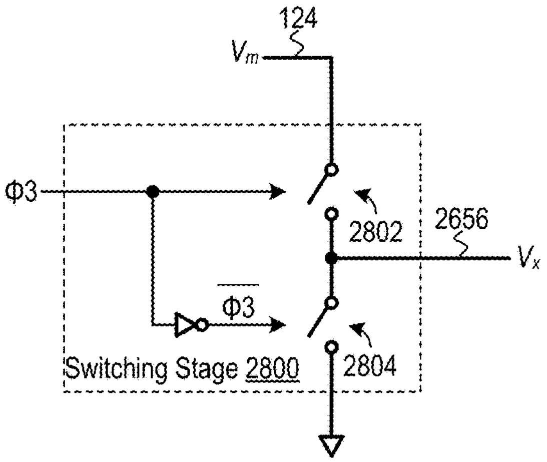
FIG. 28 is a schematic diagram of one possible embodiment of an injection switching stage of the FIG. 26 two-stage switching power converter.

FIG. 28 is a schematic diagram of an injection switching stage 2800, which is one possible embodiment of injection switching stage 2652 of FIGS. 26 and 27. Injection switching stage 2800 includes an upper switching device 2802 and a lower switching device 2804. Upper switching device 2802 is electrically coupled between intermediate power node 124 and switching node 2656, and lower switching device 2804 is electrically coupled between switching node 2656 and ground. Upper switching device 2802 switches in response to control signal Φ3 from controller 2612, and lower switching device 2804 switches in response to an inverted version of control signal Φ3 from controller 2612. For example, in some embodiments, upper switching device 2802 operates in its on (conductive) state when control signal Φ3 is asserted, and upper switching device 2802 operates in its off (non-conductive state) when control signal Φ3 is de-asserted. Similarly, in some embodiments, lower switching device 2804 operates in its on (conductive) state when control signal Φ3 is de-asserted, and lower switching device 2804 operates in its off (non-conductive state) when control signal Φ3 is asserted. In some alternate embodiments, controller 2612 generates a respective control signal (not shown) for each of upper switching device 2802 and lower switching device 2804, and lower switching device 2804 is accordingly controlled by its own control signal, instead of by an inverted version of control signal Φ3. Each switching device 2802 and 2804 includes, for example, one or more transistors and optional driver circuitry for driving the one or more transistors.

Referring again to FIG. 26, inclusion of injection switching stage 2652 in two-stage switching power converter 2600 may help reduce ripple current magnitude, thereby helping offset potential ripple current increase caused by electrically coupling first power stage 2402 and second power stage 2404. As such, inclusion of injection switching stage 2652 in two-stage switching power converter 2600 promotes flexibility in respective duty cycles of first power stage 2402 and second power stage 2404, as well as ability to control duty cycle of one of the power stages independently of the duty cycle of the other power stage, such to help maintain a fixed magnitude of voltage $V_m$ as magnitude of input voltage $V_{in}$ changes. The fact that injection switching stage 2652 is electrically coupled to intermediate power node 124 may be particularly beneficial in applications where magnitude of voltage $V_m$ is significantly less than magnitude of voltage $V_{in}$ to help minimize required voltage of switching devices of injection switching stage 2652. However, injection switching stage 2652 could be electrically coupled to a different electrical node than intermediate power node 124, such as another power supply node, such that switching node 2656 is switched between ground and a voltage other than $V_m$.

In some situations, injection switching stage 2652 may impair transient response of two-stage switching power converter 2600 by switching in response to application of a transient load to two-stage switching power converter 2400. Therefore, certain embodiments of controller 2612 disable operation of injection switching stage 2652 when two-stage switching power converter 2400 is supplying a transient load. Additionally, some other embodiments of controller 2612 are configured to change operation of injection switching stage 2652 when two-stage switching power converter 2400 is supplying a transient load such that injection switching stage 2652 improves, rather than impairs, transient response of two-stage switching power converter 2600. Furthermore, in some other embodiments, controller 2612 is configured to generate control signal Φ3 such that injection switching stage 2652 does not react to a transient load applied to two-stage switching power converter 2600.

Figure 29:
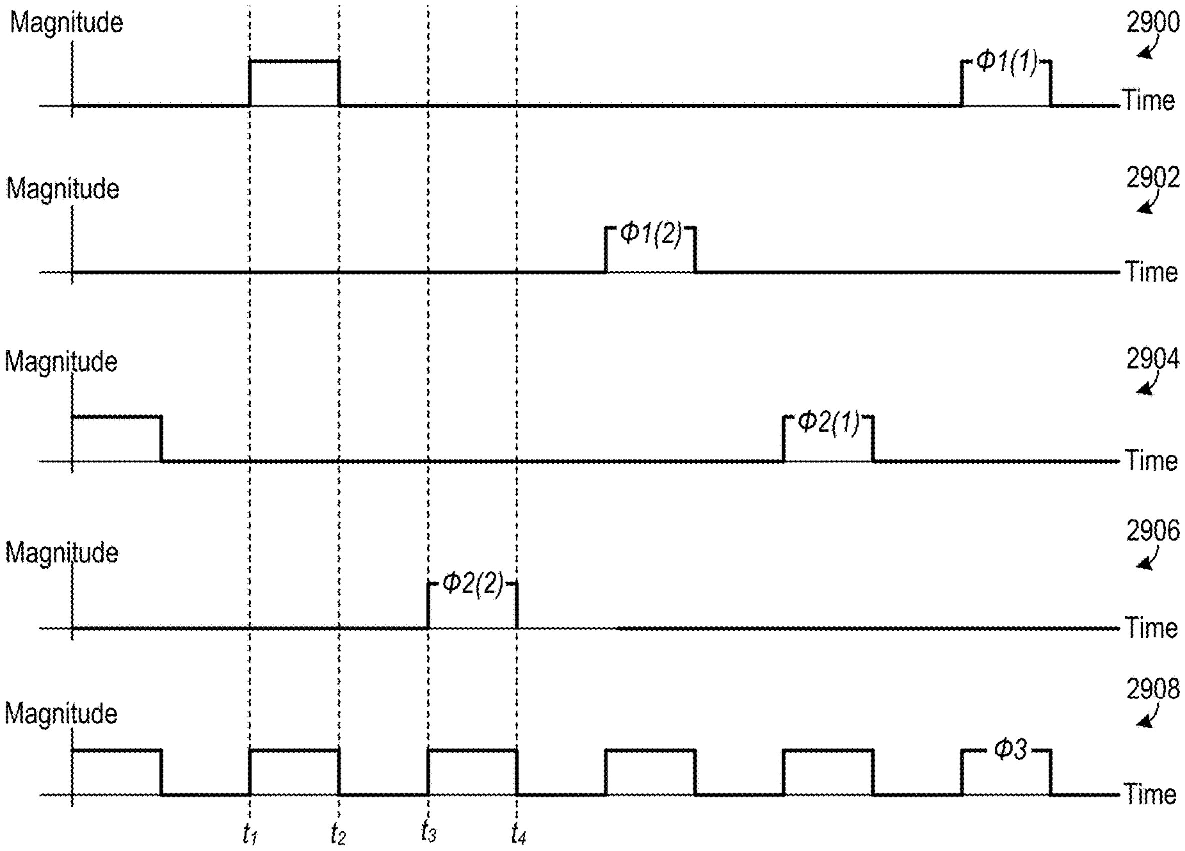
FIG. 29 includes five graphs collectively illustrating one example of a first control signal, a second control signal, a third control signal, a fourth control signal, and a fifth control signal, of the FIG. 26 two-stage switching power converter.

FIG. 29 includes five graphs 2900, 2902, 2904, 2906, and 2908 of magnitude versus time collectively illustrating one example of control signals Φ1(1), Φ1(2), Φ2(1), Φ2(2), and Φ3 as generated by controller 2612 in embodiment of two-stage switching power converter 2600 where M=2 and N=2, i.e., where first power stage 2402 includes two phases 114 and second power stage 2404 includes two phases 126. Graphs 2900, 2902, 2904, 2906, and 2908 assume that (a) each of control signals Φ1(1), Φ1(2), Φ2(1), Φ2(2), and Φ3 is asserted when in a logic high state, (b) each of phase 114(1), phase 114(2), phase 126(1), and phase 126(2) drives its respective power transfer winding 118(1), 118(2), 130(1), and 130(2) high in response to its respective control signal Φ1(1), Φ1(2), Φ2(1), and Φ2(2) being asserted, and (c)

injection switching stage 2652 drives switching node 2656 high in response to control signal Φ3 being asserted. However, control signals Φ1(1), Φ1(2), Φ2(1), Φ2(2), and Φ3 could have other polarities without departing from the scope hereof, and phases 114, phases 126, and injection switching stage 2652 could respond to respective control signals Φ1(1), Φ1(2), Φ2(1), Φ2(2), and Φ3 in a different manner. Graph 2900 includes a curve illustrating control signal Φ1(1), graph 2902 includes a curve illustrating control signal Φ1(2), graph 2904 includes a curve representing control signal Φ2(1), graph 2906 includes a curve representing control signal Φ2(2), graph 2908 includes a curve representing control signal Φ3, and graphs 2900, 2902, 2904, 2906, and 2908 have a common time base. In some alternate embodiments, control signals Φ1 are complementary to control signals Φ2. For example, phases 114 may alternately switch in a complementary manner to each phase 126.

In the example of FIG. 29, controller 2612 generates control signal Φ3 such that (a) control signal Φ3 is asserted whenever any one or more of control signals Φ1 and Φ2 are asserted and (b) control signal Φ3 is de-asserted whenever all control signals Φ1 and Φ2 are de-asserted. For example, controller 2612 asserts control signal Φ3 at time $t_1$ in response to control signal Φ1(1) being asserted, and controller 2612 de-asserts control signal Φ3 at time $t_2$ in response to control signal Φ1(1) being de-asserted. As another example, controller 2612 asserts control signal Φ3 at time $t_3$ in response to control signal Φ2(2) being asserted, and controller 2612 de-asserts control signal Φ3 at time $t_4$ in response to control signal Φ2(2) being de-asserted.

FIGS. 30A-32G collectively illustrate one example of how electrically coupling power stages may affect ripple current. In particular, FIGS. 30A-30G collectively illustrate results of a simulation of an embodiment of two-stage switching power converter 2400 where M=2, N=2, $V_{in}$=48 volts, $V_m$=5.9 volts, and $V_{out}$=0.8 volt. Additionally, the simulation of FIGS. 30A-30G assumes that the electrical connection between first boost winding 2444 and second boost winding. 2448 is broken, so that there is no electrical coupling between the two boost windings. FIGS. 30A-30G are graphs 3000, 3002, 3004, 3006, 3008, 3010, and 3012, which have a common time base. Graphs 3000-3008 are of signal magnitude versus time, and graphs 3000-3008 include curves representing control signal Φ1(1), control signal Φ1(2), control signal Φ2(1), control signal Φ2(2), and control signal Φ3, respectively, where each of the aforementioned control signals is asserted when in a logic high state. Each of graphs 3010 and 3012 is of current in amperes versus time. Graph 3010 includes a curve representing current $I_{L2}$ through second power transfer winding 130(1) (see FIG. 24), and graph 3012 includes a curve representing current $I_{L1}$ through first power transfer winding 118(1) (see FIG. 24). As illustrated in FIGS. 30F and 30G, peak-to-peak ripple magnitude of current $IL_1$ is approximately 6 amperes, and peak-to-peak ripple magnitude of current $IL_2$ is approximately 48 amperes.

Figure 30A:
FIGS. 30A, 30B, 30C, 30D, 30E, 30F, and 30G are graphs collectively illustrating one example of simulated operation of the FIG. 24 two-stage switching power converter with a connection between first and second boost windings broken.
Figure 30B:
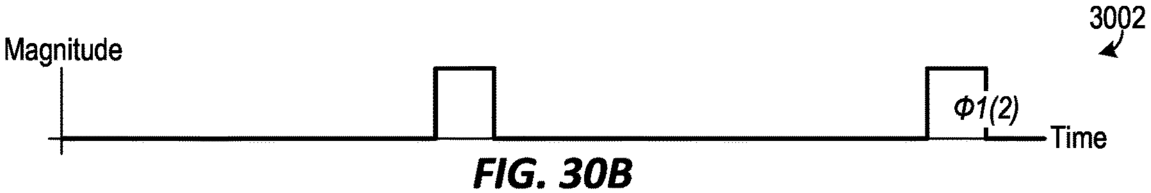
Figure 30C:
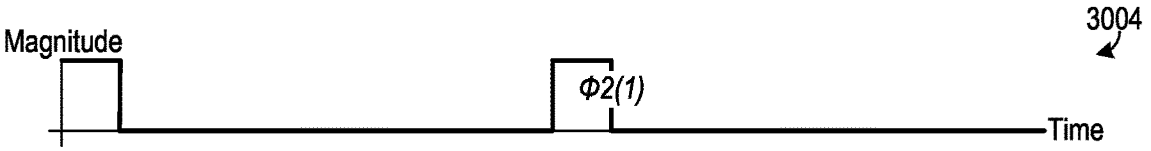
Figure 30D:
Figure 30E:
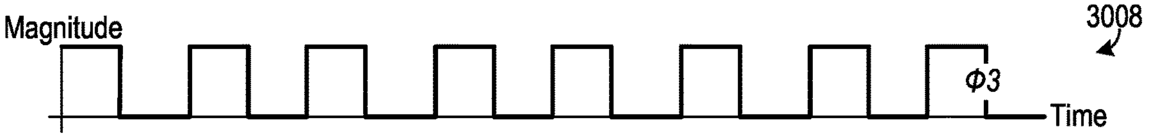
Figure 30F:
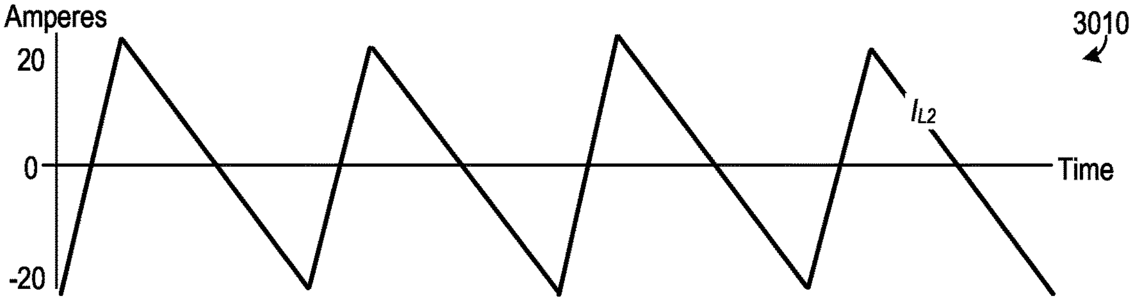
Figure 30G:
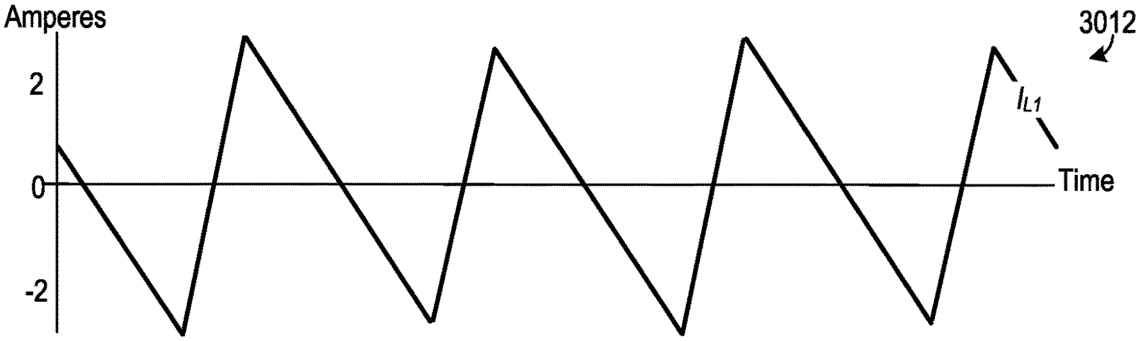
Figure 31A:
FIGS. 31A, 31B, 31C, 31D, 31E, 31F, and 31G are graphs collectively illustrating one example of simulated operation of the FIG. 24 two-stage switching power converter with the connection between first and second boost windings restored.
Figure 31B:
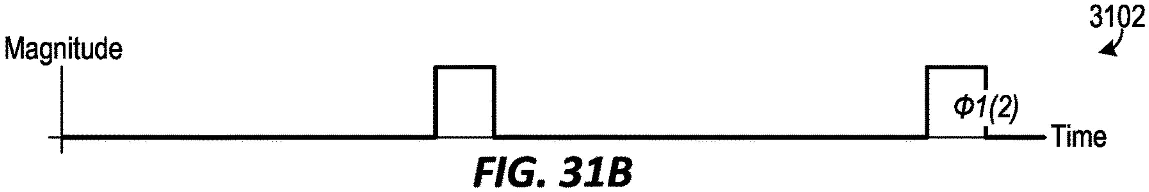
Figure 31C:
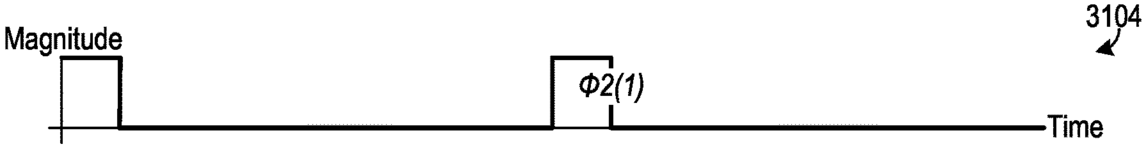
Figure 31D:
Figure 31E:
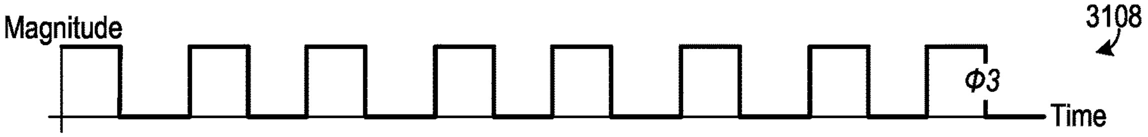
Figure 31F:
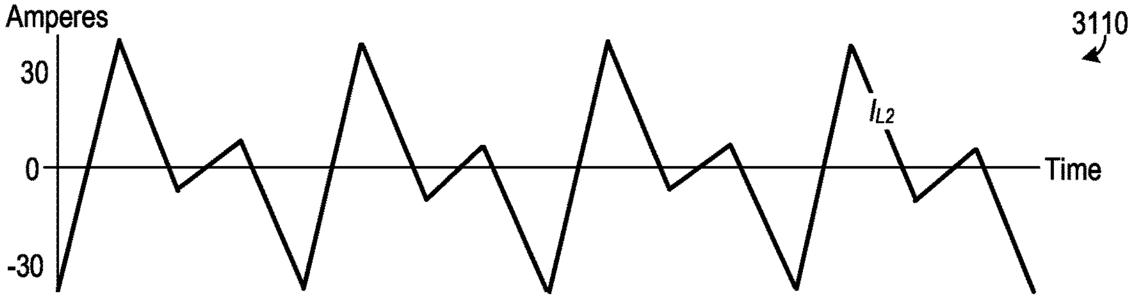
Figure 31G:
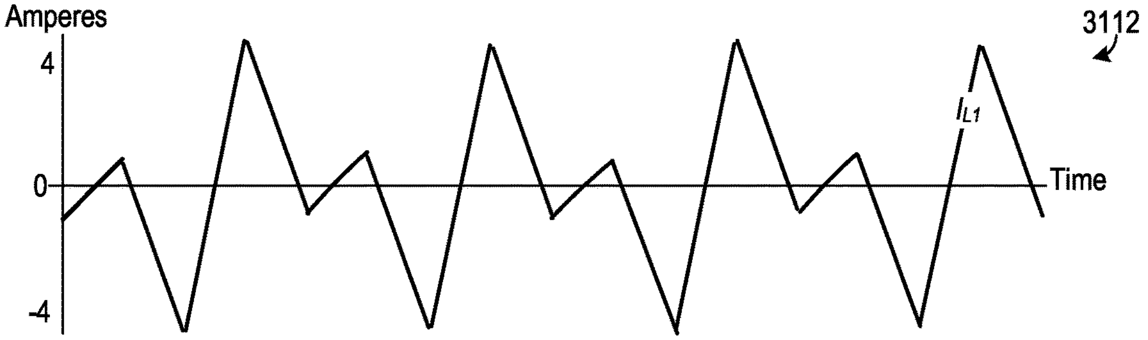

FIGS. 31A-31G collectively illustrate results of a simulation of an embodiment of two-stage switching power converter 2400 under the same conditions as FIGS. 30A-30G but with the electrical connection between first boost winding 2444 and second boost winding 2448 restored, so that there is now electrical coupling between the two boost windings. FIGS. 31A-31G are graphs 3100, 3102, 3104, 3106, 3108, 3110, and 3112, which have a common time base. Graphs 3100-3108 are of signal magnitude versus time, and graphs 3100-3108 include curves representing control signal Φ1(1), control signal Φ1(2), control signal Φ2(1), control signal Φ2(2), and control signal Φ3, respectively, where each of the aforementioned control signals is asserted when in a logic high state. Each of graphs 3110 and 3112 is of current in amperes versus time. Graph 3110 includes a curve representing current $I_{L2}$ through second power transfer winding 130(1) (see FIG. 24), and graph 3112 includes a curve representing current $I_{L1}$ through first power transfer winding 118(1) (see FIG. 24). As illustrated in FIGS. 31F and 31G, peak-to-peak ripple magnitude of current $IL_1$ is approximately 10 amperes, and peak-to-peak ripple magnitude of current $IL_2$ is approximately 79 amperes. As such, electrically coupling first boost winding 2444 and second boost winding 2448 significantly increased ripple current magnitude. However, electrically coupling first boost winding 2444 and second boost winding 2448 will typically improve transient response of two-stage switching power converter 2400.

FIGS. 32A-32G collectively illustrate results of a simulation of an embodiment of two-stage switching power converter 2600 under the same conditions as FIGS. 30A-30G, i.e., where M=2, N=2, $V_{in}$=48 volts, $V_m$=5.9 volts, and $V_{out}$=0.8 volt. FIGS. 32A-32G are graphs 3200, 3202, 3204, 3206, 3208, 3210, and 3212, which have a common time base. Graphs 3200-3208 are of signal magnitude versus time, and graphs 3200-3208 include curves representing control signal Φ1(1), control signal Φ1(2), control signal Φ2(1), control signal Φ2(2), and control signal Φ3, respectively, where each of the aforementioned control signals is asserted when in a logic high state. Each of graphs 3210 and 3212 is of current in amperes versus time. Graph 3210 includes a curve representing current $I_{L2}$ through second power transfer winding 130(1) and a curve representing current $I_{inj}$ through first boost winding 2444 and second boost winding 2448 (see FIG. 26), and graph 3212 includes a curve representing current $I_{L1}$ through first power transfer winding 118(1) (see FIG. 26). As illustrated in FIGS. 30F and 30G, peak-to-peak ripple magnitude of current $IL_1$ is approximately 4 amperes, and peak-to-peak ripple magnitude of current $IL_2$ is approximately 34 amperes. As such, inclusion of injection switching stage 2652 reduces ripple current magnitude to values that are even lower than those of the non-coupled example of FIGS. 30A-32G, with the potential benefit of improved transient response associated with electrically coupling first boost winding 2444 and second boost winding 2448, assuming that controller 2612 controls injection switching stage 2652 in a manner such that injection switching stage 2652 does not materially impair transient response of two-stage switching power converter 2600. Adding injection switching stage 2652 can therefore substitute for the condition of all control signals Φ1 and Φ2 being complementary to improve current ripple cancellation. Using non-complementary drive signals can help to keep $V_m$ constant and at desirable value for any $V_{in}$ or $V_{out}$ changes, thereby enabling optimal voltage rating for semiconductors in second power stage 2404, optimizing the transient performance, etc.

Figure 33:
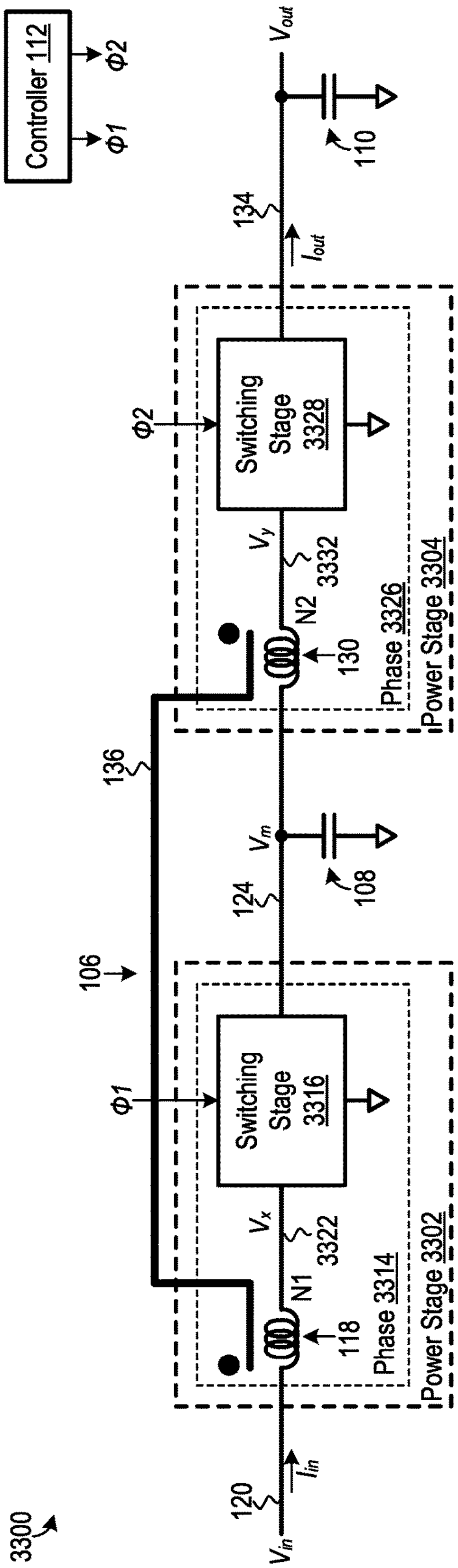
FIG. 33 is a schematic diagram of an alternate embodiment of the FIG. 1 two-stage switching power converter having a boost-type topology.

The two-stage switching power converters discussed above have a buck-type topology. However, the any of the two-stage switching power converters discussed herein could be modified to have a different topology, including but not limited to a boost-type topology or a buck-boost-type topology, or a combination of different topologies. For example, inverting buck-boost-type first power stage can be followed by a buck-type second power stage. As another example, FIG. 33 is a schematic diagram of a two-stage switching power converter 3300, which is an alternate embodiment of two-stage switching power converter 100 (FIG. 1) having a boost-type topology. Two-stage switching power converter 3300 includes a first power stage 3302 and second power stage 3304 in place of first power stage 102 and second power stage 104, respectively. First power stage 3302 includes a phase 3314 in place of phase 114, and phase 3314 includes a switching stage 3316 in place of switching stage 116. First power transfer winding 118 is electrically coupled between input power node 120 and a switching node 3322. Switching stage 3316 is electrically coupled between switching node 3322, intermediate power node 124, and ground.

Switching stage 3316 is configured to repeatedly switch switching node 3322 between intermediate power node 124 and ground, in response to control signal Φ1 generated by controller 112. For example, in some embodiments, switching stage 3316 is configured to electrically couple switching node 3322 to intermediate power node 124 when control signal Φ1 is asserted, and switching stage 3316 is configured to electrically couple switching node 3322 to ground when control signal Φ1 is de-asserted. First power transfer winding 118 is driven "high" in phase 3314 when its respective switching node 3322 is at voltage $V_m$, i.e., when switching node 3322 is electrically coupled to intermediate power node 124, and first power transfer winding 118 is driven "low" in phase 3314 when its respective switching node 3322 is at zero volts relative to ground, i.e., when switching node 3322 is electrically coupled to ground. Controller 112 generates control signal Φ1 so that first power stage 102 converts voltage $V_{in}$ at input power node 120 to a voltage $V_m$ at intermediate power node 124, or vice versa.

Second power stage 3304 includes a phase 3326 in place of phase 126, and phase 3326 includes a switching stage 3328 in place of switching stage 128. Second power transfer winding 118 is electrically coupled between intermediate power node 124 and a switching node 3332. Switching stage 3328 is electrically coupled between switching node 3332, output power node 134, and ground.

Switching stage 3328 is configured to repeatedly switch switching node 3332 between output power node 134 and ground, in response to control signal Φ2 generated by controller 112. For example, in some embodiments, switching stage 3328 is configured to electrically couple switching node 3332 to output power node 134 when control signal Φ2 is asserted, and switching stage 3328 is configured to electrically couple switching node 3332 to ground when control signal Φ2 is de-asserted. Second power transfer winding 130 is driven "high" in phase 3326 when its respective switching node 3332 is at voltage $V_{out}$, i.e., when switching node 3332 is electrically coupled to output power node 134, and second power transfer winding 130 is driven "low" in phase 3326 when its respective switching node 3332 is at zero volts relative to ground, i.e., when switching node 3332 is electrically coupled to ground. Controller 112 generates control signal Φ2 so that first power stage 3302 converts voltage $V_m$ at intermediate power node 124 to a voltage $V_{out}$ at output power node 134, or vice versa. Controller 112 generates controls signal Φ1 so that first power stage 3302 switches in a complementary manner with respect to second power stage 3304 in a manner analogous to that discussed above with respect to two-stage switching power converter 100. Additionally, controller 112 generates control signal Φ2 to regulate one or more parameters of two-stage switching power converter 3300.

Figure 34:
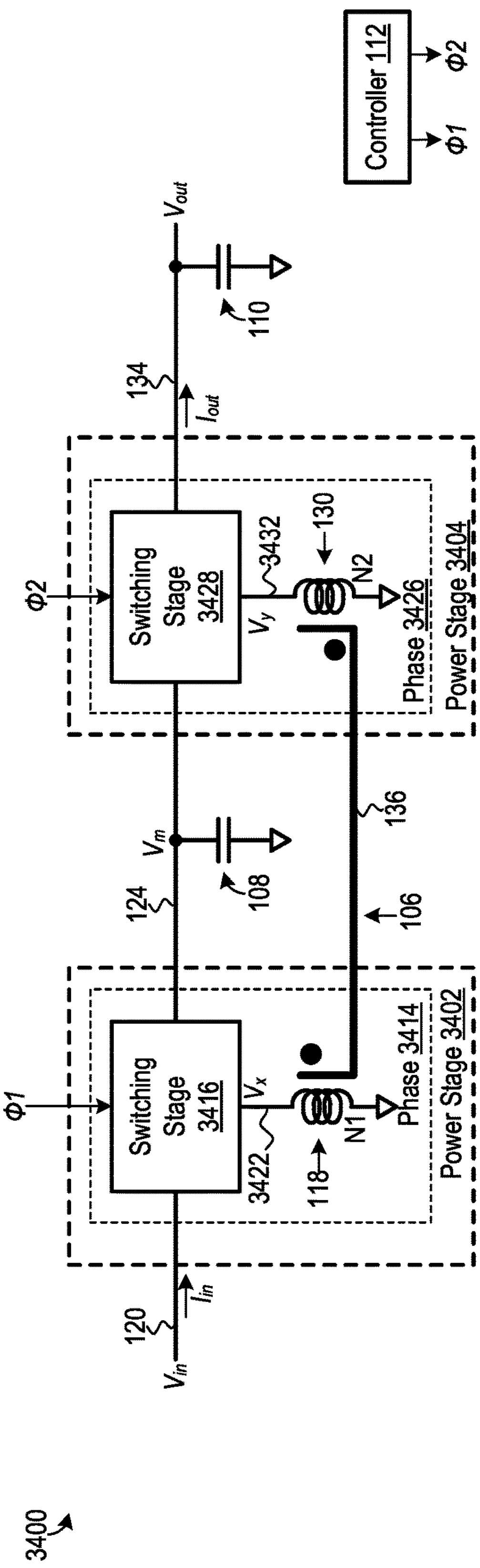
FIG. 34 is a schematic diagram of an alternate embodiment of the FIG. 1 two-stage switching power converter having a buck-boost-type topology

FIG. 34 is a schematic diagram of a two-stage switching power converter 3400, which is an alternate embodiment of two-stage switching power converter 100 (FIG. 1) having a buck-boost-type topology. Two-stage switching power converter 3400 includes a first power stage 3402 and second power stage 3404 in place of first power stage 102 and second power stage 104, respectively. First power stage 3402 includes a phase 3414 in place of phase 114, and phase 3414 includes a switching stage 3416 in place of switching stage 116. First power transfer winding 118 is electrically coupled between a switching node 3422 and ground. Switching stage 3416 is electrically coupled between input power node 120, intermediate power node 124, and switching node 3422.

Switching stage 3416 is configured to repeatedly switch switching node 3422 between input power node 120 and intermediate power node 124, in response to control signal Φ1 generated by controller 112. For example, in some embodiments, switching stage 3416 is configured to electrically couple switching node 3422 to input power node 120 when control signal Φ1 is asserted, and switching stage 3416 is configured to electrically couple switching node 3422 to intermediate power node 124 when control signal Φ1 is de-asserted. First power transfer winding 118 is driven "high" in phase 3414 when its respective switching node 3422 is at voltage $V_{in}$, i.e., when switching node 3322 is electrically coupled to input power node 120, and first power transfer winding 118 is driven "low" in phase 3414 when its respective switching node 3422 is at voltage $V_m$, i.e., when switching node 3422 is electrically coupled to intermediate power node 124. Controller 112 generates control signal Φ1 so that first power stage 102 converts voltage $V_{in}$ at input power node 120 to a voltage $V_m$ at intermediate power node 124, or vice versa.

Second power stage 3404 includes a phase 3426 in place of phase 126, and phase 3426 includes a switching stage 3428 in place of switching stage 128. Second power transfer winding 118 is electrically coupled between a switching node 3432 and ground. Switching stage 3428 is electrically coupled between intermediate power node 124, output power node 134, and switching node 3432.

Switching stage 3428 is configured to repeatedly switch switching node 3432 between intermediate power node 124 and output power node 134 in response to control signal Φ2 generated by controller 112. For example, in some embodiments, switching stage 3428 is configured to electrically couple switching node 3432 to intermediate power node 124 when control signal Φ2 is asserted, and switching stage 3428 is configured to electrically couple switching node 3432 to output power node 134 when control signal Φ2 is de-asserted. Second power transfer winding 130 is driven "high" in phase 3426 when its respective switching node 3432 is at voltage $V_m$, i.e., when switching node 3432 is electrically coupled to intermediate power node 124, and second power transfer winding 130 is driven "low" in phase 3426 when its respective switching node 3432 is at voltage $V_{out}$, i.e., when switching node 3432 is electrically coupled to output power node 134. Controller 112 generates control signal Φ2 so that second power stage 3404 converts voltage $V_m$ at intermediate power node 124 to a voltage $V_{out}$ at intermediate power node 124, or vice versa. Controller 112 generates controls signal Φ1 so that first power stage 3402 switches in a complementary manner with respect to second power stage 3404 in a manner analogous to that discussed above with respect to two-stage switching power converter 100. Additionally, controller 112 generates control signal Φ2 to regulate one or more parameters of two-stage switching power converter 3400.

Combinations of Features

Features described above may be combined in various ways without departing from the scope hereof. The following examples illustrate some possible combinations.

(A1) A two-stage switching power converter includes (1) a first power stage including a first power transfer winding, (2) a second power stage electrically coupled in series with the first power stage, the second power stage including a second power transfer winding that is magnetically coupled to the first power transfer winding, and (3) a controller configured to (i) control switching of the second power stage to regulate at least one parameter of the two-stage switching power converter and (ii) control switching of the first power stage such that the first power stage switches in a complementary manner with respect to the second power stage.

(A2) In the two-stage switching power converter denoted as (A1), each of the first power transfer winding and the second power transfer winding may be part of a common coupled inductor.

(A3) In either of the two-stage switching power converters denoted as (A1) or (A2), each of the first power stage and the second power stage may have a respective topology selected from the group consisting of a buck-type topology, a boost type topology, and a buck-boost type topology.

(A4) In any one of the two-stage switching power converters denoted as (A1) through (A3), (1) the second power stage may include a plurality of phases, and (2) the controller may be further configured to control switching of the first power stage such that the first power stage switches in the complementary manner with respect to the second power stage by causing the first power stage to switch in a complementary manner with respect to each phase of the plurality of phases of the second power stage.

(A5) In any one of the two-stage switching power converters denoted as (A1) through (A3), the first power stage may include a plurality of phases.

(A6) In the two-stage switching power converter denoted as (A5), the controller may be further configured to control switching of the first power stage such that the first power stage switches in the complementary manner with respect to the second power stage such that the plurality of phases of the first power stage alternately switch in a complementary manner with respect to the second power stage.

(B1) A two-stage switching power converter includes a first power stage including a first power transfer winding, a second power stage electrically coupled in series with the first power stage, and a controller. The second power stage includes a plurality of phases electrically coupled in parallel with each other, where (i) each phase includes a respective second power transfer winding and (ii) each second power transfer winding is magnetically coupled with each other second power transfer winding and with the first power transfer winding. The controller configured to (i) control switching of each phase of the plurality of phases of the second power stage, to regulate at least one parameter of the two-stage switching power converter, and (ii) control switching of the first power stage such that the first power stage switches in a complementary manner with respect to each phase of the plurality of phases of the second power stage.

(B2) In the two-stage switching power converter denoted as (B1), the first power transfer winding and each second power transfer winding may be part of a common coupled inductor.

(B3) In either one of the two-stage switching power converters denoted as (B1) or (B2), each of the first power stage and the second power stage may have a respective topology selected from the group consisting of a buck-type topology, a boost type topology, and a buck-boost type topology.

(B4) In any one of the two-stage switching power converters denoted as (B1) through (B3), the controller may be further configured to control switching of each phase of the plurality of phases of the second power stage such that the plurality of phases switch in each switching interval of the second power stage without deadtime between successive switching of phases of the plurality of phases.

(B5) In any one of the two-stage switching power converters denoted as (B1) through (B4), the controller may be further configured control switching of each phase of the plurality of phases of the second power stage such that a plurality of the respective second power transfer windings of the plurality of phases of the second power stage are simultaneously driven high during a portion of each switching interval of the second power stage.

(C1) A coupled inductor for a two-stage switching power converter includes a magnetic core including (1) a first connecting element, (2) a second connecting element separated from the first connecting element in a first direction, (3) a plurality of first teeth, each first tooth being disposed between the first connecting element and the second connecting element in the first direction, each first tooth having a respective first cross-sectional area of $Ag_1$ in a plane orthogonal to the first direction, each first tooth forming a first gap having a first thickness $lg_1$ in the first direction, and (4) a plurality of second teeth, each second tooth being disposed between the first connecting element and the second connecting element in the first direction, each second tooth having a respective second cross-sectional area of $Ag_2$ in a plane orthogonal to the first direction, each second tooth forming a second gap having a second thickness $lg_2$ in the first direction, $Ag_2$ being smaller than $Ag_1$, and $lg_2$ being smaller than $lg_1$. The coupled inductor further includes (1) a respective power transfer winding being wound around each first tooth and (2) a respective second power transfer winding being wound around each second tooth.

(C2) In the coupled inductor denoted as (C1), $lg_1$, $Ag_1$, $lg_2$, and $Ag_2$ may be related so that the following expression is at least substantially true:

$$lg_1 = lg_2 * \frac{Ag_1}{Ag_2}.$$

(D1) A two-stage switching power converter includes (1) a first power stage including a first coupled inductor including a first boost winding and a plurality of first power transfer windings, (2) a second power stage electrically coupled in series with the first power stage, the second power stage including a second coupled inductor including a second boost winding and a plurality of second power transfer windings, the second boost winding being electrically coupled in series with the first boost winding, and (3) a controller configured to control switching of the second power stage to regulate at least one parameter of the two-stage switching power converter.

(D2) In the two-stage switching power converter denoted as (D1), the controller may be further configured to control switching of the first power stage such that the first power stage switches in a complementary manner with respect to the second power stage.

(D3) Either one of the two-stage switching power converters denoted as (D1) or (D2) may further include an inductor electrically coupled in series with each of the first boost winding and the second boost winding.

(D4) Either one of the two-stage switching power converters denoted as (D1) or (D2) may further include a transformer, where the second boost winding is electrically coupled in series with the first boost winding via the transformer.

(D5) Either one of the two-stage switching power converters denoted as (D1) or (D2) may further include an injection switching stage electrically coupled to the first boost winding at a switching node.

(D6) In the two-stage switching power converter denoted as (D5), (1) the second power stage may be electrically coupled in series with the first power stage via an intermediate power node, and (2) the injection switching stage may be configured to repeatedly switch the switching node between the intermediate power node and ground.

(D7) Either one of the two-stage switching power converters denoted as (D5) or (D6) may further including a tuning inductor electrically coupled in parallel with a series combination of the first boost winding and the second boost winding.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A two-stage switching power converter, comprising:
- a first power stage including a first power transfer winding;
- a second power stage electrically coupled in series with the first power stage, the second power stage including a second power transfer winding that is magnetically coupled to the first power transfer winding, wherein the second power stage includes a plurality of phases; and
- a controller configured to:
  - control switching of the second power stage to regulate at least one parameter of the two-stage switching power converter, and
  - control switching of the first power stage such that the first power stage switches in a complementary manner with respect to the second power stage by causing the first power stage to switch in a complementary manner with respect to each phase of the plurality of phases of the second power stage.

2. The two-stage switching power converter of claim 1, wherein each of the first power transfer winding and the second power transfer winding are part of a common coupled inductor.

3. The two-stage switching power converter of claim 1, wherein each of the first power stage and the second power stage has a respective topology selected from the group consisting of a buck-type topology, a boost type topology, and a buck-boost type topology.

4. The two-stage switching power converter of claim 1, wherein the first power stage comprises a plurality of phases.

5. The two-stage switching power converter of claim 4, wherein the controller is further configured to control switching of the first power stage such that the first power stage switches in the complementary manner with respect to the second power stage such that the plurality of phases of the first power stage alternately switch in a complementary manner with respect to the second power stage.

6. A two-stage switching power converter, comprising:
- a first power stage including a first power transfer winding;
- a second power stage electrically coupled in series with the first power stage, the second power stage including a plurality of phases electrically coupled in parallel with each other, each phase including a respective second power transfer winding, each second power transfer winding being magnetically coupled with each other second power transfer winding and with the first power transfer winding; and
- a controller configured to:
  - control switching of each phase of the plurality of phases of the second power stage, to regulate at least one parameter of the two-stage switching power converter, and
  - control switching of the first power stage such that the first power stage switches in a complementary manner with respect to each phase of the plurality of phases of the second power stage.

7. The two-stage switching power converter of claim 6, wherein the first power transfer winding and each second power transfer winding are part of a common coupled inductor.

8. The two-stage switching power converter of claim 6, wherein each of the first power stage and the second power stage has a respective topology selected from the group consisting of a buck-type topology, a boost type topology, and a buck-boost type topology.

9. The two-stage switching power converter of claim 6, wherein the controller is further configured to control switching of each phase of the plurality of phases of the second power stage such that the plurality of phases switch in each switching interval of the second power stage without deadtime between successive switching of phases of the plurality of phases.

10. The two-stage switching power converter of claim 6, wherein the controller is further configured control switching of each phase of the plurality of phases of the second power stage such that a plurality of the respective second power transfer windings of the plurality of phases of the second power stage are simultaneously driven high during a portion of each switching interval of the second power stage.

11. A two-stage switching power converter, comprising:
- a first power stage including a first coupled inductor including a first boost winding and a plurality of first power transfer windings;
- a second power stage electrically coupled in series with the first power stage via an intermediate power node, the second power stage including a second coupled inductor including a second boost winding and a plurality of second power transfer windings, the second boost winding being electrically coupled in series with the first boost winding;
- an injection switching stage electrically coupled to a series connection of the first and second boost windings, the injection switching stage being configured to repeatedly drive the first and second boost windings between two voltage levels; and
- a controller configured to control switching of the second power stage to regulate at least one parameter of the two-stage switching power converter.

12. The two-stage switching power converter of claim 11, wherein the controller is further configured to control switching of the first power stage such that the first power stage switches in a complementary manner with respect to the second power stage.

13. The two-stage switching power converter of claim 11, further comprising an inductor electrically coupled in series with each of the first boost winding and the second boost winding.

14. The two-stage switching power converter of claim 11, further comprising a transformer, the second boost winding being electrically coupled in series with the first boost winding via the transformer.

15. The two-stage switching power converter of claim 11, further comprising a tuning inductor electrically coupled in parallel with a series combination of the first boost winding and the second boost winding.

16. A two-stage switching power converter, comprising:

a first power stage including a first coupled inductor, the first coupled inductor having a first magnetic core, a first boost winding, and a plurality of first power transfer windings, each of the first boost winding and the plurality of first power transfer windings being wound on the first magnetic core;

a second power stage electrically coupled in series with the first power stage, the second power stage including a second coupled inductor, the second coupled inductor having a second magnetic core separate from the first magnetic core, a second boost winding, and a plurality of second power transfer windings, each of the second boost winding and the plurality of second power transfer windings being wound on the second magnetic core, the second boost winding being electrically coupled in series with the first boost winding such that the first power stage and the second power stage are linked by alternating current and not direct current via the first boost winding and the second boost winding; and a controller configured to control switching of the second power stage to regulate at least one parameter of the two-stage switching power converter.

17. The two-stage switching power converter of claim 16, further comprising:

an inductor electrically coupled in series with each of the first boost winding and the second boost winding.

18. The two-stage switching power converter of claim 16, wherein the controller is further configured to control switching of the first power stage such that the first power stage switches in a complementary manner with respect to the second power stage.

19. The two-stage switching power converter of claim 16, further comprising:

a transformer having a first transformer winding and a second transformer winding magnetically coupled to each other, the first transformer winding being electrically coupled in series with the first boost winding and the second transformer winding being electrically coupled in series with the second boost winding.

* * * * *